US012806996B2

(12) United States Patent
Yahata et al.

(10) Patent No.: US 12,806,996 B2
(45) Date of Patent: Nov. 24, 2026

(54) INFORMATION PRESENTATION METHOD, INFORMATION PRESENTATION DEVICE, VEHICLE CONTROL METHOD, AND VEHICLE CONTROL DEVICE

(71) Applicant: Panasonic Automotive Systems Co., Ltd., Kanagawa (JP)

(72) Inventors: Hiroshi Yahata, Osaka Fu (JP); Takahiro Nishi, Nara Ken (JP); Tadamasa Toma, Osaka Fu (JP); Toshiyasu Sugio, Osaka Fu (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 127 days.

(21) Appl. No.: 18/888,936

(22) Filed: Sep. 18, 2024

(65) Prior Publication Data

US 2025/0010719 A1 Jan. 9, 2025

Related U.S. Application Data

(63) Continuation of application No. PCT/JP2023/006878, filed on Feb. 24, 2023.

(30) Foreign Application Priority Data

Mar. 30, 2022 (JP) ................................ 2022-057194

(51) Int. Cl.
*B60K 35/233* (2024.01)
*B60W 30/095* (2012.01)
(Continued)

(52) U.S. Cl.
CPC ......... *B60K 35/233* (2024.01); *B60W 30/095* (2013.01); *B60W 50/14* (2013.01); *G06V 20/58* (2022.01); *B60W 2050/143* (2013.01)

(58) Field of Classification Search
CPC ................ B60K 35/233; G06V 20/58; B60W 30/095; B60W 50/14; B60W 2050/143
(Continued)

(56) References Cited

U.S. PATENT DOCUMENTS

2010/0164702 A1 7/2010 Sasaki et al.
2016/0082840 A1 3/2016 Yoshida et al.
(Continued)

FOREIGN PATENT DOCUMENTS

JP 04-259879 9/1992
JP 07-167668 7/1995
(Continued)

OTHER PUBLICATIONS

International Search Report (ISR) from International Searching Authority (Japan Patent Office) in International Pat. Appl. No. PCT/JP2023/006878, dated May 23, 2023, together with an English language translation.
(Continued)

*Primary Examiner* — Kerri L Mcnally
(74) *Attorney, Agent, or Firm* — Greenblum & Bernstein, P.L.C.

(57) ABSTRACT

An information presentation method of presenting information to a driver of a first vehicle includes detecting an object located in front of the first vehicle. The method includes determining a risk of the objects, and outputting alert sound for alerting a first dangerous object when the first dangerous object is detected based on the risk. The first dangerous object corresponds to a first risk exceeding a predetermined level. The alert sound is presented to the driver as a sound image localized at a first position between the driver and the first dangerous object. The method includes changing a position of the sound image from the first position to a second position when the risk of the first dangerous object
(Continued)

rises to a second risk. The second position is a position between the driver and the first dangerous object and closer to the driver than the first position.

8 Claims, 43 Drawing Sheets

(51) Int. Cl.
*B60W 50/14* (2020.01)
*G06V 20/58* (2022.01)

(58) Field of Classification Search
USPC ........................................................ 340/435
See application file for complete search history.

(56) References Cited

U.S. PATENT DOCUMENTS

| | | | | |
|---|---|---|---|---|
| 2017/0146796 | A1 | 5/2017 | Kosaka et al. | |
| 2020/0100028 | A1 | 3/2020 | Hashimoto et al. | |
| 2020/0175376 | A1 | 6/2020 | Sekii | |
| 2021/0253110 | A1 | 8/2021 | Iwase | |
| 2021/0331701 | A1* | 10/2021 | Hur | H04W 4/44 |
| 2021/0377706 | A1* | 12/2021 | Lekutai | H04W 4/06 |
| 2023/0095845 | A1* | 3/2023 | Wilson | G06V 20/59<br>701/1 |

FOREIGN PATENT DOCUMENTS

| | | |
|---|---|---|
| JP | 2002-056499 | 2/2002 |
| JP | 2004-110394 | 4/2004 |
| JP | 2005-134971 | 5/2005 |
| JP | 2005-346177 | 12/2005 |
| JP | 2008-046744 | 2/2008 |
| JP | 2010-143411 | 7/2010 |
| JP | 2010-156608 | 7/2010 |
| JP | 2012-035784 | 2/2012 |
| JP | 2013-206183 | 10/2013 |
| JP | 2017-220096 | 12/2017 |
| JP | 2021-117704 | 8/2021 |
| JP | 2021-130390 | 9/2021 |
| WO | 2007/069489 | 6/2007 |
| WO | 2008/075407 | 6/2008 |
| WO | 2013/179426 | 12/2013 |
| WO | 2015/037117 | 3/2015 |
| WO | 2016/002007 | 1/2016 |
| WO | 2018/180523 | 10/2018 |

OTHER PUBLICATIONS

Office Action from Japan Patent Office (JPO) in Japanese Patent Appl. No. 2025-033902, dated Oct. 7, 2025, together with an English language translation.
Office Action from Japan Patent Office (JPO) in Japanese Patent Appl. No. 2025-033902, dated Feb. 17, 2026, together with an English language translation.

* cited by examiner

FIG.12

| | | |
|---|---|---|
| DATE AND TIME | 20220317T223811+0900 | ... |
| USER ID | 10001 | ... |
| VEHICLE ID | AA-11112222 | ... |
| SAFE DRIVING FUNCTION | {<br>"SOUND ALERT" : 3000<br>"MARKER DISPLAY" : false<br>"ARROW MARK" : false<br>"8-DIRECTION SENSITIVITIES" : 5, 6, 7, 8, 7, 9, 6, 6<br>:<br>} | ... |
| INCIDENT AND ACCIDENT REPORT | {<br>"VEHICLE SPEED" : 15<br>"STEERING ANGLE" : 71<br>"DIRECTION" : 233<br>"TYPE" : "BICYCLE"<br>"DISTANCE" : 187<br>"RISK" : "MEDIUM"<br>} | ... |
| PLACE | +34.693308+135.530903CRSWGS_84/ | ... |
| MOVING DISTANCE | 10.8 | ... |

FIG.13

| RISK | DEFINITIONS | EXAMPLE OF DETERMINATION STANDARD FOR FIG. 3 |
|---|---|---|
| HIGH | STATE IN WHICH RISK IS HIGHEST.<br>STATE IN WHICH ARITHMETIC OPERATION UNIT DIRECTLY CONTROLS MOVABLE UNIT IN ORDER TO PERFORM IMMEDIATE VEHICLE CONTROL FOR AVOIDING ACCIDENT | $D \leq Rc$ |
| MEDIUM | STATE IN WHICH RISK IS SECOND HIGHEST AFTER "HIGH".<br>STATE IN WHICH ARITHMETIC OPERATION UNIT NOTIFIES USER VIA INFORMATION INPUT/OUTPUT UNIT SUCH THAT USER PERFORMS IMMEDIATE VEHICLE CONTROL FOR AVOIDING ACCIDENT.<br>DIFFERENCE FROM "HIGH" IS THAT ARITHMETIC OPERATION UNIT DOES NOT DIRECTLY CONTROL MOVABLE UNIT IN ORDER TO AVOID ACCIDENT. | $Rc < D \leq Rc+Rb$ |
| LOW | STATE IN WHICH RISK IS LOWER THAN "MEDIUM" AND HIGHER THAN "SAFE ".<br>STATE IN WHICH ARITHMETIC OPERATION UNIT DETERMINES THAT, ALTHOUGH DANGEROUS OBJECT THAT CAN CAUSE ACCIDENT IS PRESENT AROUND VEHICLE, IMMEDIATE VEHICLE CONTROL FOR AVOIDING ACCIDENT IS UNNECESSARY | $Rc+Rb < D \leq (Rc+Rb) \times K$<br>HERE, SETTING VALUE OF $K > 1$ |
| SAFE | STATE IN WHICH RISK IS LOWEST.<br>STATE IN WHICH ARITHMETIC OPERATION UNIT DETERMINES THAT DANGEROUS OBJECT THAT CAN CAUSE ACCIDENT IS ABSENT AROUND VEHICLE | $(Rc+Rb) \times K < D$<br>HERE, SETTING VALUE OF $K > 1$ |

| | |
|---|---|
| TIME | t0 |
| RISK | LOW |
| VIRTUAL SOUND SOURCE POSITION | Pa (t0) |
| SOUND | PI |
| VOLUME | SMALL |

| | |
|---|---|
| TIME | t1 (>t0) |
| RISK | MEDIUM |
| VIRTUAL SOUND SOURCE POSITION | Pa (t1) |
| SOUND | PIPI |
| VOLUME | MEDIUM |

| | |
|---|---|
| TIME | t2 (>t1>t0) |
| RISK | HIGH |
| VIRTUAL SOUND SOURCE POSITION | Pa (t2) |
| SOUND | PIPII |
| VOLUME | LARGE |

FIG.42

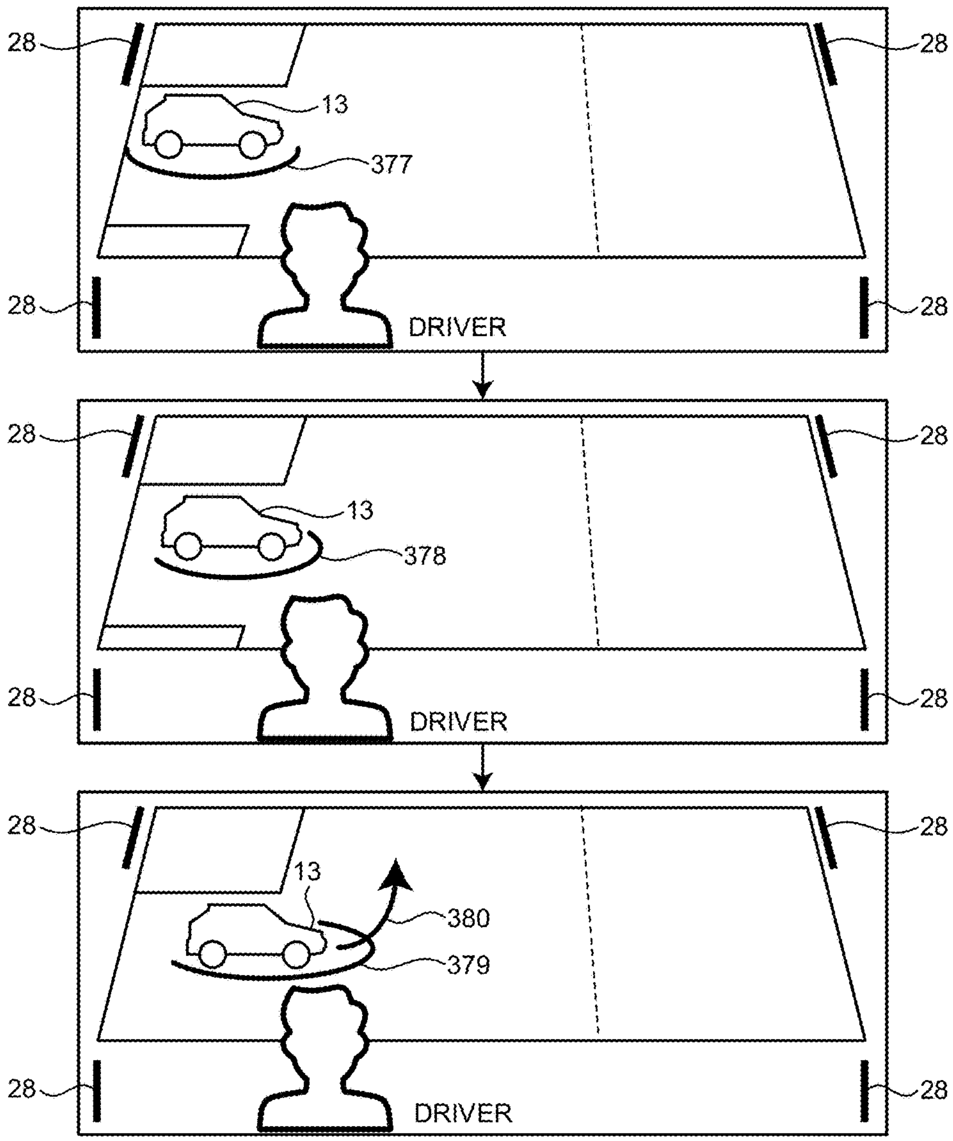

| | |
|---|---|
| TIME | t0 |
| RISK | LOW (ANOTHER VEHICLE IS STOPPING, OWN VEHICLE IS TRAVELING STRAIGHT) |
| MARKER COLOR | GREEN |
| MARKER SHAPE | ARC ON NEAR SIDE GROUND OF OTHER VEHICLE |

| | |
|---|---|
| TIME | t1 (>t0) |
| RISK | MEDIUM (ANOTHER VEHICLE IS TRAVELING FORWARD, OWN VEHICLE IS TRAVELING STRAIGHT) |
| MARKER COLOR | ORANGE |
| MARKER SHAPE | ARK ON NEAR SIDE GROUND OF OTHER VEHICLE AND EXTENDING IN TRAVELING DIRECTION |

| | |
|---|---|
| TIME | t2 (>t1>t0) |
| RISK | HIGH (OTHER VEHICLE IS FURTHER TRAVELING FORWARD, OWN VEHICLE IS TRAVELING STRAIGHT) |
| MARKER COLOR | RED |
| MARKER SHAPE | ARK ON NEAR SIDE GROUND OF OTHER VEHICLE AND FURTHER EXTENDING IN TRAVELING DIRECTION. ARROW INDICATING EXPECTED TRAVELLING ROUTE |

INFORMATION PRESENTATION METHOD, INFORMATION PRESENTATION DEVICE, VEHICLE CONTROL METHOD, AND VEHICLE CONTROL DEVICE

CROSS-REFERENCE TO RELATED APPLICATIONS

This application is a continuation of International Application No. PCT/JP2023/006878, filed on Feb. 24, 2023, which claims the benefit of priority of the prior Japanese Patent Application No. 2022-057194, filed on Mar. 30, 2022, the entire contents of which are incorporated herein by reference.

FIELD

The present disclosure relates to an information presentation method, an information presentation device, a vehicle control method, and a vehicle control device.

BACKGROUND

There has been a method of estimating a state of a driver who is riding on a mobile body (for example, a patent literature JP 2021-130390 A).

However, such a conventional technique is required to make further improvement.

SUMMARY

An information presentation method according to one aspect of the present disclosure is a method of presenting information to a driver of a first vehicle. The information presentation method includes detecting one or more objects located in front of the first vehicle via at least one first sensor serving to sense an outside of the first vehicle, and determining a risk of each of the one or more objects. The information presentation method includes outputting alert sound for alerting a first dangerous object via one or more speakers provided in an interior of the first vehicle in response to determining, based on the risk of each of the one or more objects, that the first dangerous object is present among the one or more objects. The first dangerous object corresponds to a first risk exceeding a predetermined level. The alert sound is presented to the driver as a sound image localized at a first sound image position between the driver and the first dangerous object. The risk relates to a future collision risk between each of the one or more objects and the first vehicle. The information presentation method includes changing a sound image position of the sound image from the first sound image position to a second sound image position when the risk of the first dangerous object rises from the first risk to a second risk. The second sound image position is a position between the driver and the first dangerous object and closer to the driver than the first sound image position.

BRIEF DESCRIPTION OF THE DRAWINGS

FIG. 12 is a diagram illustrating an example of a data structure of driving data;

FIG. 13 is a diagram illustrating an example of a level of a risk;

FIG. 42 is a diagram for describing an example of indicating a risk of another vehicle with marker display in real time;

DETAILED DESCRIPTION

Figure 1:
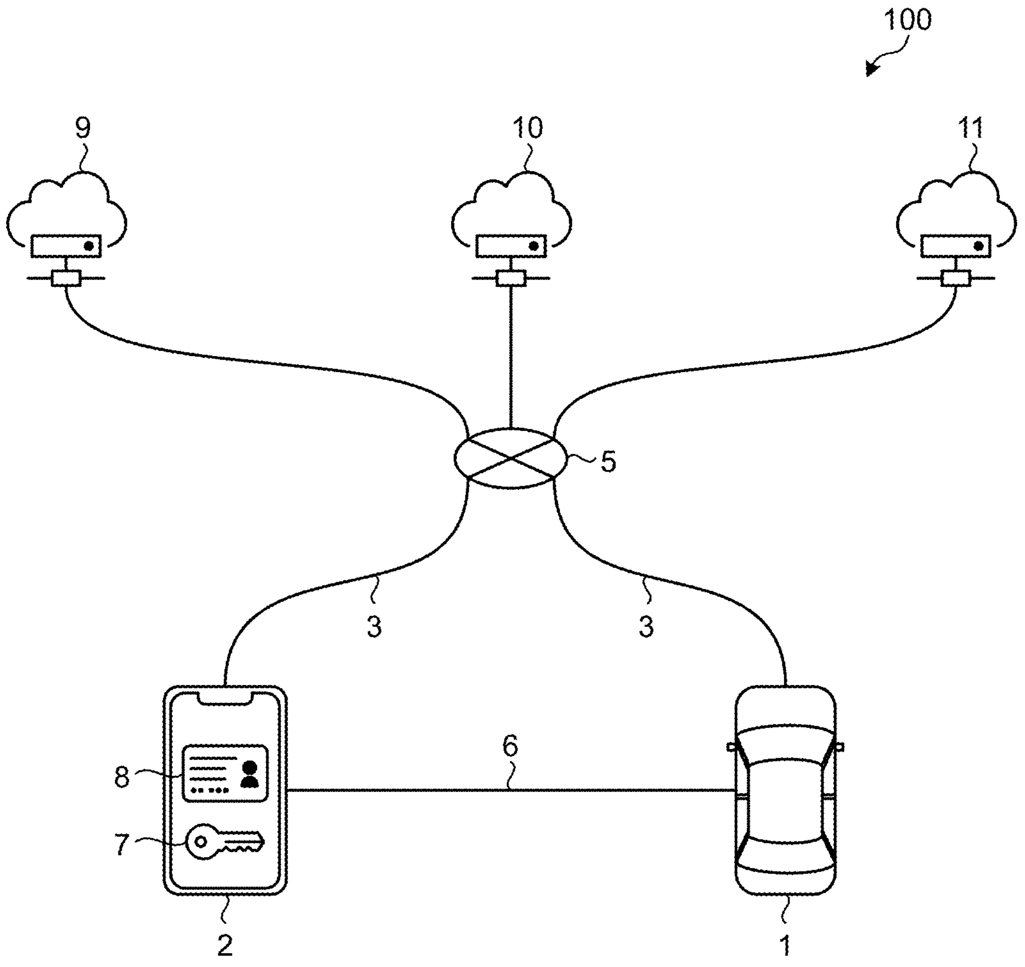
FIG. 1 is a block diagram illustrating an example of an overall configuration of a safe driving assist system.

The environment surrounding our daily life is increasingly digitized.

For example, many people own smartphones, which are information terminals dedicated to individuals, and have come to install, in the smartphones, and use various application programs (hereinafter, simply called "application") such as an application for managing health of users and a social communication application for communicating with other people.

The present disclosure discloses a technique for assisting a user such that the user can live a healthy, happy, comfortable, convenient, reassuring, safe, pleasant, economical, and reasonable life by causing a smartphone, that is an information terminal having various information processing capabilities, an application, which operates on the smartphone, a computer resource (hereinafter, this computer resource is referred to as a cloud), which connected via a network that manages and provides various information, a mobile body (hereinafter, referred to as a vehicle), which has an advanced information processing capability of assisting safe driving of the user, and the application operating on the vehicle, to cooperatively operate.

Note that the present disclosure can also be implemented as a program for causing a computer to execute characteristic configurations included in the control method used herein or a system that operates in accordance with the program. It goes without saying that such a computer program can be distributed via a computer-readable non-transitory recording medium such as am SD (Secure Digital) card or a communication network such as the Internet.

Note that all the embodiments described below illustrate specific examples of the present disclosure. Numerical values, shapes, constituent elements, steps, order of steps, and the like described in the following embodiments are examples and do not limit the present disclosure. Among the constituent elements in the following embodiments, constituent elements that are not described in independent claims indicating a most superordinate concept are described as any constituent elements. In all the embodiments, respective contents can be combined.

Embodiments

In our society, it is predicted that the Internet will become more popular in the future and various sensors will become familiar. Accordingly, in our society, it is predicted that information ranging from information about an individual's internal state, activities, and the like to information about an entire town including buildings, transportation networks, and the like will be digitized and made available in a computer system. Digitized data concerning individuals (personal information) will be securely managed as big data in a cloud server of an information bank or the like via a communication network and will be used for various purposes for individuals and the society.

Such an advanced information society is called Society 5.0 in Japan. The advanced information society is a society in which economic development and solution of social problems are expected by an information base (a cyber-physical system) in which a real space (a physical space), which is a material world surrounding individuals, and a virtual space (a cyberspace) in which various kings of processing concerning the physical space are performed by computers in cooperation are highly fused.

In such an advanced information society, by analyzing communication (including acquisition and provision of information and an expression method for the information) and behavior in various daily scenes performed by an individual and analyzing big data including accumulated personal information, it is possible to provide information and services necessary for the individual with a communication method considered to be optimal for the individual corresponding to the scene.

In the following description, a specific embodiment that provides a safe and comfortable movement experience in an advanced information society in which such a cyber-physical system operates is described.

FIG. 1 is a block diagram illustrating an example of an overall configuration of a safe driving assist system 100. There are a vehicle 1 driven by a user and an information terminal 2 (for example, a smartphone) owned by the user. The vehicle 1 and the information terminal 2 can connect to the Internet, which is a wide-area communication network 5, using a wireless communication standard such as cellular communication 3 called 4G or 5G and access various kinds of information.

In addition, the vehicle 1 and the information terminal 2 can directly perform wireless communication with a device present in a short distance by using near field communication 6 such as Wi-Fi (registered trademark), Bluetooth (registered trademark), or UWB, which is an ultra-wideband wireless communication standard.

An electronic key 7 for using the vehicle 1 and a digital driver's license 8, which is a driver's license of the user, are stored in the information terminal 2. The electronic key 7 necessary for using the vehicle 1 is acquired by the information terminal 2 by communicating with a vehicle management cloud 10 via the Internet. Conditions necessary for the user to drive are also described in the digital driver's license 8.

Further, the information terminal 2 may include a personal data store (hereinafter referred to as PDS) that aggregates user's personal information and information about driving and the like and manages sharing with a third party based on personal permission or an application that provides a function of an information bank that provides a mediating function of social data distribution in this way.

The Internet includes a personal information management cloud 9 that provides functions of an information bank and a PDS. Personal information of the user, information about driving and the like, and the like are aggregated and managed in the personal information management cloud 9. The use by a third party is managed based on the personal permission.

Note that, as described above, the equivalent functions are sometimes provided by a smartphone. Therefore, in the following description of the present disclosure, it is assumed that such personal information, information about driving and the like, and the like are managed by the information terminal 2 and/or the personal information management cloud 9.

In the present disclosure, these pieces of information may be managed by either the information terminal 2 or the personal information management cloud 9. In particular, information relating to driving may be accumulated in a memory in a vehicle and use by a third party may be managed by an application of the vehicle 1 in the same manner as the information terminal 2 and the personal information management cloud 9.

The vehicle management cloud 10 operates in cooperation with the vehicle 1 such that the vehicle 1 can be used with the electronic key 7 linked with the vehicle 1. The vehicle management cloud 10 also acquires, sets, updates, and manages information about a use status of the vehicle 1 and setting of a safe driving function in cooperation with an application executed by an arithmetic operation unit 106 of the vehicle 1.

A third party cloud 11 is a cloud for a third party to provide services relating to a user and/or a vehicle. For example, the third party cloud is a cloud for implementing services provided by various third parties based on a use status accumulated in the vehicle such as a vehicle management service that proposes replacement of consumables, an insurance service that proposes update of a vehicle insurance, and an administrative service that determines a place having a high accident risk and performs road maintenance.

Figure 2:
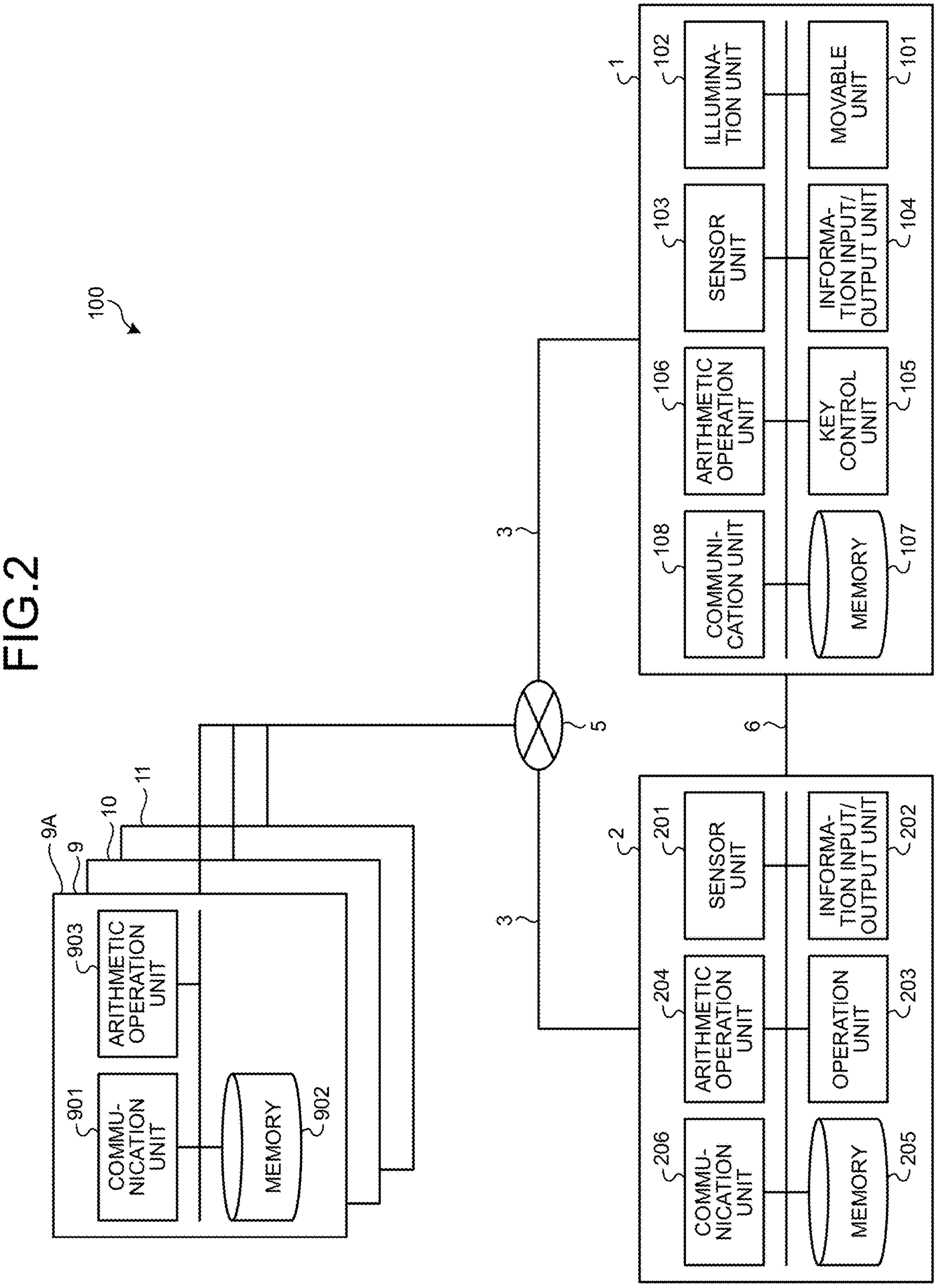
FIG. 2 is a block diagram illustrating an example of an overall configuration of the safe driving assist system.

FIG. 2 is a block diagram illustrating an example of an overall configuration of the safe driving assist system 100. The vehicle 1 includes a movable unit 101 for moving the vehicle and moving a device (a seat or the like) in a vehicle interior space, an illumination unit 102 that illuminates the periphery of the vehicle, a sensor unit 103 for detecting positions and states of persons and cars around the vehicle and persons and objects in a vehicle interior, an information input/output unit 104 that provides various video and audio information to passengers and receives input such as touch operation or sound operation from the passenger, a key control unit 105 that authenticates a key to be unlocked and controls locking/unlocking of doors of the vehicle, an arithmetic operation unit 106 that executes various kinds of processing concerning a vehicle core system and vehicle functions, a memory 107 that records various data including a program of the vehicle core system and a database of key management, and a communication unit 108 that performs wireless communication with an external device.

The vehicle 1 includes an information presentation device and a vehicle control device. The information presentation device and the vehicle control device include, for example, a processor and a memory. The processor executes a program stored in the memory to include at least one functional block (see the vehicle 1 in FIG. 2) included in the vehicle 1 included in the information presentation device and the vehicle control device. The arithmetic operation unit 106 is an example of a processor and the memory 107 is an example of a memory. The information presentation device may include the information input/output unit 104 described above. The vehicle control device may include the communication unit 108 and/or the movable unit 101 in addition to the arithmetic operation unit 106 and the memory 107 described above. Note that the functions of the information presentation device and the vehicle control device are not limited these. The information presentation device and the vehicle control device may include the functions described above.

The information terminal 2 includes a sensor unit 201 for acquiring video information, audio information, and/or physical quantities of a surrounding environment, an information input/output unit 202 performs input and output of information such as video and sound with the user, an operation unit 203 that receives button pressing, touch operation, and the like from the user, an arithmetic operation unit 204 that performs various calculations and information processing such as information drawing performed in the information terminal 2, a memory 205 that retains data and files to be used by the arithmetic operation unit 204, and a communication unit 206 for communicating with other computers on a communication network.

When an application for performing key management for using the vehicle 1 with the electronic key 7, an application for managing collected personal information and information relating to driving and the like, or the like is installed in the information terminal 2, a program included in the application and necessary data are recorded in the memory 205 of the information terminal 2 and the program is executed by the arithmetic operation unit 204.

Note that the information terminal 2 is described as a smartphone but is not limited to this. The information terminal 2 may be a form such as a wristwatch-type smartwatch, a glasses-type smart glass, a ring-type smart ring, a smart speaker that performs sound operation, or a robot including a movable unit as well.

The personal information management cloud 9, the vehicle management cloud 10, and the third party cloud 11 include a communication unit 901 for communicating with other computers on a communication network, a memory 902 that records information about the vehicle and the user and a management program for the information, and an arithmetic operation unit 903 that performs various data processing. Note that these clouds, the vehicle 1, and the information terminal 2 may perform communication through communication means that is not the Internet of the wide-area communication network 5. For example, the near field communication 6 may be used for unlocking processing performed between the vehicle 1 and the information terminal 2.

Figure 3:
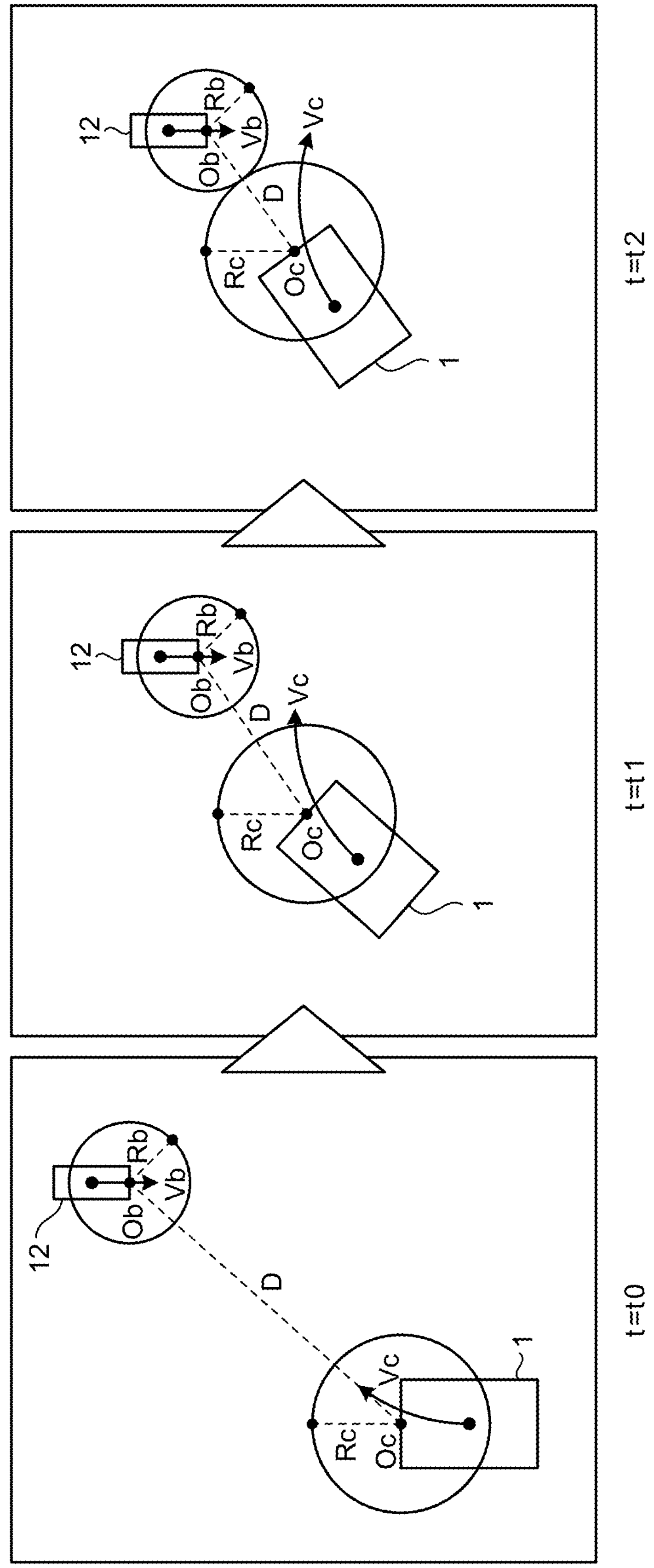
FIG. 3 is a diagram for describing an example of a risk determination method for a vehicle.

FIG. 3 is a diagram illustrating an example of a risk determination method for the vehicle 1. FIG. 3 chronologically depicts a scene in which the vehicle 1 on the lower left makes a right turn and approaches a bicycle 12 traveling straight from the upper right. In an example at t=t0 in FIG. 3 indicating time t0, Vc indicating a moving route at the time when the vehicle 1 present on the lower left makes a right turn while drawing a curve, Oc indicating a point at the center in front of the vehicle 1, and a circle having a radius Rc centered on Oc are drawn.

In order to simplify the description, it is assumed that a risk is determined for the vehicle 1 on the basis of the distance from the point Oc to an object around the vehicle. It is assumed that, when an object approaches within this radius Rc, the risk is determined to be a predetermined risk (for example, the risk is "high"). In the following description, the moving route is described as information including the current position and the moving speed (the speed and the direction) of the moving object.

In an example at t=t0 in FIG. 3, Vb indicating a moving route at the time when the bicycle 12 present on the upper right travels straight, Ob indicating a point in the center in front of the bicycle 12, and a circle having a radius Rb centered on Ob are drawn. It is assumed that a risk is determined the bicycle 12 as well according to the distance from the point Ob to the object around the bicycle in the same manner as for the vehicle 1. The distance between the point Oc and the point Ob is D.

The sensor unit 103 of the vehicle 1 uses a sensor to identify a moving object such as a person, a bicycle, or a vehicle in addition to a stationary object such as a road, a traffic light, or a sign around the vehicle and detects the position and the moving speed (the speed and the direction) of the moving object. The arithmetic operation unit 106 of the vehicle 1 monitors and evaluates a situation around the vehicle and a current risk in real time based on data acquired by these sensors.

In an example at t=t1 in FIG. 3 indicating a situation at time t1 when time has elapsed from time t0, a state is drawn in which the vehicle 1 has made a right turn and greatly changed the traveling direction and the bicycle 12 is traveling straight as it is. The distance D is shorter than that at time t0, indicating that the vehicle 1 and the bicycle 12 are approaching.

In an example at t=t2 illustrating a situation at time t2 when time has elapsed from time t1, a state is drawn in which the vehicle 1 further has made a right turn and the bicycle 12 has traveled straight to approach to a distance D=Rc+Rb. The sensor unit 103 of the vehicle 1 sequentially detects this situation and continues to update the memory 107.

The arithmetic operation unit 106 sequentially calculates the value to grasp the situation around the vehicle. Determination of a risk is performed in this elapse of time. The arithmetic operation unit 106 performs notification to the driver via the information input/output unit 104 based on the determination and instructs the movable unit 101 to perform emergency braking of the vehicle in order to avoid an accident.

Figure 4:
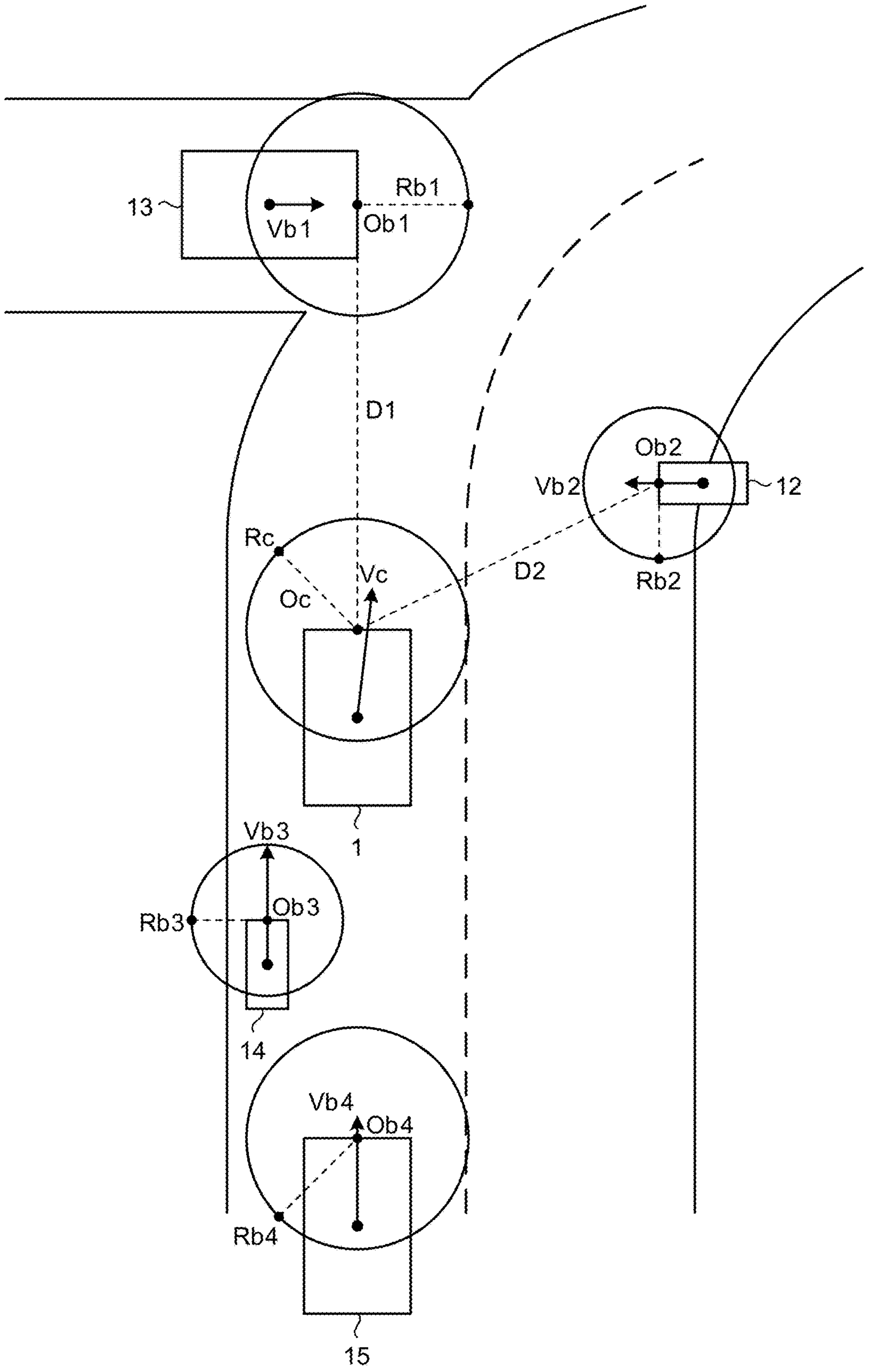
FIG. 4 is a diagram for describing an example of a safe driving assist method for the vehicle.
Figure 5:
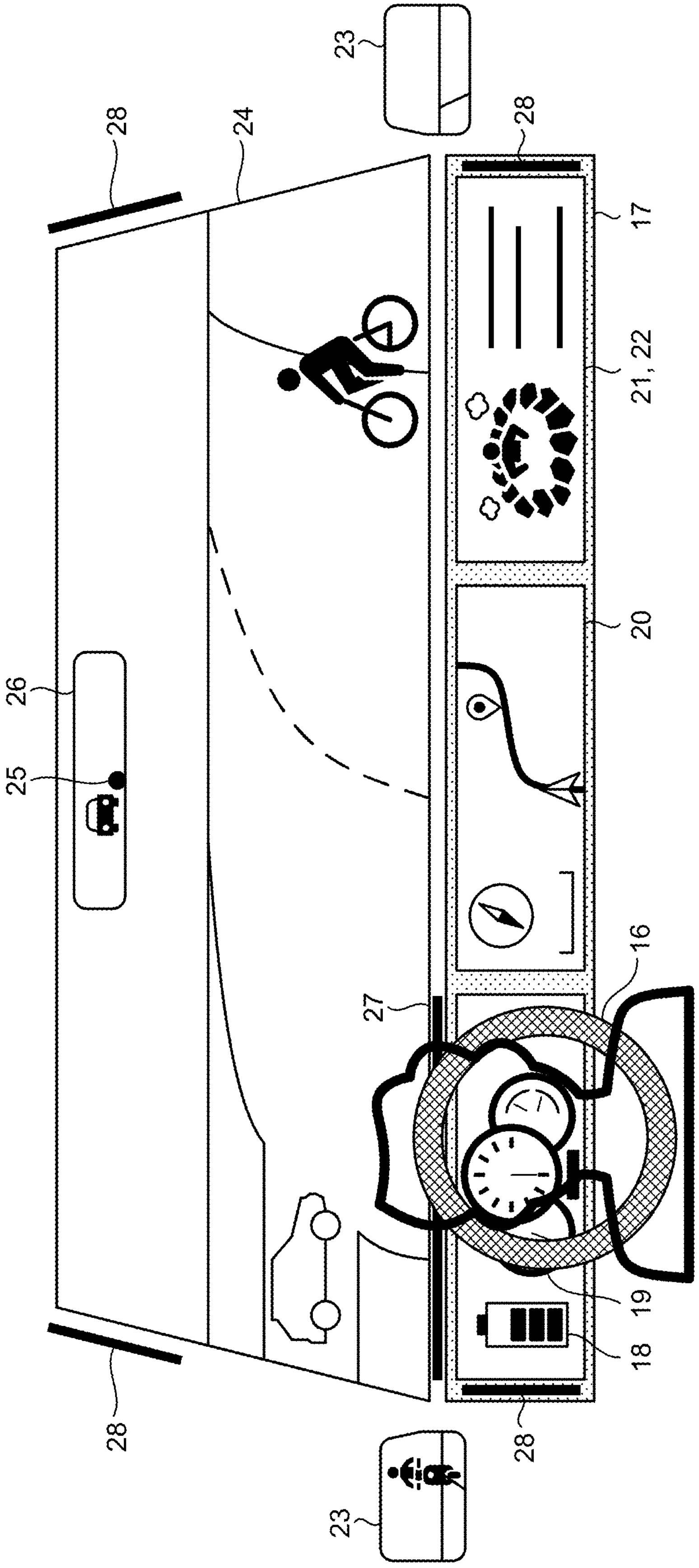
FIG. 5 is a diagram for describing an example of an information input/output unit provided in the vehicle.
Figure 6:
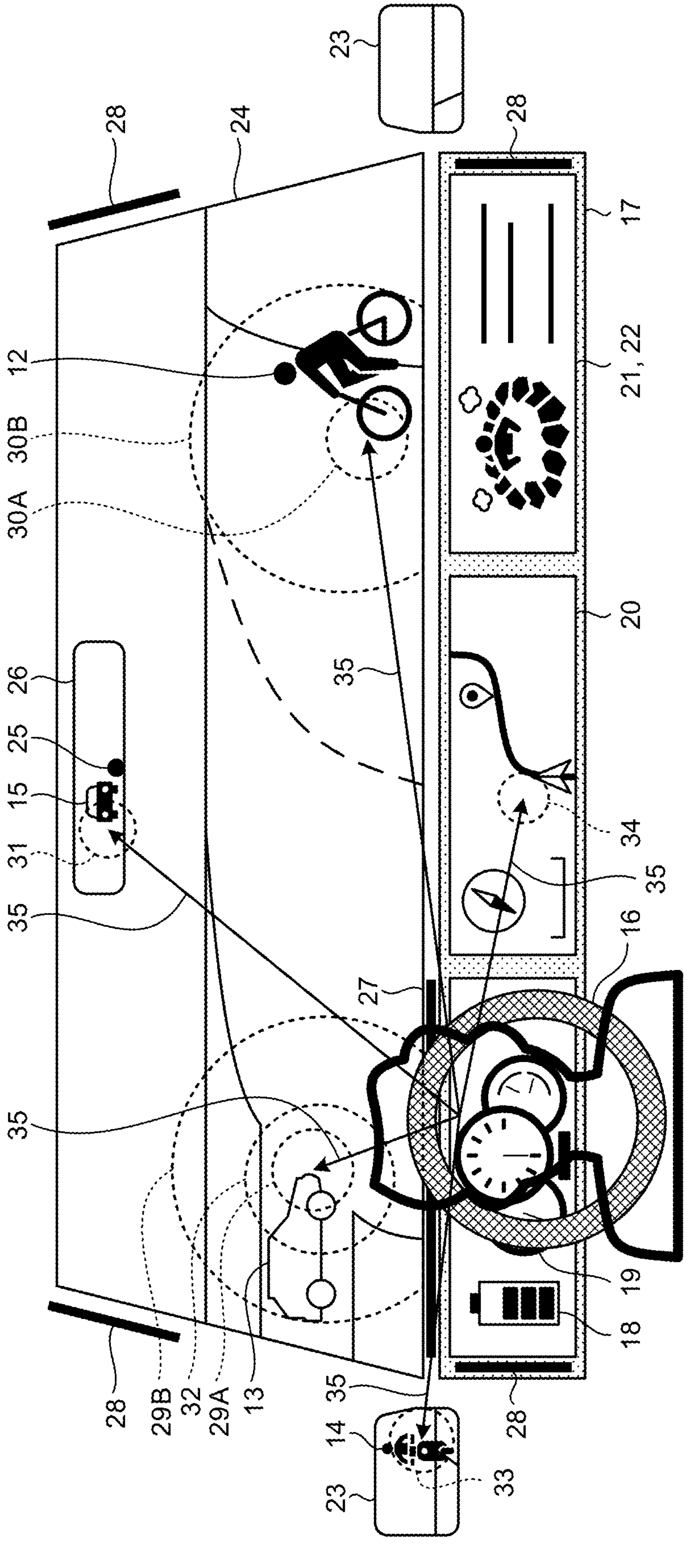
FIG. 6 is a diagram for describing an example of an attention region and a dangerous region.
Figure 7:
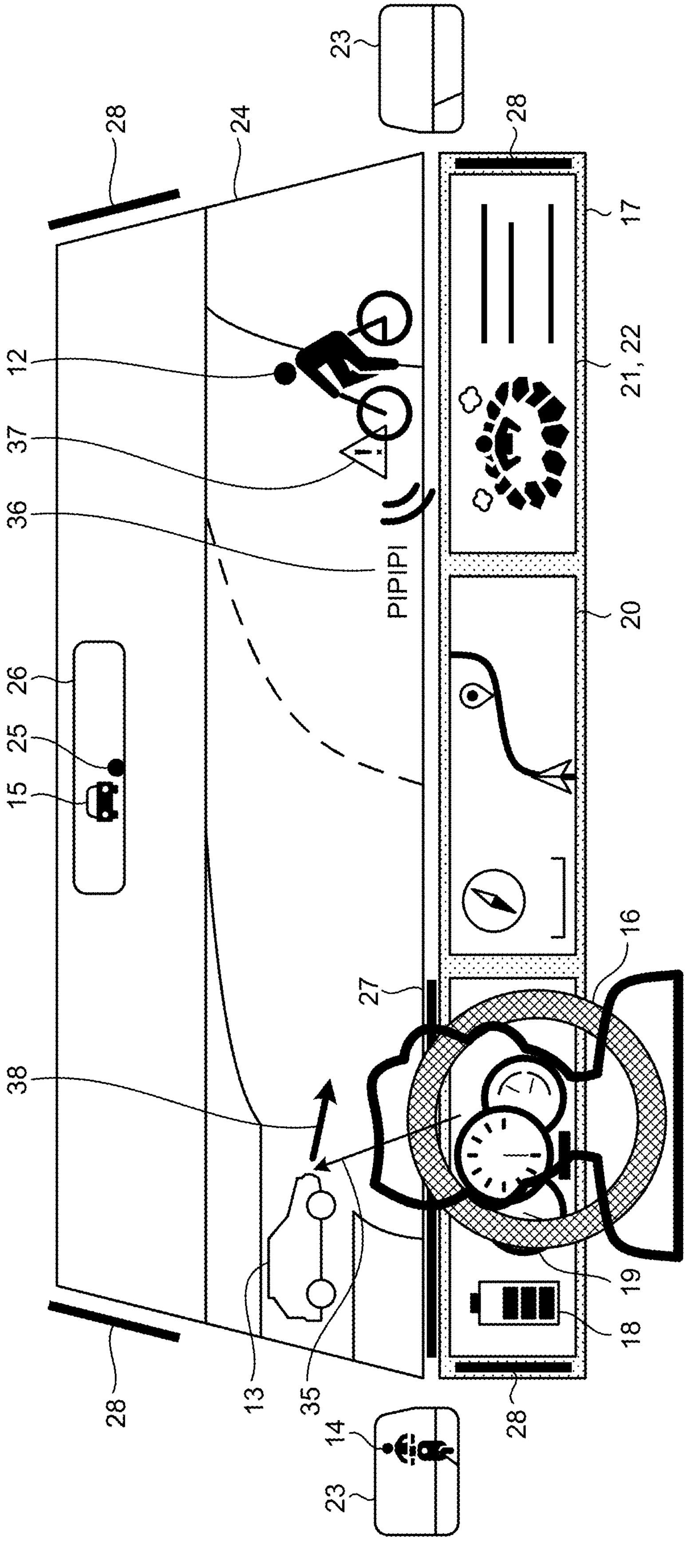
FIG. 7 is a diagram for describing an example of safe driving assist.

FIG. 4 is a diagram for describing an example of a safe driving assist method for the vehicle 1. FIGS. 4, 5, 6, and 7 illustrate the same scene. FIG. 4 is a diagram of the vehicle 1 (hereinafter also referred to as own vehicle) viewed from above in accordance with the notation of FIG. 3. FIGS. 5, 6, and 7 are diagrams of the scene viewed from the inside of the vehicle.

FIG. 4 is a scene in which the vehicle 1 travels forward while curving to the right along a road from straight traveling. The vehicle 1 travels on a moving route of Vc and a front center point is represented as Oc. There is a preceding vehicle 13 that is about to merge in the traveling direction of the vehicle 1. A moving route of the preceding vehicle 13 is represented as Vb1, a front center point is represented as Ob1, and a distance D1 is a distance from Oc to Ob1.

Similarly, there is a bicycle 12 that is about to cross the road on obliquely front right in the traveling direction of the vehicle 1. A moving route of the bicycle 12 is represented as Vb2, a front center point is represented as Ob2, and a distance D2 is a distance from Oc to Ob2.

Similarly, a motorcycle 14 travels side by side on obliquely rear left the vehicle 1. A moving route of the motorcycle 14 is represented as Vb3 and a front center point is Ob3. Similarly, there is a following vehicle 15 behind the vehicle 1. A moving route of the following vehicle 15 is represented as Vb4 and a front center point is Ob4.

In addition to type identification for the mobile bodies illustrated in FIG. 4, the arithmetic operation unit 106 sequentially calculates Oc, Ob1, Ob2, Ob3, and Ob4, which are the positions of the front center points, and Vc, Vb1, Vb2, Vb3, and Vb4, which are the moving routes, based on data detected by a plurality of sensors included in the vehicle 1 and acquires a situation around the vehicle in real time.

FIG. 5 is a diagram for describing an example of the information input/output unit 104 provided in the vehicle 1. FIG. 5 illustrates a state around a driver's seat viewed from the inside of the vehicle. The driver is sitting in the driver's seat and operating a steering wheel 16. In a cockpit 17, information divided into three in the horizontal direction is displayed. Meters 19 indicating vehicle information 18 are displayed in front of the driver.

Navigation information 20 is displayed in the middle. At the right end, destination information 21 or destination periphery information 22 is displayed. There are left and right side mirrors 23, there is a front windshield 24 forward in the front, and there is, in an upper portion, a rearview mirror 26 including a sensor 25 (for example, an RGB camera, a combination of an infrared LED and an infrared camera, a multispectral camera, a radio wave sensor using reflection variation of an electromagnetic wave, an audio microphone, or the like) for detecting states of the driver and passengers.

There are four independent speakers 28 on the top, the bottom, the left, and the right. In a dashboard, there is a space video projection device 27 (a head-up display (including a holographic display) that can display a visual image on a transparent panel, a windshield 24, or an empty space, a display utilizing a two-sided corner reflector array, a transparent display that displays a visual image on a transparent panel, a retinal display that directly forms an image on a retina, and the like).

FIG. 6 is a diagram illustrating an example of a dangerous region and an attention region. As seen from the driver, the preceding vehicle 13, the bicycle 12, the motorcycle 14, and the following vehicle 15 described with reference to FIG. 4 can be checked at the left end of the windshield 24, the lower right of the windshield 24, the left side mirror 23, and the rearview mirror 26, respectively.

The arithmetic operation unit 106 of the vehicle 1 calculates and sets, based on sensing data acquired by a sensor from the outside of the vehicle, a dangerous center region 29A indicating a center portion of a dangerous region including the front center point Ob1 of the preceding vehicle 13 and a dangerous region 29B including the dangerous center region 29A and indicating a dangerous region concerning the preceding vehicle 13.

Similarly, the arithmetic operation unit 106 calculates and sets a dangerous center region 30A indicating a center portion of a dangerous region including the front center point Ob2 of the bicycle 12 and a dangerous region 30B including the dangerous center region 30A and indicating a dangerous region concerning the bicycle 12. Although not illustrated, dangerous center regions and dangerous regions may be similarly calculated and set for the motorcycle 14 reflected on the side mirror 23 and the following vehicle 15 reflected on the rearview mirror 26.

The dangerous center regions 29A and 30A and the dangerous regions 29B and 30B indicate where an object with a high risk is present when viewed from the driver, in other words, a direction in which the driver should direct a line of sight to check an object around the vehicle for which the driver should consider safety.

Note that the dangerous center regions 29A and 30A are position information including a part of an object around the vehicle, are regions centered on a specific position (the front center point Ob1 or the front center point Ob2) where the distance between the own vehicle (the vehicle 1) and the object (the bicycle 12 or the preceding vehicle 13) is short and the possibility of collision is high and are determined by the arithmetic operation unit 106 based on data sensed by the sensor unit 103 of the vehicle 1 and/or data received by the communication unit 108.

Similarly, the dangerous regions 29B and 30B are larger regions including the dangerous center regions 29A and 30A. The dangerous regions 29B and 30B are regions set to include a region identified as a part or a whole including a dangerous center region of the object by the arithmetic operation unit 106 based on the data sensed by the sensor unit 103 of the vehicle 1 and/or the data received by the communication unit 108. Therefore, the dangerous center regions 29A and 30A may be set to be region information indicating a part of an oncoming vehicle and the dangerous regions 29B and 30B may be set to be region information indicating the entire oncoming vehicle. More specifically, the dangerous region may indicate an entire individual object (for example, the entire vehicle 13) present around the vehicle and the dangerous center region may indicate a portion of the object at a short distance from the own vehicle (for example, the left front portion of the vehicle 13).

A sensor (such as a sensor 25 provided in the rearview mirror) of the vehicle 1 sequentially senses a driving state of the driver as well. An attention region, which is a region to which the driver directed constant or more attention most recently, is detected.

In the example illustrated in FIG. 6, the driver paid attention to an attention region 31. Therefore, it is seen that the driver is checking following vehicle 15 reflected on the rearview mirror 26. The driver paid attention to an attention region 32, so that it is seen that the driver is checking the merging preceding vehicle 13 through the windshield 24.

The driver paid attention to an attention region 33, so that it is seen that the driver is checking the motorcycle 14 on obliquely rear left reflected on the left side mirror 23. Similarly, the driver paid attention to an attention region 34, so that it is seen that the driver is checking the navigation information 20.

In recent years, a line-of-sight detection technology has penetrated, and a target object checked by the driver during driving as described above can be acquired by detecting the head position (or the center position of both the eyes) of the driver and the line-of-sight direction (or the relative position between the reference point position such as the pupil position and the outer corner of the eye and the outer edge of the iris) of the driver with a sensor in the vehicle and performing image recognition processing with the arithmetic operation unit 106.

Note that, in the present disclosure, a method of acquiring a line-of-sight direction and a determination standard for a gazing region are not limited as long as a region to which the driver directed constant or more attention can be detected. Concerning the determination of a region to which the driver directed constant or more attention, the region may be determined as an attention region when a direction in which the driver's line of sight is directed stayed within a predetermined angle for a given time or more.

A region within a predetermined distance from a line segment connecting points where the line of sight stayed for a constant time or more in chronological order for a predetermined time may be determined as a region to which the driver directed constant or more attention.

In FIG. 6, as described above, the driver is aware of the preceding vehicle 13, the following vehicle 15, and the motorcycle 14 within the most recent predetermined time. However, the sensor unit 103 and the arithmetic operation unit 106 do not detect and determine that the driver directed constant or more attention to the bicycle 12 present on obliquely front right. Therefore, in this case, the driver is likely to be unaware of a risk of the bicycle 12 within the immediately preceding predetermined period.

In driving the vehicle 1, the driver has to continuously monitor a positional relation with a stationary/moving object around the vehicle without omission while following instructions of a road line, a sign, a traffic light, or the like in a wide viewing angle around the vehicle and continue to perform safe driving control in accordance with a situation around the vehicle.

This is considered to be because there is a moment when safety consideration is not practically through in the case of a driver unaccustomed to driving operation, a driver who drives overseas or the like where driving rules are different from usual, a driver whose cognitive judgment ability has deteriorated with aging, or a driver who continues a driving operation for a long time like a bus or a taxi.

Thus, the present disclosure discloses, as an example, the safe driving assist system 100 that plainly informs the driver of an alert for urging the driver to take appropriate safety consideration only when necessary in a situation as illustrated in FIG. 6.

FIG. 7 is a diagram illustrating an example of safe driving assist. A line extending from the center of the face of the driver (or the center position of both the eyes) toward the preceding vehicle 13 indicates a line of sight 35 of the driver at this moment.

As described with reference to figures up to FIG. 6, the arithmetic operation unit 106, which has determined that the driver's safety consideration for the bicycle 12 on obliquely front right has decreased for the immediately preceding predetermined period, sounds a sound alert 36 via the information input/output unit 104 and performs marker display 37 to thereby cause the driver to pay attention to an object with a high risk.

In FIG. 7, the arithmetic operation unit 106 uses the information input/output unit 104 to display, with an arrow mark 38, a direction in which an object with a high risk is present around a region to which the driver is currently paying attention (a direction of a target object to be paid attention).

Further, the arithmetic operation unit 106 displays the marker display 37 (for example, a caution mark or the like) between the bicycle 12, which is determined as being an object with a high risk due to reduced safety consideration for a predetermined period, and the driver to make it easy to direct attention.

Further, the arithmetic operation unit 106 controls the speaker 28 of the information input/output unit 104 to set a virtual sound source position between the driver and the bicycle 12 and output sound such that the sound alert 36 "pipipi" can be heard from the direction of the bicycle 12. Note that, needless to say, these marks and sound are examples. Marks of other shapes or different sound may be used.

As described above, for a dangerous object around the vehicle that that driver is considered to be unaware, the information input/output unit 104 notifies the dangerous object using the arrow mark 38, the caution mark (the marker display 37), the sound alert 36, or the like considering the position and the direction of the dangerous object in a relatively low risk situation before the vehicle itself activates emergency braking such as an advanced driver assistance system (ADAS). Accordingly, safe driving can be assisted more easily for an important part at an earlier stage.

Figure 8:
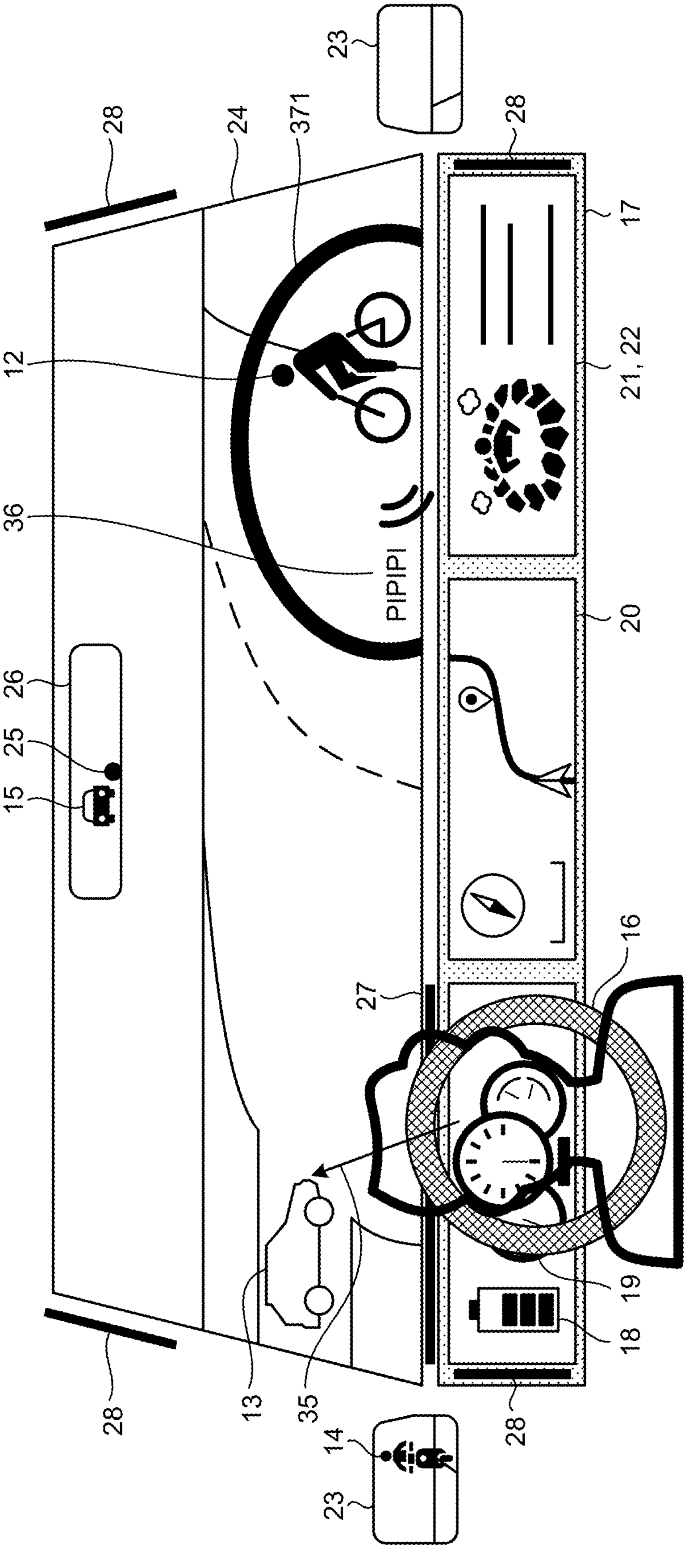
FIG. 8 is a schematic diagram illustrating another pattern of marker display.
Figure 9:
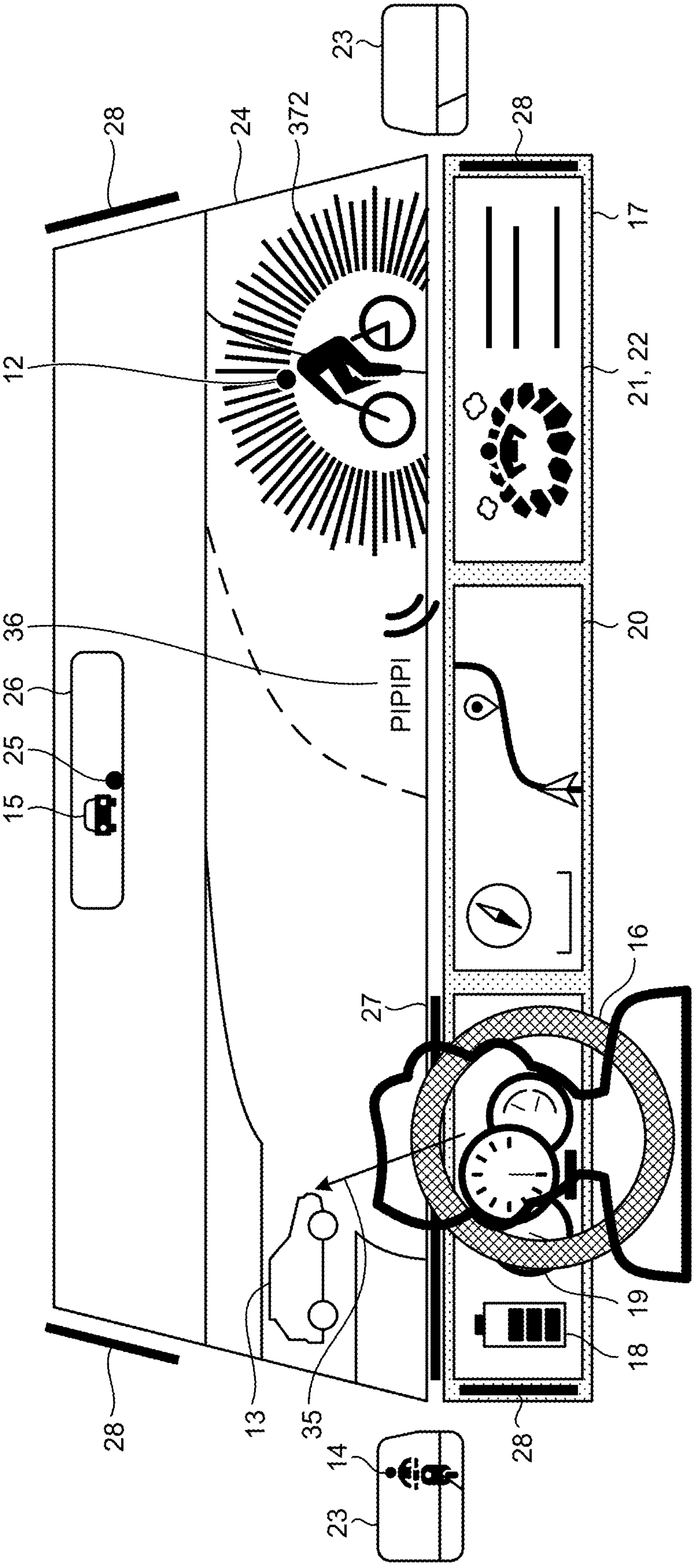
FIG. 9 is a schematic diagram illustrating another pattern of marker display.

FIGS. 8 and 9 illustrate other patterns of the marker display 37. FIG. 8 illustrates a state in which an arc-shaped animation marker 371 using an animation effect of reducing a radius centering on the dangerous object (the bicycle 12) is displayed around the dangerous object in order to attract the attention of the driver. In this example, the display of the arc-shaped animation marker 371 is controlled by (an optical system of a head-up display of) the information input/output unit 104 to form an image on a virtual image plane seemingly pasted to the ground.

Similarly, FIG. 9 illustrates a state in which a concentrated line 372 centering on the dangerous object (the bicycle 12) is displayed in order to attract the attention of the driver. In this example as well, the concentrated line 372 is formed as an image on a virtual image plane parallel to the ground seemingly pasted to the ground.

Figure 10:
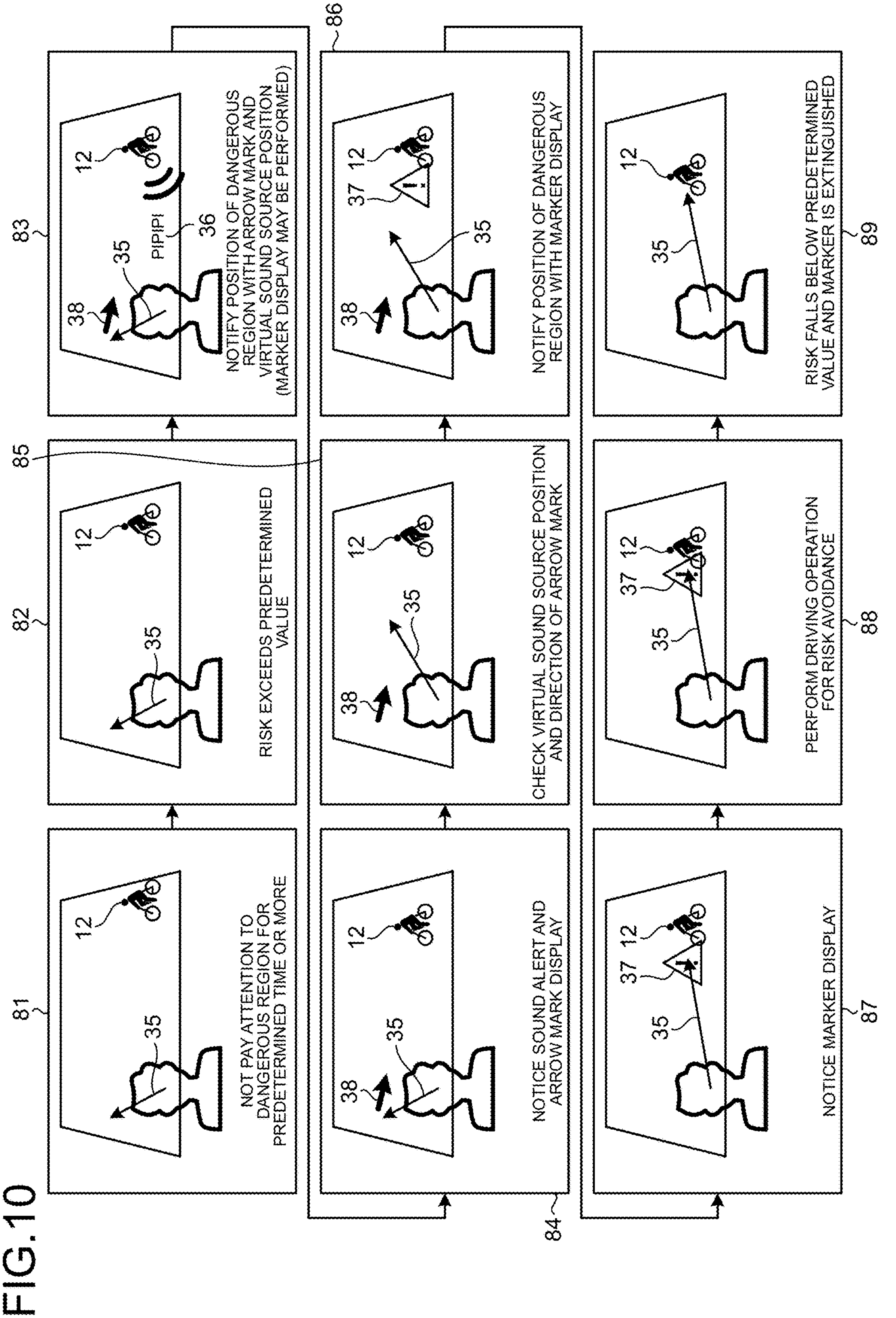
FIG. 10 is a diagram for describing an example of safe driving assist.

FIG. 10 is a diagram illustrating an example of safe driving assist. A specific example of the safe driving assist for the driver performed by the arithmetic operation unit 106 using the information input/output unit 104 is described in chronological order.

First, the arithmetic operation unit 106 determines that the driver does not direct, for an immediately preceding predetermined time or more, constant or more attention to a dangerous region including the bicycle 12 approaching from obliquely front right (an upper left part 81). Subsequently, the arithmetic operation unit 106 determines that the bicycle 12 has approached the vehicle 1 without being noticed by the driver and a predetermined risk is exceeded (a center upper part 82).

Subsequently, the arithmetic operation unit 106 uses (the space video projection device 27 of) the information input/output unit 104 to display the arrow mark 38 indicating the position of a dangerous center region (a dangerous region or a dangerous object) around the line-of-sight direction of the driver. The arithmetic operation unit 106 sets a virtual sound source position such that the sound alert 36 can be heard from the direction of the dangerous center region (the dangerous region or the dangerous object) and outputs the sound alert 36 from (the speaker 28 of) the information input/output unit 104 (an upper right part 83).

Marker display (the marker display 37) for calling attention to the dangerous center region may be simultaneously performed. The sound alert 36 may be continuously sounded longest until the marker display in the lower right part 89 is extinguished or may be output only once.

Subsequently, the driver notices the display of the arrow mark 38 and the sound alert 36 (a middle left part 84). The driver who noticed the display of the arrow mark 38 or the sound alert 36 starts to check the direction indicated by the arrow mark 38 and the direction of the virtual sound source position where the sound alert 36 sounds (a center middle part 85). Subsequently, the position of the dangerous center region is notified by the marker display 37 (a middle right part 86).

Subsequently, the driver notices the marker display 37 and notices the bicycle 12 present in the dangerous center region (or the dangerous region) (a lower left part 87). Subsequently, the driver performs driving operation for avoiding danger not to cause an accident with or to maintain a safe distance from the bicycle 12, which is the dangerous object noticed anew, (a lower center part 88). Finally, the risk of the bicycle 12, which has been the dangerous object, falls below a predetermined value and the marker display is extinguished (a lower right part 89).

Note that timing of the start or the end of the arrow mark 38, the marker display 37, and the sound alert 36 described here is an example. In the present disclosure, timings of notification, relative order, display positions, and positions of the virtual sound source of the arrow mark 38, the marker display 37, and the sound alert 36 may be different. For example, the arrow mark 38 may not be used, the sound alert 36 may sound, the marker display 37 may be performed next, and the sound alert 36 may be stopped at timing when the driver checks the sound alert 36 or at timing when the risk falls below a predetermined value, and the marker display 37 may be extinguished.

For example, a panel smaller than the windshield 24 may be installed in front of the driver, one or more of the windshield 24, the left and right side mirrors 23, the rear-view mirror 26, and the left and right windows may be laid out in an arrangement viewed from the driver's seat, and the arrow mark 38 and the marker display 37 may be performed therein. Alternatively, a virtual viewpoint video obtained by overlooking the surroundings of the own vehicle from above may be generated by the arithmetic operation unit 106 based on data acquired from the sensor unit 103 and/or the communication unit 108 and may be displayed on the information input/output unit 104 (for example, a video display unit in the vicinity of the cockpit 17). At this time, it is conceivable to plainly mark and display a dangerous object such that the driver can check at a glance where a dangerous object having a risk of a predetermined amount or more is present in the virtual viewpoint video.

Figure 11:
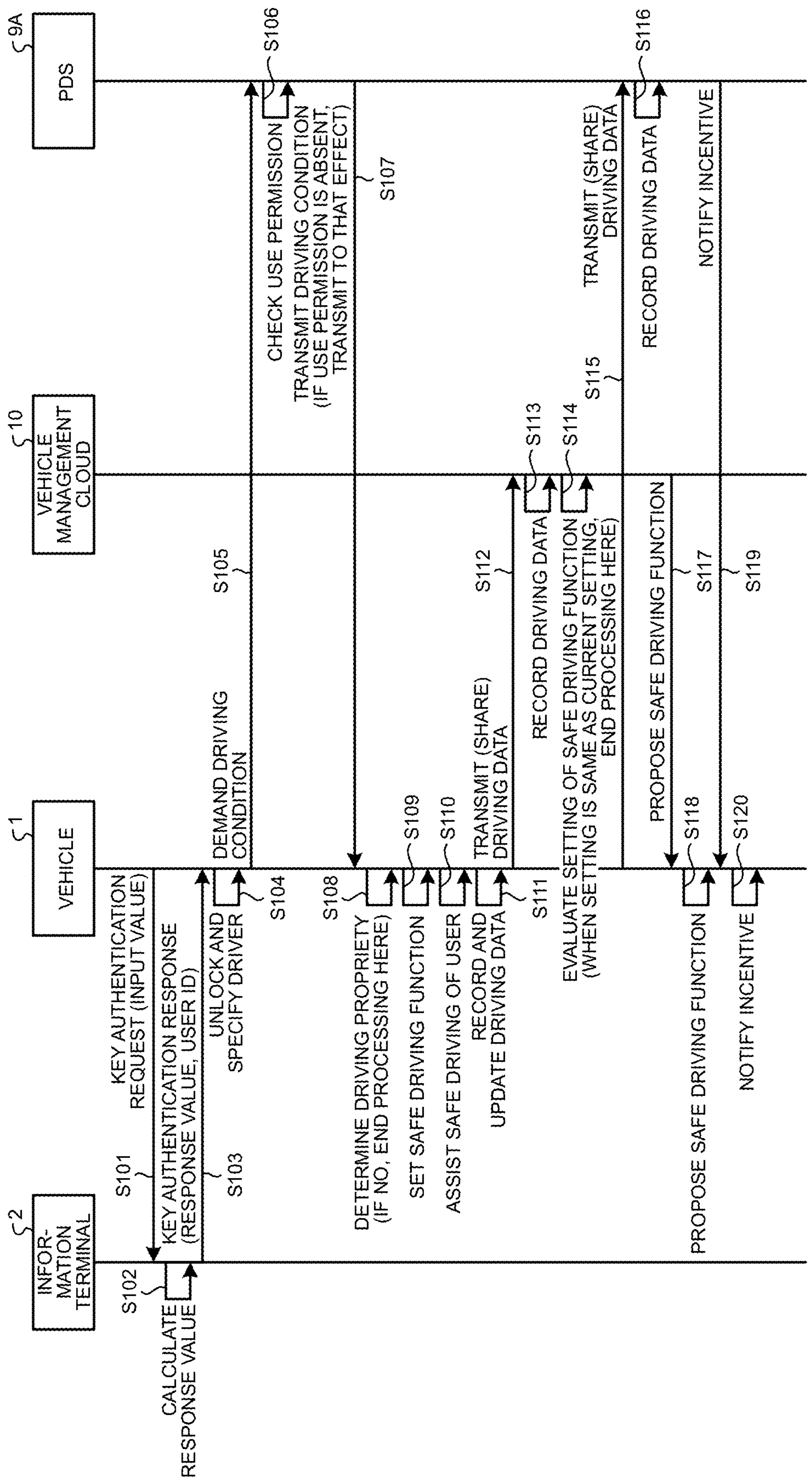
FIG. 11 is a sequence chart illustrating an example of safe driving assist.

FIG. 11 is a sequence chart illustrating an example of safe driving assist. Processing performed among the information terminal 2 (or an application; the same applies below) that stores electronic key information used for unlocking and starting the vehicle 1, the vehicle 1, the vehicle management cloud 10, and a personal data store (PDS) 9A that manages data concerning personal information, driving, and the like is described. As described above, as an actual state, the PDS 9A may be managed by (the application in) the personal information management cloud 9 in FIG. 1, may be managed by (the application in) the information terminal 2, or may be managed by (the application in) the vehicle 1. Note that, in the following description of the present embodiment, it is assumed that the PDS 9A is managed by the personal information management cloud 9.

The sensor (and/or the communication unit 108) of the vehicle 1, which has detected that the information terminal 2 and the vehicle 1 have approached within a distance in which proximity communication is possible or the information terminal 2 has approached within a predetermined distance from the door of the vehicle 1, starts authentication of the electronic key 7. The arithmetic operation unit 106 of the vehicle 1 transmits an input value including a random number to the information terminal 2 via the communication unit 108 (step S101).

The communication unit 206 of the information terminal 2 receives the input value and the arithmetic operation unit 204 calculates a response value corresponding to the input value (step S102). The arithmetic operation unit 204 of the information terminal 2 returns the response value and a user ID, which is identification information for identifying the user, to the vehicle 1 via the communication unit 206 (step S103).

The arithmetic operation unit 106, which has received the response value via the communication unit 108 of the vehicle 1, verifies whether the response value is an expected result. When the response value is an expected result, the arithmetic operation unit 106 of the vehicle 1 unlocks the door via the key control unit 105. Further, the arithmetic operation unit 106 of the vehicle 1 identifies the user having the user ID used for the unlocking as the driver (step S104).

Note that the arithmetic operation unit 106 of the vehicle 1 may perform personal identification of the user who is sitting in the driver's seat by using a sensor (such as a camera that performs image recognition) and may determine that the user ID of the user sitting in the driver's seat is the user ID of the driver. The arithmetic operation unit 106 may detect that the user whose user ID is used for unlock has sat in the driver's seat and determine this user as the driver.

When use permission of a driving condition is checked in the PDS 9A (step S106), the vehicle 1, which has identified the user ID of the driver, receives the driving condition (step S107) and determines whether the driver is capable of driving the vehicle (step S108). This is described in detail below.

The user can set a function (hereinafter, safe driving function) of the vehicle that assists safe driving enabled during driving (step S109). This is described in detail below.

While the user is driving, the vehicle assists the driving such that the user can safely drive with the safe driving function based on the setting (step S110). This is described in detail below.

The arithmetic operation unit 106 of the vehicle 1 records driving data including a history of driving operation of the driver in a memory or update the driving data (step S111). When the user approves the driving data, the vehicle 1 shares the driving data with the vehicle management cloud 10 and the PDS 9A as appropriate (step S112 and step S115).

The vehicle management cloud 10 records the driving data (step S113), evaluates a safe driving function for the user (step S114), and, in response to determining that new setting should be recommended, proposes the new setting to the user via the vehicle 1 (step S117). Processing concerning the proposal of the new safe driving function (step S118) using the vehicle management cloud 10 is described in detail below.

The PDS 9A, which has received the driving data, may record the driving data (step S116) and provide some incentive to the user via the vehicle 1 (or the information terminal 2) as a reward for the data provision (steps S119 to S120). As an example of this, an automatic change of an automobile insurance is described in detail below.

As described above, a cycle in which the information terminal 2, the vehicle 1, the vehicle management cloud 10, and the PDS 9A of the personal information management cloud 9 (or the information terminal 2 to the vehicle 1) cooperate to, when the user drives, appropriately assist safe driving of the user during the driving and propose a better service from a history of the driving starts for the first time.

The present disclosure is not limited to only plainly assisting safe driving of the user as appropriate with respect to dangerous objects around the vehicle using the space video projection device 27 and 3D stereophonic sound. By utilizing the driving data linked with the user accumulated using these, it is possible to smoothly implement, in a data-driven format based on the driving data of the user, determination of propriety of driving operation, proposal of setting/updating of a safe driving function, and cooperation with a third party service involved in vehicle driving.

Accordingly, even in various drivers and driving situations having problems in the safe driving described above, it is possible to perform driving mainly by oneself at ease while receiving assist of the safe driving function. With the technology of the present disclosure, it is expected to reduce social problems such as a problem in that it is difficult for a driver to sufficiently consider safe driving in an aging society, a problem in that a driver's license has to be returned because of a risk of causing an accident but this causes a significant trouble in actual life, and a problem in that an opportunity to go out decreases and deterioration of a cognitive function progresses.

FIG. 12 is a diagram illustrating an example of a data structure of driving data. The driving data is data indicating a driving history generated in accordance with driving for each user. In the following description, it is assumed that one record is added every time driving is performed and one record is added when the safe driving function of the vehicle operates (in other words, when the vehicle determines that a risk is a predetermined value or more). A pair of a field name and a data value described in the one record is described below.

In a date and time field, information indicating a date and time when this record was generated is recorded as a data value. In this example, expression is made by using the ISO8601 format such that the date and time of this record is 22:38:11 on Mar. 17, 2022 in Japan Standard Time.

In the next user ID field, a user ID for identifying a driver corresponding to this record is described. This may be replaced with information capable of identifying an individual such as a driver's license number. In the vehicle ID field, a vehicle ID (a chassis number) for identifying a vehicle corresponding to this record is described.

In a safe driving function field, validity/invalidity of the safe driving function of the vehicle 1 at the time of this driving or when the safe driving function operates or a setting value is described. As condition for outputting the sound alert 36 is described. As the condition, for example, the distance D illustrated in FIG. 3 is expressed in units of mm. In this example, it is indicated that the distance D to a dangerous object is 3000 mm. Note that this may represent a grace time until collision in units of msec.

The marker display 37 and the arrow mark 38 are described as false. Functions of both of the marker display 37 and the arrow mark 38 are disabled. When the functions are enabled, true is described here or conditions such as a distance and a grace time to be displayed like the sound alert 36 are described. Eight direction sensitivities represent thresholds of warning notifications for eight directions of vehicle front, obliquely front right, right, obliquely rear right, rear right, obliquely rear left, left, and obliquely front left in stages of 0 (low) to 9 (high). The obliquely rear left is set to 9 and, compared with other directions in which the sensitivities are smaller than 9, the warning notification is set to operate for a dangerous object present in the obliquely rear left even if the dangerous object is far from the vehicle.

This may be setting set by the user or calculated by the arithmetic operation unit 903 of the vehicle management cloud 10 that evaluates driving data and proposes a setting value of the safe driving function or the arithmetic operation unit 106 of the vehicle 1. When the vehicle management cloud 10 performs the setting, the setting may be performed, from information of an incident and accident report field of driving data in the past of the user, by statistical processing for setting a numerical value to be high for a direction in which a probability of safety consideration of the user being insufficient is high and setting a numerical value to be low for a direction in which the probability of the safety consideration of the user being insufficient is low.

In the incident and accident report field, a history of operation of the safe driving function of the vehicle 1 is described. In particular, when the vehicle 1 detects a risk of a predetermined risk or more, a positional relation between a vehicle state and a dangerous object at the time when the risk is determined is described.

Vehicle speed expresses the moving speed of the vehicle 1 at this time in units of Km/h. A steering angle expresses an angle of steering wheel operation of the vehicle 1 at this time in units of a degree. When the steering wheel 16 is turned to the right, the angle is a positive angle and, when the steering wheel 16 is turned to the left, the angle is a negative angle. A direction expresses a relative position of a target dangerous object in units of a degree as a clockwise angle from the front of the vehicle. 233 degrees in this example indicates an obliquely rear left direction of the vehicle 1.

A type indicates a type of the target object for which the risk has been detected. The type includes a person, a bicycle, a motorcycle, an ordinary passenger car, a large passenger car, a train, a traffic sign, a traffic light, a guardrail, a step on a road surface, and the like. In the example of FIG. 12, the type is recognized as the bicycle 12. In a distance, the distance D illustrated in FIG. 3 is indicated in units of mm. In this example, it is indicated that the distance is 187 mm. The distance may indicate a closest approach distance between the dangerous object and the vehicle 1 in units of mm.

A risk indicates an evaluation result of a risk based on an accident risk described below. In this example, it is indicated that the risk of this incident was medium. In the incident and accident report field, a valid data value is recorded when the safe driving function of the vehicle 1 operates. Otherwise, an invalid data value is recorded.

In a place field, information indicating a place where this record was generated is recorded as a data value. In the example of FIG. 12, latitude and longitude information is described in the format of ISO6709. Since the incident/accident report is valid in this place, a place where the incident/accident occurred is identified. When a valid data value is not recorded in the incident/accident report, that is, when the safe driving function of the vehicle 1 did not operate during driving, in this place field, a movement start place, a movement end place, or an invalid value may be described.

In a moving distance field, information indicating the total moving distance from the immediately preceding place where the safe driving function operated to the current place in units of Km is recorded as a data value. The example of FIG. 12 indicates that the current record was generated after movement of 10.8 Km from a place where the safe driving function operated last time. When a valid data value is not recorded in the incident and accident report field, the moving distance field records a total moving distance in this driving in units of Km.

FIG. 13 is a diagram illustrating an example of a level of a risk. In the present disclosure, as an indicator of comprehensive determination of an accident occurrence risk of the vehicle 1, determination of a risk is described in a form divided into four stages. Note that the determination of the risk may not be in the four stages and may be in two or more stages.

A high risk is a state with the risk is the highest as shown in a table. This is a state in which the arithmetic operation unit 106 of the vehicle 1 directly controls the movable unit 101 in order to perform immediate vehicle control for avoiding an accident. For example, in the example illustrated in FIG. 3, a state in which D≤Rc holds corresponds to this state. A high risk is a risk at which the vehicle 1 autonomously applies sudden braking for emergency stop.

A medium risk is a state in which the risk is the second highest after the high risk. The arithmetic operation unit 106 of the vehicle 1 notifies the user of danger via the information input/output unit 104 such that the user performs immediate vehicle control for avoiding an accident. The difference from "high" is that the arithmetic operation unit 106 does not directly control the movable unit 101 in order to avoid an accident. For example, in the example illustrated in FIG. 3, a state in which Rc<D≤Rc+Rb holds corresponds to this state. The medium risk is a risk at which the vehicle 1 warns the driver with the sound alert 36 or the like to immediately perform risk avoidance driving operation such as brake operation.

The low risk is a state in which the risk is lower than the medium risk and higher than the risk determined as safe. The low risk is a state in which the arithmetic operation unit 106 determines that there is no need for immediate vehicle control for avoiding an accident, although a dangerous object that can cause an accident is present within a constant range around the vehicle. For example, in the example illustrated in FIG. 3, the low risk is a state in which Rc+Rb<D≤(Rc+Rb)×K holds, where K is a setting value of the safe driving function larger than 1. The low risk is a risk that is not notified from the vehicle 1 to the driver at the present point in time like the risk determined as safe.

The risk determined as safe is a state in which the risk is the lowest. The risk determined as safe is a state in which the arithmetic operation unit 106 determines that there is no dangerous object that can cause an accident within a constant range around the vehicle. For example, in the example illustrated in FIG. 3, the risk determined as safe is a state in which (Rc+Rb)×K<D holds, where K is a setting value as described concerning the low risk. In the following description, the operation of the safe driving function of the vehicle 1 is described in a form in which the determination of the risk is divided into four stages.

Figure 14:
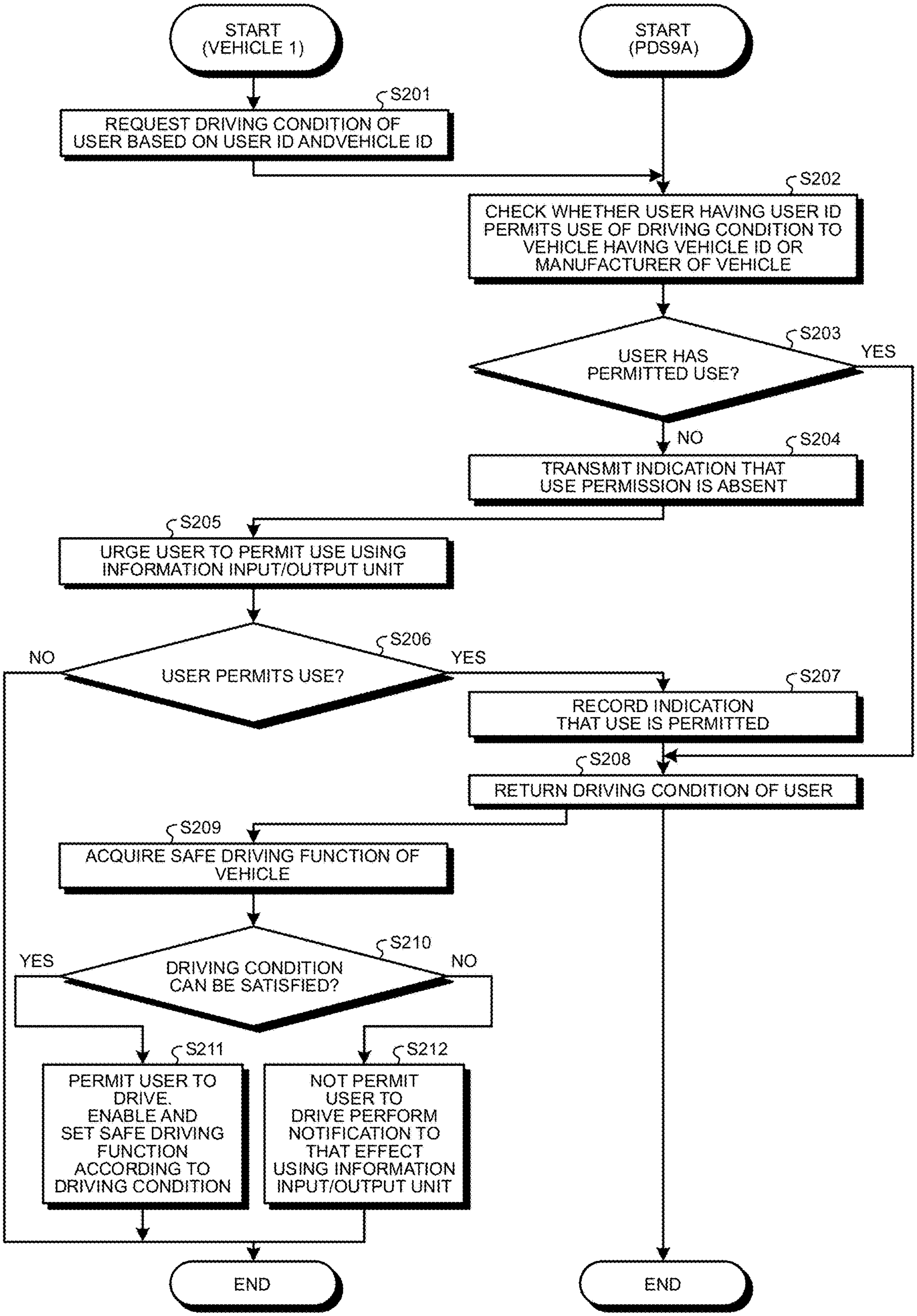
FIG. 14 is a flowchart illustrating an example of determining driving propriety based on a driving condition of a user.

FIG. 14 is a flowchart illustrating an example of determining driving propriety based on a driving condition of the user. This is a detail from the "demand driving conditions (step S105)" to the "determine driving propriety (step S108)" described with reference to FIG. 11.

The arithmetic operation unit 106 of the vehicle 1 that has identified the user ID of the driver in the processing to that point requests the PDS 9A (whose function is provided by the personal information management cloud 9, the information terminal 2, the vehicle 1, or an application operating in any device) for a driving condition corresponding to the user ID via the communication unit 108 (step S201). The request in step S201 includes a vehicle ID (and/or a manufacturer ID for identifying a manufacturer of the vehicle 1) for identifying the vehicle 1 that has made the inquiry.

Note that, when the PDS 9A is managed by the personal information management cloud 9 or an application operating therein, the PDS 9A is referred to as centralized PDS. In this case, data is collectively managed in a cloud provided by a management company for personal information. When the PDS 9A is managed by the information terminal 2, the vehicle 1, or an application operating therein, the PDS 9A is referred to as distributed PDS. In this case, the user collectively manages personal information on the information terminal 2 of the user.

The processing on the PDS 9A side is common in both the cases. Therefore, in the present disclosure, it is collectively described, without distinction, whether the PDS 9A is present on the personal information management cloud 9 as an embodiment, present on the information terminal 2, present on the vehicle 1, managed across two or more of these, or personal information of these is managed by an unspecified number of computers on a network using a distributed ledger technology.

That is, the computer (personal information management cloud 9) in the present embodiment may be one of multiple computers capable of communicating with one another via a network. Each of the multiple computers manages at least one of a driving characteristic database including driver's license information and permission information on a distributed ledger.

Note that, in the present disclosure, it is assumed that personal information of the user and information about driving and the like are managed by the PDS 9A. However, as long as an equivalent mechanism for managing third party use of equivalent information based on personal permission is provided, the information management may not be carried out in the PDS 9A.

The arithmetic operation unit 903 of the PDS 9A, which has received the request in step S201 via the communication unit 901, accesses the memory 902 and checks whether the user having the user ID has permitted use of driving condition information of the user to the vehicle 1 having the vehicle ID (or a manufacturer of the vehicle) (step S202).

If the user has not permitted the use (step S203: No), the arithmetic operation unit 903 transmits, to the vehicle 1, via the communication unit 901, indication that there is no use permission (step S204). The arithmetic operation unit 106 of the vehicle 1, which has received this via the communication unit 108, performs a notification, using the information input/output unit 104, such that the user permits the use (step S205).

When the user permits the use, the arithmetic operation unit 106 of the vehicle 1 notifies the PDS 9A to that effect via the communication unit 108 (step S206: Yes). The PDS 9A having received this notification records, in the memory 902 thereof, indication that the user has permitted the use of the driving condition information to the vehicle ID (or the manufacturer ID) (step S207). Then, the PDS 9A reads the driving condition information of the user having the user ID from the memory 902, and returns the driving condition information to the vehicle 1 via the communication unit 901 (step S208).

Thus, the driving characteristic information (the driving condition information) is acquired from the driving characteristic database (the PDS 9A) managed in the computer with which the first communication circuit (the communication unit 108 of the vehicle 1) can communicate. Driving characteristic data of users acquired from vehicles is accumulated in the driving characteristic database.

When the user does not permit the use (step S206: No), the arithmetic operation unit 106 of the vehicle 1 ends the processing here.

When the arithmetic operation unit 903 of the PDS 9A has successfully confirmed the use permission (step S203: Yes), the arithmetic operation unit 903 reads the driving condition information of the user having the user ID from the memory 902, returns the driving condition information to the vehicle 1 via the communication unit 901 (step S208), and ends the processing.

The arithmetic operation unit 106 of the vehicle 1, which has received the driving condition information of the user via the communication unit 108, acquires the safe driving function of the vehicle 1 (step S209). Then, the arithmetic operation unit 106 compares the driving condition information of the user and the safe driving function of the vehicle 1 and determines whether the driving condition can be satisfied (step S210).

In response to determining that the driving condition can be satisfied (step S210: Yes), the arithmetic operation unit 106 of the vehicle 1 permits the user to drive the vehicle 1 (step S211). Further, the arithmetic operation unit 106 enables the safe driving function of the vehicle 1 in accordance with the driving condition information, appropriately sets parameters of the safe driving function with respect to the driving condition information of the user, and ends the processing.

In response to determining that the driving condition cannot be satisfied (step S210: No), the arithmetic operation unit 106 of the vehicle 1 does not permit the user to drive the vehicle 1 (step S212). Further, the arithmetic operation unit 106 notifies a reason for this to the user using the information input/output unit 104 (for example, a cockpit monitor) and ends and the processing.

In the driving characteristic database (the PDS 9A) of the present embodiment, a plurality of user IDs for identifying a plurality of users and driving characteristic data including driver's license information of the plurality of users are accumulated in correlation with each other. Moreover, the computer (the personal information management cloud 9 or the information terminal 2) stores, in the memory, in correlation with one another, the plurality of user IDs, a plurality of vehicle IDs for identifying a plurality of vehicles, and permission information indicating which vehicle among those vehicles each of the users has permitted access to the driving characteristic data of the vehicle. When the computer determines, based on the user ID of the driver, the vehicle ID of the vehicle, and the permission information, that the driver has permitted the access to the driving characteristic data of the driver by the vehicle, the vehicle acquires the driving characteristic data of the driver.

Note that, in the above-described embodiment, although determination is performed as to whether the driving condition is satisfied, the present disclosure is not limited to this. When a driving skill of the user is less than a predetermined value or a predetermined condition is imposed on the driver's license of the user, the information may be transmitted (broadcast) to road equipment such as vehicles and traffic lights in the periphery.

The vehicle control method of the present embodiment acquires, from the storage device (memory 107) of the vehicle 1, a function list indicating two or more driving assist functions implemented on the vehicle 1 and transmits vehicle information and an alert matter to one or more other vehicles in response to determining, based on the driving characteristic information and the function list, that level of the driving skill of the driver is less than a reference value and there is no necessary assist function for compensating for the insufficiency of the driving skill among the driving assist functions.

In this case, vehicle information for identifying the vehicle that has transmitted this information is transmitted. The vehicle information may include at least one of vehicle model information, number information, color information, current position information, and travel lane information (a group selected from the current position).

Note that the vehicle in the periphery, which has received the information, may display the information on the monitor of the cockpit and notify the driver of the information. Accordingly, an appropriate inter-vehicle distance and the like can be taken and can contribute to safe driving. In a case where the vehicle in the periphery, which has received this information, is an automatic driving vehicle and when a vehicle that has transmitted this information can be identified, an inter-vehicle distance may be taken more than usual from the vehicle, driving control may be performed to change a route and move away from the vehicle, or a driving plan may be corrected.

In this manner, using the driving condition information recorded in the PDS 9A of the user, the arithmetic operation unit 106 of the vehicle 1 acquires and determines whether the user can drive the vehicle 1 and what kind of safe driving function has to be enabled or set even when the user can drive the vehicle 1.

Accordingly, driving can be performed only with the vehicle 1 in which a necessary safe driving function is available. In other words, the user can be prevented from driving the vehicle 1 in which the safe driving function necessary for the user is not available. This should be determined in accordance with a safe driving skill of the user. Therefore, it is desirable that the driving condition information is managed by the PDS 9A that can securely collectively manage the user's personal information and the like and can restrict access from a third party.

Note that the driving condition may be determined not only based on information with a relatively gentle change with time managed by the PDS 9A but also taking into account a result of alcohol concentration measurement by exhalation collection of the user immediately before the start of driving.

The personal information managed by the PDS 9A is described as the driving condition information for each user. However, the driving condition information may be information expressed or recorded in the driver's license of the user. For example, the driving condition information may include type information of a driver's license such as a limited conditional license (as an example, an assist car limited license) such as a safe driving assist vehicle and a large vehicle license, condition information for driving (as an example, glasses), an acquisition date and an expiration date of the driver's license, an address and a face photograph image of the user, and the like.

Further, the driving condition information may include the driving data of the user described with reference to FIG. 12 or driving skill information of the user indexed based on the driving data. In other words, the driving skill information is information obtained by evaluating, based on a predetermined standard, from driving data or the like, and quantifying driving skills of the user such as how much accident risk there is when the user drives, what kind of accident risk is high, what kind of traffic violation risk is high, and how much the situation around the vehicle can be recognized.

In the above description, it is assumed that the user cannot drive when the driving condition is not satisfied. However, the present disclosure is not limited to this. When driving is permitted from the expiration date of the driver's license of the user and the type of the vehicle permitted for driving but only the safe driving function is insufficient, a restriction may be added, although the driving itself is permitted.

For example, it is conceivable that maximum speed is limited to 80% of speed permitted by law (for example, if the maximum speed is 60 Km/h, the speed is limited to 48 Km/h), maximum speed of the vehicle is set (for example, 40 Km/h) such that the speed cannot be increased even if the user steps on the accelerator at or above the maximum speed, a range of a destination that can be set by the user in a car navigation system is limited to within a predetermined distance range from the user's home (for example, setting is possible when the distance is within a range of 100 km from home), the range is limited to a predetermined region including the user's home or an administrative unit (for example, setting is possible in a municipality where one's home is located), or a route (a road) available in the car navigation system is narrowed such that the vehicle cannot travel other than a specific safe route.

Further, when only the safe driving function described above is insufficient, the vehicle 1 may output, to the outside, visual information indicating that the safe driving function is insufficient. This may be, for example, a specific form capable of identifying presence or absence of light emission, a color of the light emission, and a blinking interval of a brake lamp, a blinker, a headlight, a license plate, and other lighting mechanisms of the vehicle 1 can be identified.

Next, a vehicle control method of the present embodiment is described. The vehicle control method of the present embodiment is a vehicle control method for controlling a vehicle communicable with one or more other vehicles located in the periphery, the vehicle control method including acquiring driving characteristic information indicating a driving characteristic of a driver via a first communication circuit mounted on the vehicle, determining, based on the driving characteristic information, whether there is an alert matter to be notified to the one or more other vehicles concerning the driving characteristic of the driver, and transmitting, in response to determining that there is the alert matter, vehicle information for identifying the vehicle and the alert matter to the one or more other vehicles located in the periphery of the vehicle via a second communication circuit mounted on the vehicle. The driving characteristic information is information indicating a driving skill of the driver or information about a driver's license of the driver, and the alert matter is information indicating that a level of the driving skill is less than a reference value or information indicating that there is a constraint condition on the driver's license.

Figure 15:
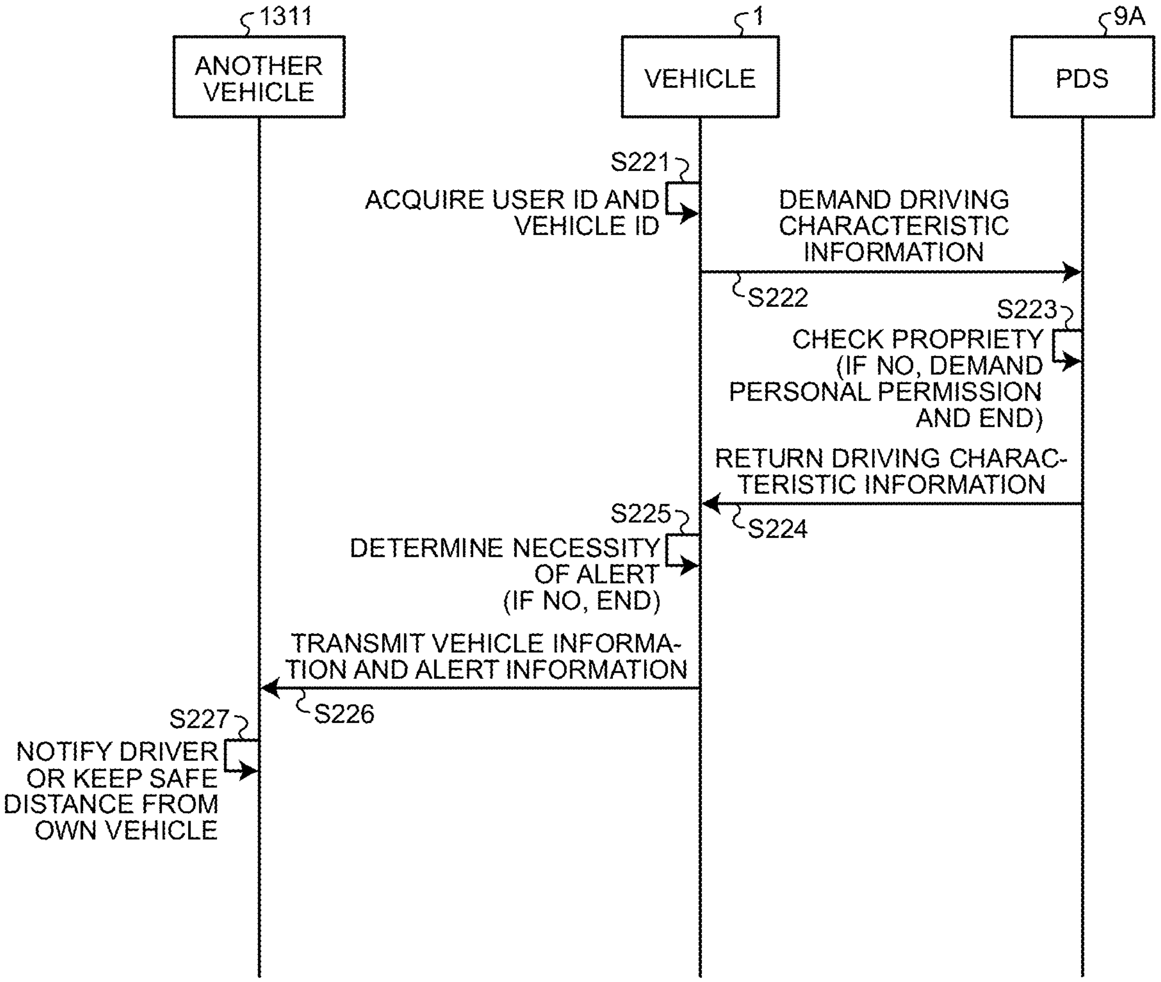
FIG. 15 is a sequence chart in a case of alerting another vehicle based on driving characteristic information.

FIG. 15 is a sequence chart in the case in which an alert is given to another vehicle based on driving characteristic information. The driving characteristic information is information indicating a driving skill of the driver acquired via the terminal (the information terminal 2) of the driver or from the storage device (the memory 107) mounted on the vehicle 1. In addition, the driving characteristic information is information of the driver's license of the driver acquired via an IC card or a terminal owned by the driver. When an assist car limitation condition is given to the information of the driver's license, determination is made such that there is an alert matter.

As illustrated in FIG. 15, after acquiring the user ID of the driver and the vehicle ID (step S221), the arithmetic operation unit 106 of the vehicle 1 demands the driving characteristic information from the PDS 9A (or the memory 107 of the vehicle 1) (step S222). The PDS 9A checks whether the user indicated by the user ID can use his/her own driving characteristic information (driving data information in the past, information of the driver's license, or the like) with respect to the vehicle indicated by the vehicle ID (step S223), and returns the driving characteristic information when it is confirmed that the use is permitted (step S224). When the use is not permitted, the PDS 9A may return an error and the arithmetic operation unit 106 of the vehicle 1 may perform confirmation to permit the user the use via the information input/output unit 104.

The vehicle 1, which has acquired the driving characteristic information, determines whether there is a matter to be alerted to another vehicle 1311 for safe driving (step S225). This determination may be made as described with reference to FIG. 16 or may be made based on another condition. When an alert requirement varies depending on time and a place, a request for checking alert necessity may be issued to a computer on a network to perform the determination.

When it is not determined that the alert to the other vehicle is necessary, the arithmetic operation unit 106 ends the processing (step S225). If necessary, the arithmetic operation unit 106 periodically broadcasts (transmits) vehicle information for identifying the vehicle and information to be notified to other vehicles or road equipment (step S226). The other vehicle 1311, which has received the information, notifies the driver of the information in the case of manned driving (step S227). When the other vehicle 1311 is an automatic driving vehicle, the other vehicle 1311 performs driving control to make an inter-vehicle distance wider than usual to maintain a safe distance such that the vehicle can pass safely (step S227).

Figure 16:
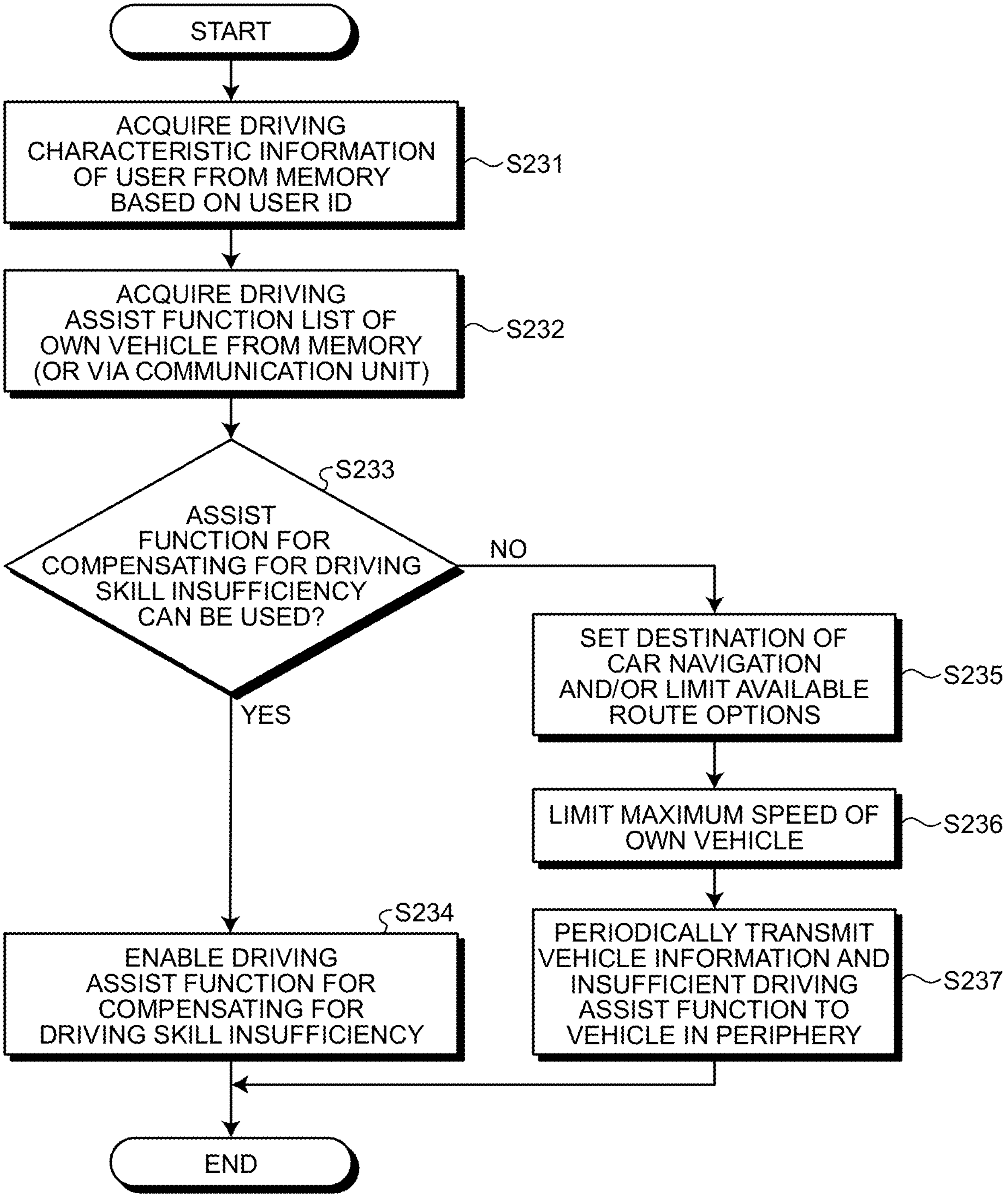
FIG. 16 is a flowchart illustrating a processing flow for assisting safe driving.

FIG. 16 is a flowchart illustrating a processing flow for assisting safe driving.

The arithmetic operation unit 106 of the vehicle 1 acquires driving characteristic information (driving skill information) of the user from the memory based on the user ID of the driver (step S231). Further, the arithmetic operation unit 106 of the vehicle 1 acquires, from the memory 107, list information of driving assist functions provided in the vehicle (step S232). Note that the arithmetic operation unit 106 of the vehicle 1 may acquire the driving characteristic information and/or the list information of the driving assist functions not from the memory but from another computer on the network such as the PDS 9A or the vehicle management cloud 10 via the communication unit 108.

Subsequently, the arithmetic operation unit 106 of the vehicle 1 determines, from the driving skill information of the user, whether the user has a driving skill that can be assisted by the driving assist function provided in the vehicle (step S233). In the case of Yes (step S233: Yes), the arithmetic operation unit 106 selects a corresponding driving assist function to compensate for driving skill insufficiency and enables the driving assist function (step S234). Accordingly, the user can drive while complementing a driving skill of a necessary part. Then, the arithmetic operation unit 106 ends the processing.

On the other hand, in the case of No (step S233: No), it is concerned whether safe driving can be performed. In this case, as described above, the arithmetic operation unit 106 of the vehicle 1 provides a predetermined constraint on setting of a destination of the car navigation system or narrows a road that can be passed only to a road to which constant or more safety design applied (a road width of a predetermined amount or more, a section where a guardrail is present, an accident occurrence amount is statistically equal to or less than a given amount, and the like) (step S235). This makes it possible to avoid driving in an unfamiliar place and to suppress a risk of occurrence of an accident by not passing on a dangerous road.

The arithmetic operation unit 106 of the vehicle 1 also has an effect in suppressing (limiting) the maximum speed of the vehicle to the predetermined speed as described above (step S236). The arithmetic operation unit 106 of the vehicle 1 may set legal maximum speed for each road as the maximum speed at which the vehicle can drive, may set maximum speed lower than the legal maximum speed, or may uniformly determine the maximum speed.

Further, in order to notify that a vehicle requiring safe driving is present among vehicles in the periphery, the arithmetic operation unit 106 of the vehicle 1 periodically transmits, to vehicles in the periphery and road equipment via wireless communication (the communication unit 108), vehicle information for identifying the own vehicle and information indicating that, for example, a driving assist function is insufficient or a driver's license has a specific restriction condition (step S237).

The vehicle control method in the present embodiment described above restricts a navigation function of the car navigation system mounted on the vehicle 1 in response to determining that a necessary assist function is absent or insufficient among driving assist functions. The restriction of the navigation function includes restricting a destination that can be set by the driver, restricting a route that can be set by the driver, or alerting the driver to restrict the maximum speed of the vehicle 1 to a predetermined value or less. Then, the arithmetic operation unit 106 ends the processing.

Note that a traffic light for vehicles, which is road equipment that has received this information, may adjust signal switching timing or restrict vehicle passage in a specific direction such that the vehicle can pass safely. For example, the traffic light may adjust timing of the signal such that the vehicle can turn to the right or the left for a longer time than usual such that the vehicle can safely turn to the right or the left when the vehicle enters an intersection to turn to the right or the left. A traffic light in a crosswalk may also adjust switching timing of the traffic light of the crosswalk in order to assist safe traveling of the vehicle. For example, while the vehicle crosses the crosswalk, it is conceivable to change the crosswalk to red to prevent pedestrians from crossing the crosswalk.

Figure 17:
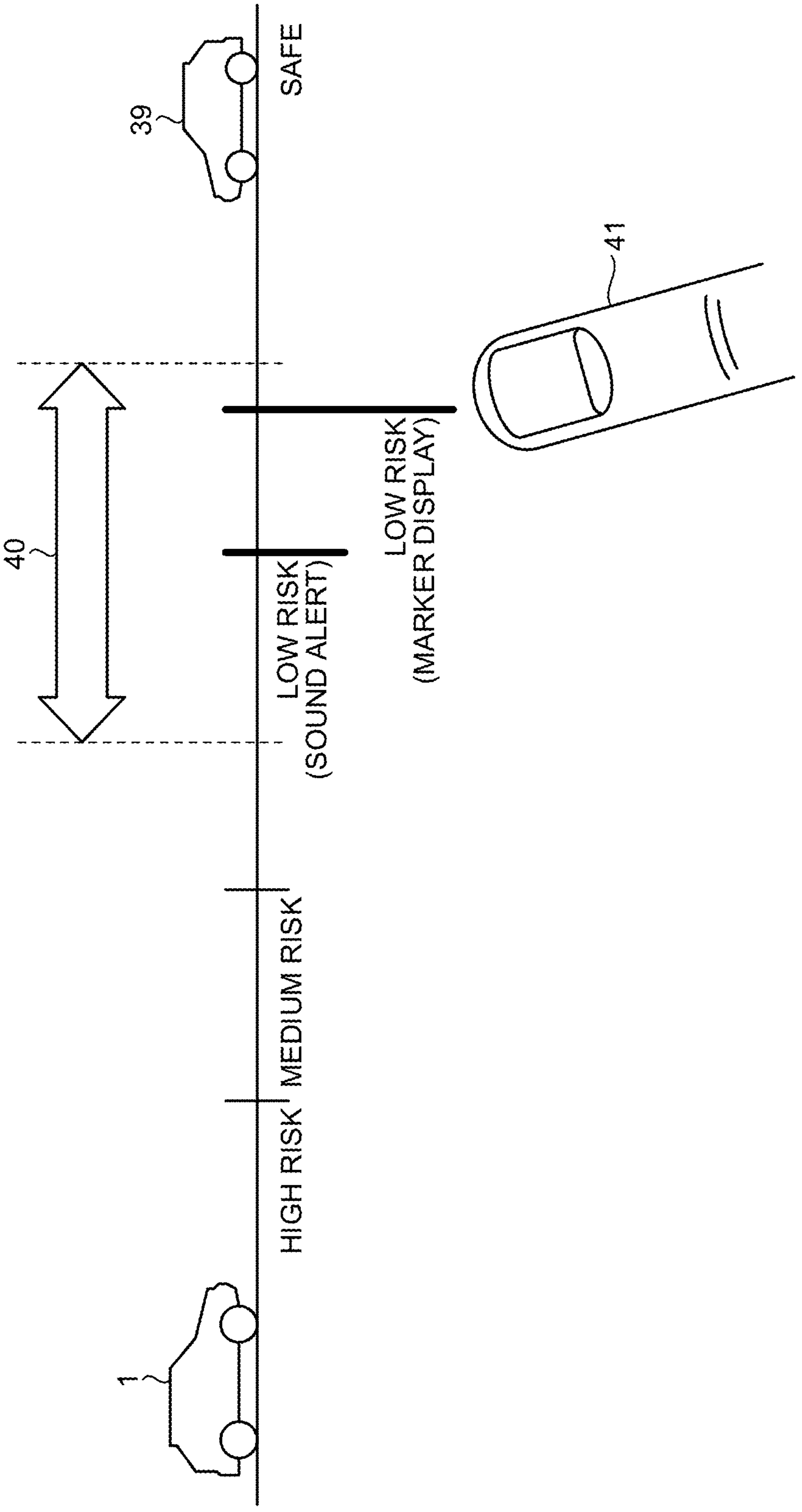
FIG. 17 is a diagram illustrating an example in which the user sets a safe driving function.

FIG. 17 is a diagram illustrating an example in which the user sets a safe driving function. FIG. 17 illustrates a detail of "set a safe driving function (step S109)" of FIG. 11. In the example of FIG. 17, conditions for the sound alert 36 and the marker display 37 notified at the time of a low risk being output from the information input/output unit 104 are set. The conditions are divided into four stages of a high risk, a medium risk, a low risk, and safe in accordance with the distance from the left vehicle 1 to a dangerous object 39 (or a collision postponed time or the like).

A state in which the user individually adjusts a distance at which the sound alert 36 notified at the time of the low risk among the four stages is output, a distance at which the marker display 37 is output, and a distance at which the arrow mark 38 is displayed in an adjustable range 40 is illustrated.

By sliding a screen of the information input/output unit 104 while touching the screen with a finger 41, the user can freely set the distance at which the sound alert 36 sounds, the distance at which the marker display 37 is performed, and the distance at which the arrow mark 38 is displayed. It is assumed here that the arrow mark 38 is disabled and is not displayed on the setting screen. By individually setting the warning output conditions in this way, it is possible to apply setting desired by the user.

Figure 18:
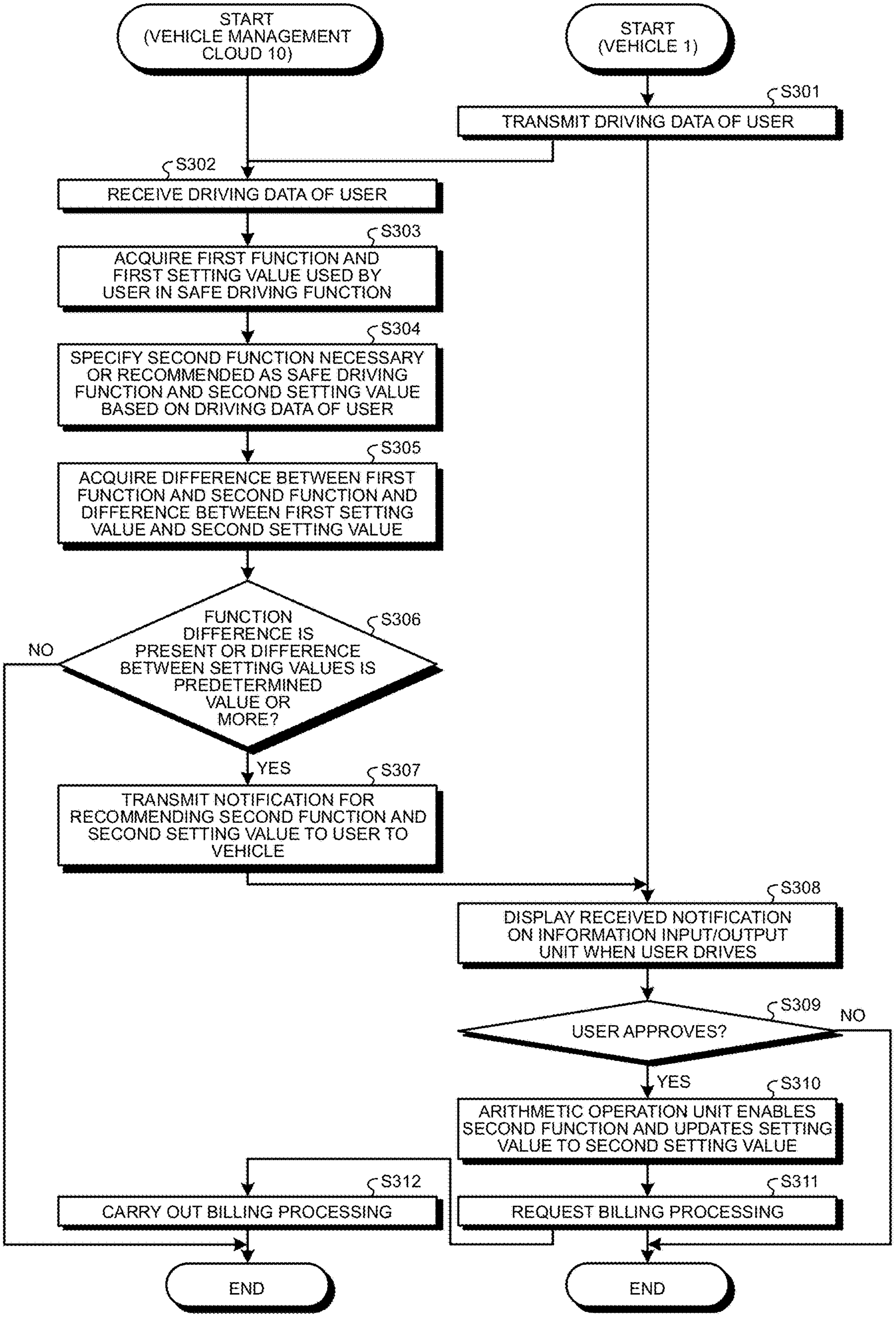
FIG. 18 is a flowchart illustrating an example of updating the safe driving function based on driving data.

FIG. 18 is a flowchart illustrating an example of updating the safe driving function based on driving data. FIG. 18 is a detail of "set a safe driving function (step S109)" of FIG. 11. A scenario in which the vehicle management cloud 10 determines a recommended safe driving function based on driving data and notifies the vehicle 1 of the determined safe driving function is described.

First, the arithmetic operation unit 106 of the vehicle 1 transmits driving data of the user identified by the user ID to the vehicle management cloud 10 during driving and/or after a driving end via the communication unit 108 (step S301).

The vehicle management cloud 10 receives the driving data of the user (step S302). The arithmetic operation unit 903 of the vehicle management cloud 10 acquires a first function currently used as a safe driving function by the user and a first setting value, which is a setting value of the first function, from a safe driving function field of the received driving data (step S303). For example, the first function is the currently used sound alert 36.

The arithmetic operation unit 903 of the vehicle management cloud 10 determines, based on driving data of the user within a predetermined period, a second function required or recommended as a safe driving function to the user and a second setting value that is a setting recommendation value of the second function (step S304). For example, the second function means the sound alert 36 that is currently used and the marker display 37 that is not currently used but is recommended anew.

Then, the vehicle management cloud 10 acquires the difference between the first function and the second function and the difference between the first setting value and the second setting value (step S305). The vehicle management cloud 10 determines whether there is the difference between the first function and the second function or whether the difference between the first setting value and the second setting value is a predetermined value or more (step S306). In response to determining that the first function and the second function are the same and the difference between the first setting value and the second setting value is less than the predetermined value (step S306: No), the vehicle management cloud 10 ends the processing of the vehicle management cloud 10. In this case, the vehicle 1 also ends the processing without generating new processing.

When the first function and the second function are different or the difference between the first setting value and the second setting value is equal to or more than the predetermined value (step S306: Yes), the vehicle management cloud 10 transmits a notification for recommending the second function and the second setting value to the user to the vehicle 1 via the communication unit 901 (step S307).

The arithmetic operation unit 106 of the vehicle 1, which has received this notification via the communication unit 108, causes (the cockpit monitor or the like of) the information input/output unit 104 to display the received notification when the user having the user ID is driving or starts driving (step S308).

When the user does not approve this (step S309: No), the vehicle 1 ends the processing. In this case, the vehicle management cloud 10 also ends the processing without generating new processing. When the user approves (step S309: Yes), the arithmetic operation unit 106 of the vehicle 1 enables the second function and sets or updates the setting value of the second function to the second setting value (step S310).

When new billing processing is required for the change to the second function and the second setting value, the arithmetic operation unit 106 of the vehicle 1 requests the billing processing to the vehicle management cloud 10 (step S311) and ends the processing. The vehicle management cloud 10 receives the request via the communication unit 901, carries out the billing processing based on settlement information of the user registered in advance (step S312), and ends the processing.

In the vehicle control method according to the present embodiment, the necessary function information indicating a necessary assist function is transmitted to a second computer (the vehicle management cloud 10) that manages distribution of driving assist applications via a first communication circuit (the communication unit 108), in response to determining that a necessary assist function is absent among driving assist functions or is insufficient. Then, in response to determining, based on the necessary function information, that the second computer has the first application (a second function) corresponding to the necessary assist function among the driving assist applications, recommendation information for recommending to introduce a first application into a vehicle is acquired from the second computer. Thereafter, a message for recommending to introduce the first application into the vehicle is presented based on the recommendation information, to a driver via a display or a speaker provided in the vehicle 1. When the driver agrees to the message, the first application is installed in the vehicle 1.

As described above, the required or recommended safe driving function can be enabled or the setting value thereof can be updated based on the driving data. In order to use this safe driving function, the user pays a usage fee to a vehicle manufacturer depending on necessity. When the safe driving function of the vehicle 1 is implemented by software, it is conceivable that a new safe driving function is added after purchase of the vehicle or the function is improved. In such a case, the mechanism described above is considered to effectively work.

In the processing described above, the vehicle management cloud 10 may transmit a change proposal for the safe driving function to the information terminal 2 and, when the user accepts the change proposal on the information terminal 2, the information terminal 2 may demand the vehicle 1 to change the safe driving function.

If the enabling of the second function is an essential condition for driving, the user may be notified to that effect via the information input/output unit 104. The driving of the user may not be permitted unless the user's consent is obtained.

Figure 19:
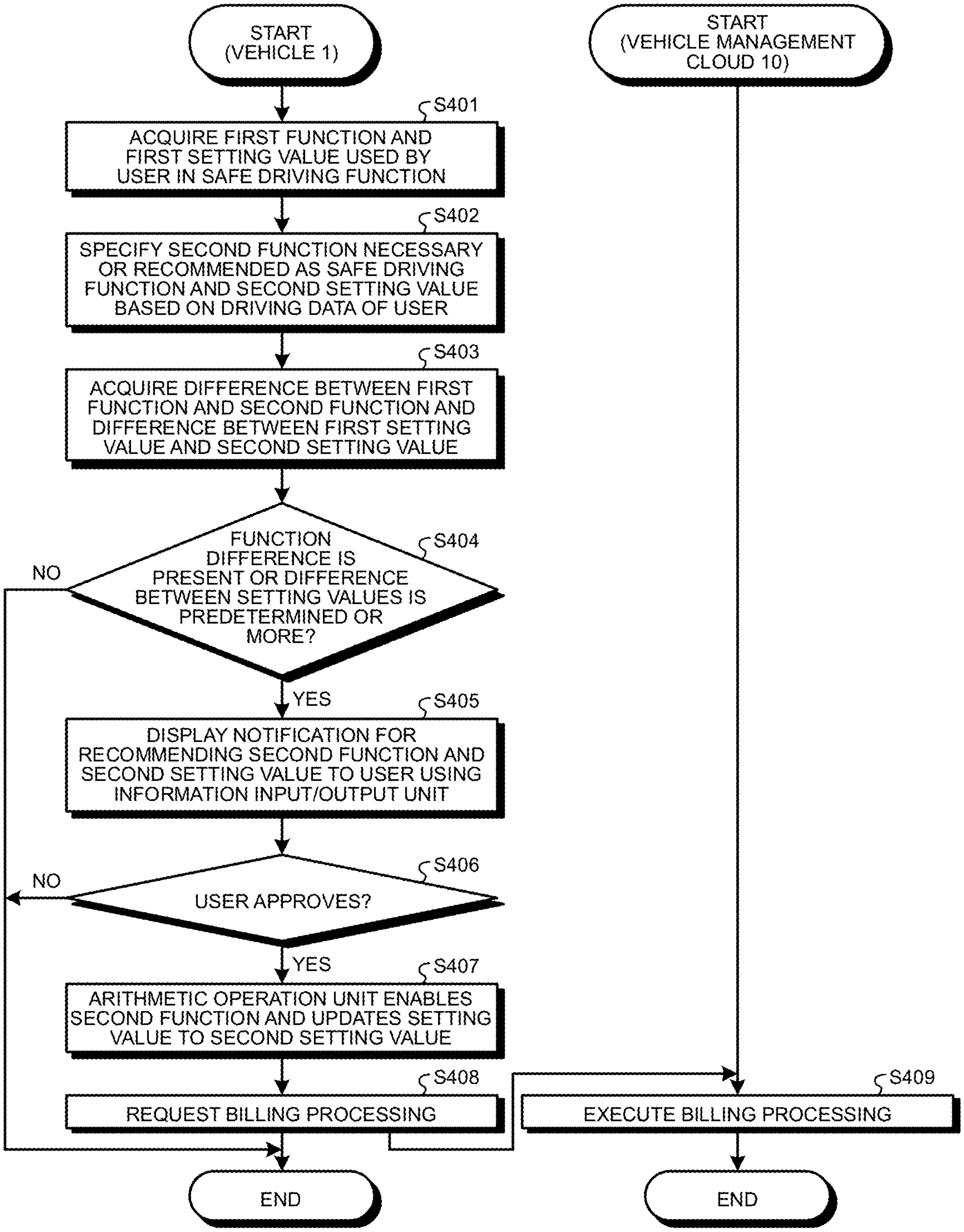
FIG. 19 is a flowchart illustrating an example of updating the safe driving function based on driving data.

FIG. 19 is a flowchart illustrating an example of updating the safe driving function based on driving data. FIG. 19 is a detail of "Set a safe driving function (step S109)" of FIG. 11. In the example of FIG. 19, a scenario in which the vehicle 1 determines a recommended safe driving function based on driving data and proposes the determined safe driving function to the user is described. The processing here is equivalent to the processing in FIG. 18 with the exception that an entity that performs the processing is different. Therefore, the processing is described while being partially omitted.

First, the arithmetic operation unit 106 of the vehicle 1 acquires a first function and a first setting value currently used by the user identified by the user ID (step S401). Further, the arithmetic operation unit 106 of the vehicle 1 determines, based on driving data of the user within a predetermined period, a second function and a second setting value that are necessary or recommended as the safe driving function (step S402). Further, the arithmetic operation unit 106 of the vehicle 1 acquires the difference between the functions and the difference between the setting values as described above (step S403).

Subsequently, the arithmetic operation unit 106 of the vehicle 1 determines whether there is the difference between the functions or whether the difference between the setting values is equal to or more than a predetermined value as described above (step S404). In a case of step S404: No, the arithmetic operation unit 106 ends the processing. In the case of step S404: Yes, the arithmetic operation unit 106 performs, using the information input/output unit 104, notification for recommending the user a change to the second function and the second setting value (step S405).

When the user does not approve this (step S406: No), the arithmetic operation unit 106 ends the processing. When the user approves (step S406: Yes), the arithmetic operation unit 106 enables the second function and sets or updates the setting value to the second setting value (step S407). Then, the arithmetic operation unit 106 requests the billing processing to the vehicle management cloud 10 depending on necessity (step S408). The vehicle management cloud 10, which has received the request, carries out settlement processing (step S409) and ends the processing.

Figure 20:
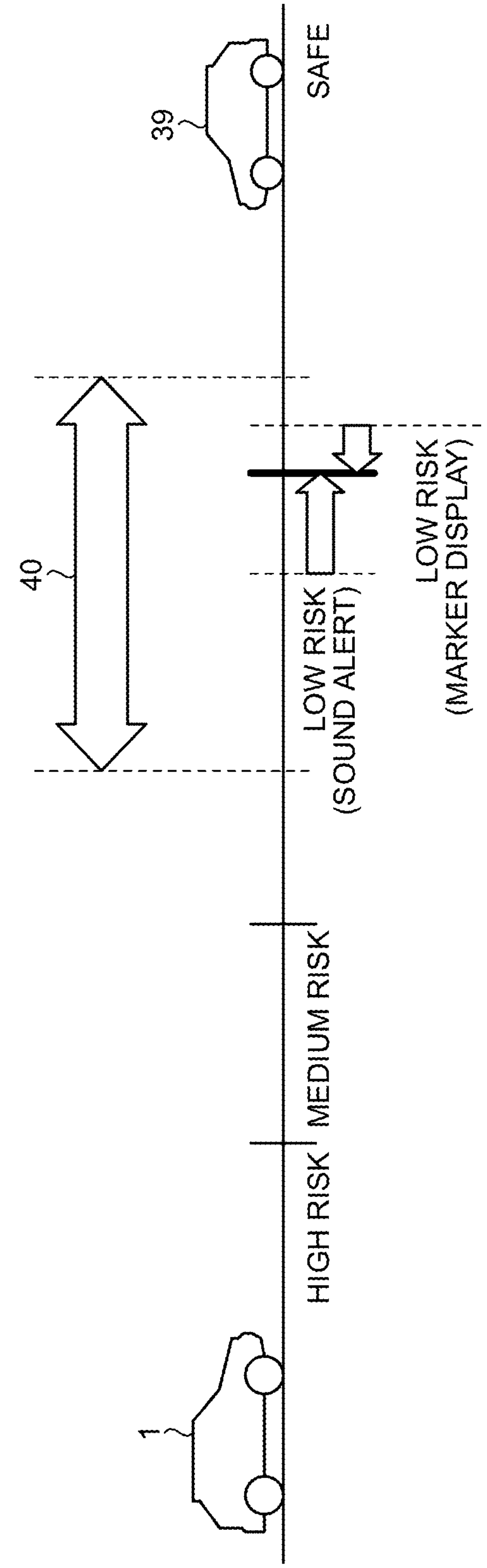
FIG. 20 is a diagram illustrating an example of updating the safe driving function based on driving data.

FIG. 20 is a diagram illustrating an example of updating the safe driving function based on driving data. FIG. 20 is a detail of "Set a safe driving function (step S109)" of FIG. 11. In FIG. 20, the arrow mark 38 remains disabled, the sound alert 36 is updated to be output even at a longer distance, and the marker display 37 is updated to be output at the same distance as the distance of the sound alert 36.

The sound alert 36 and the marker display 37 are used as the first function and the second function is not changed to indicate that the setting recommendation value thereof is changed based on the second setting value. As described above, the safe driving function of the vehicle 1 is updated based on the approval of the user to automatically improve safety based on the driving data. Further, billing processing related thereto can also be smoothly implemented by the present disclosure.

Figure 21:
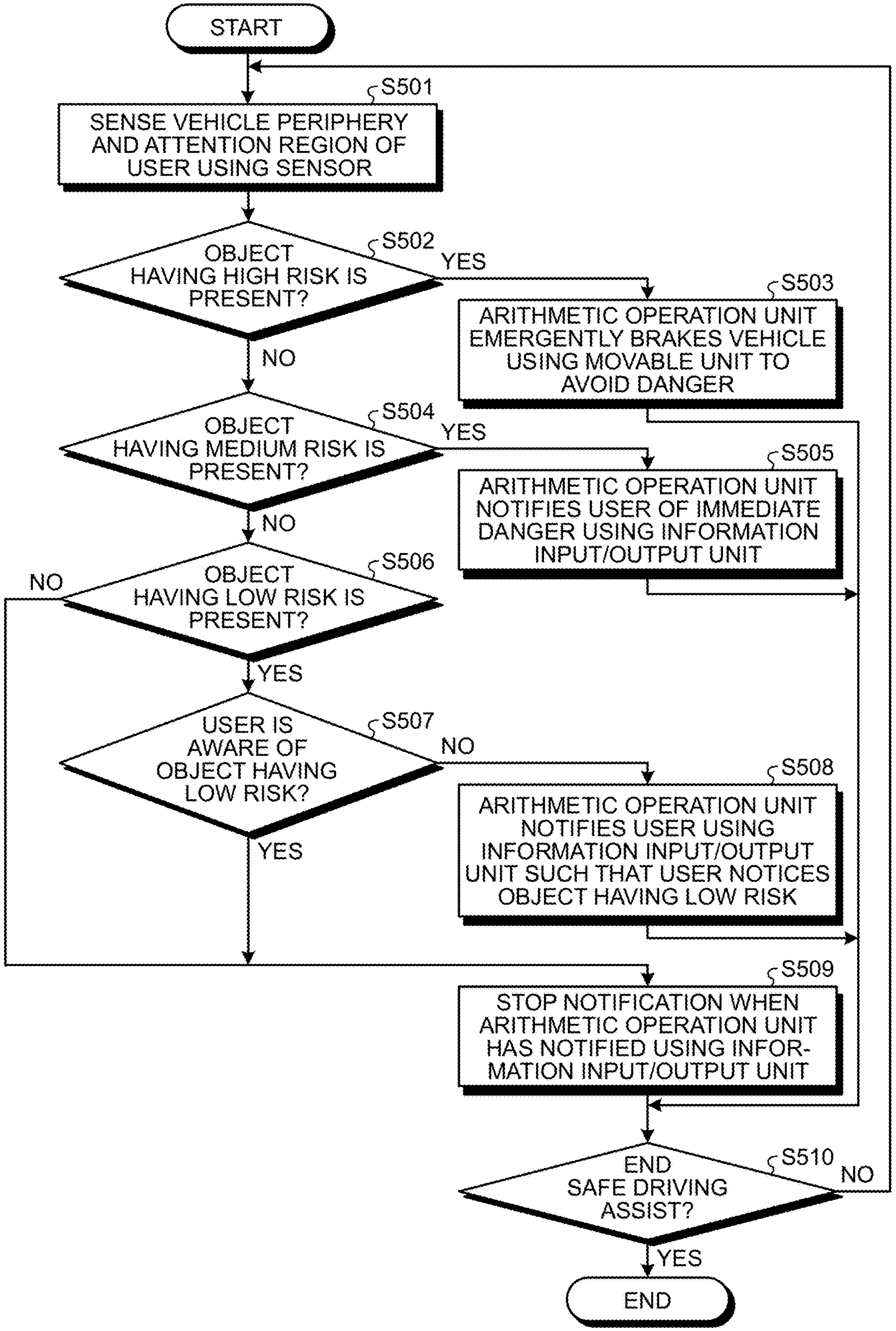
FIG. 21 is a flowchart illustrating an example of the safe driving function.

FIG. 21 is a flowchart illustrating an example of the safe driving function. This is a detail of "assist safe driving of the user (step S110)" in FIG. 11. The processing of the arithmetic operation unit 106 of the vehicle 1 illustrated here is processing that is always repeatedly continued while the user is driving.

First, the arithmetic operation unit 106 of the vehicle 1 detects a type, a position, and speed of a dangerous object around the vehicle using a sensor (step S501). At the same time, the arithmetic operation unit 106 of the vehicle 1 calculates an attention region of the user during the driving from the head position (or the center position of both the eyes, for example) of the user and a line-of-sight detection result.

The arithmetic operation unit 106 of the vehicle 1 determines whether the object having the high risk described with reference to FIG. 13 is present around the vehicle (step S502). When the object having the high risk is present around the vehicle (step S502: Yes), the arithmetic operation unit 106 emergently brakes the vehicle 1 using the movable unit 101 to be able to avoid or reduce an accident (step S503). Thereafter, when not ending the assist of the safe driving (step S510: No), the arithmetic operation unit 106 returns to the sensing of the periphery of the vehicle and the attention region of the user (step S501). Upon ending the assist of the safe driving (step S510: Yes), the arithmetic operation unit 106 ends the processing.

When the object having the high risk is absent (step S502: No), the arithmetic operation unit 106 determines whether an object having a medium risk is present (step S503). When the object having medium risk is present (step S503: Yes), the arithmetic operation unit 106 notifies the user of an imminent risk using the information input/output unit 104 (step S505). Thereafter, as described above, as long as the arithmetic operation unit 106 does not end the assist of the safe driving (step S510: No), the arithmetic operation unit 106 returns to the sensing of the periphery of the vehicle and the attention region of the user (step S501).

When the object having the medium risk is absent (step S502: No), the arithmetic operation unit 106 determines whether an object having a low risk is present (step S506). When the object having the low risk is present (step S506: Yes), the arithmetic operation unit 106 further determines whether the user is aware of the object having the low risk (step S507). In response to determining that the user is not aware of the object having the low risk (step S507: No), the arithmetic operation unit 106 performs notification using the information input/output unit 104 such that the user notices the object having the low risk (step S508). Thereafter, as described above, as long as the arithmetic operation unit 106 does not end the assist of the safe driving (step S510: No), the arithmetic operation unit 106 returns to the sensing of the periphery of the vehicle and the attention region of the user (step S501).

In response to determining that the user is aware of the object having the low risk (step S507: Yes) or determining that the object having the low risk is absent, there is no information to be notified to the user. For that reason, when the notification has been performed using the information input/output unit 104, the arithmetic operation unit 106 stops the notification (step S509). Thereafter, as described above, as long as the arithmetic operation unit 106 does not end the assist of the safe driving (step S510: No), the arithmetic operation unit 106 returns to the sensing of the periphery of the vehicle and the attention region of the user (step S501).

As described above, in the present disclosure, when determination is made such that the risk of the vehicle 1 is low (the low risk) and the user is not aware of the object having the low risk, the object having the low risk is notified to the user via the information input/output unit 104. However, even if the risk is determined to be low, but the user is determined to be aware of the object having the low risk, this risk is not notified unlike the case of the medium risk or the high risk.

Figure 22:
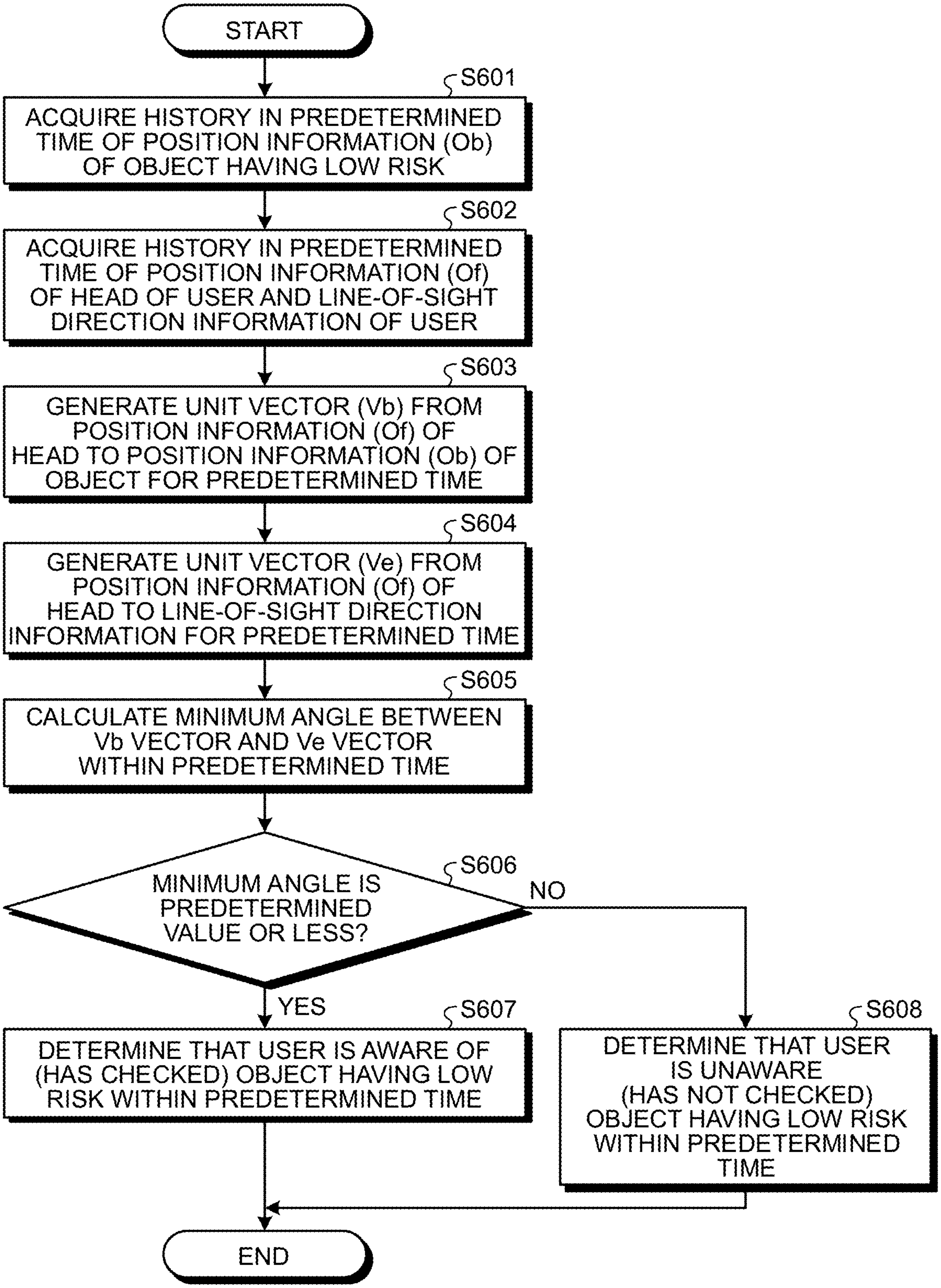
FIG. 22 is a flowchart illustrating an example of the safe driving function.

FIG. 22 is a flowchart illustrating an example of the safe driving function. This is a detail of the processing for determining "whether the user is aware of the object having the low risk? (step S507)" in FIG. 21.

First, the arithmetic operation unit 106 of the vehicle 1 acquires, from the memory 107, a history of position information (Ob) of the object having the low risk in a predetermined time (step S601). Note that, it is assumed that, in the memory 107 of the vehicle 1, position information and speed information are sequentially updated for each dangerous object around the vehicle determined by the arithmetic operation unit 106 and there is a history for the predetermined time or more.

Subsequently, the arithmetic operation unit 106 of the vehicle 1 acquires, from the memory 107, position information (Of) of the head of the user and a history of line-of-sight direction information of the user in the predetermined time (step S602). It is assumed that, in the memory 107 of the vehicle 1, the position information of the head and the line-of-sight direction information determined by the arithmetic operation unit 106 are sequentially updated and there is a history for the predetermined time or more.

Subsequently, the arithmetic operation unit 106 of the vehicle 1 generates, by an amount for the predetermined time, a unit vector (Vb) directed from Of to Ob by using the acquired position information (Of) of the user's head and the acquired position information (Ob) of the object having the low risk (step S603).

Subsequently, the arithmetic operation unit 106 of the vehicle 1 generates, by an amount for the predetermined time, a unit vector (Ve) along the line-of-sight direction from Of from the acquired position information (Of) of the user's head and the acquired line-of-sight direction information (step S604).

Subsequently, the arithmetic operation unit 106 of the vehicle 1 calculates angles formed by the Vb vector and the Ve vector within the predetermined time and derives a smallest angle (a minimum angle between the vectors) formed by the vectors among the angles (step S605). The arithmetic operation unit 106 of the vehicle 1 determines whether the smallest angle (the minimum angle) formed by the Vb vector and the Ve vector within the predetermined time is equal to or less than a predetermined value (step S606).

When the angle is equal to or less than the predetermined value (step S606: Yes), the arithmetic operation unit 106 determines that the user is aware of (has checked) the object having the low risk within the predetermined time (step S607) and ends the processing. On the other hand, when the angle is not equal to or less than the predetermined value (step S606: No), the arithmetic operation unit 106 determines that the user is not aware of (has not checked) the object having the low risk within the predetermined time (step S608) and ends the processing.

As described above, when determination is made such that the line-of-sight direction of the user is sufficiently close to a direction in which the object having the low risk is present within the most recent predetermined time, the user is determined to have checked the object having the low risk and, otherwise, the user is determined not to check the object having the low risk.

Note that, here, whether the user has visually recognized the object having the low risk is checked with the line-of-sight direction. However, the present disclosure is not limited to this. For example, line-of-sight detection may be performed for each eye and whether a dangerous object has been visually recognized may be determined with a focal length of the eye and the like. In this case, there is an advantage that, even if the user is viewing the direction of the object having the low risk, it can be determined that the windshield 24 is in focus and the object having the low risk is not seen.

A temporal contrast difference outside the vehicle may be measured by a sensor of the vehicle 1 and, when a predetermined or more sudden contrast difference occurs in a short time, there is a possibility that, even if the user is viewing the direction of an object around the vehicle, the user cannot visually recognize the object. Therefore, in this case, it may be determined that the user is not aware of the object. This is likely to occur near an entrance and an exit of a tunnel. Further, there is also a case in which a pupil contraction adjustment function is deteriorated because of aging. For that reason, when there is a sudden contrast difference in a short time and/or when the user is old, it may be determined that, even if the line of sight 35 is focused, the user cannot visually recognize the object around the vehicle (a probability determination may be increased).

Figure 23:
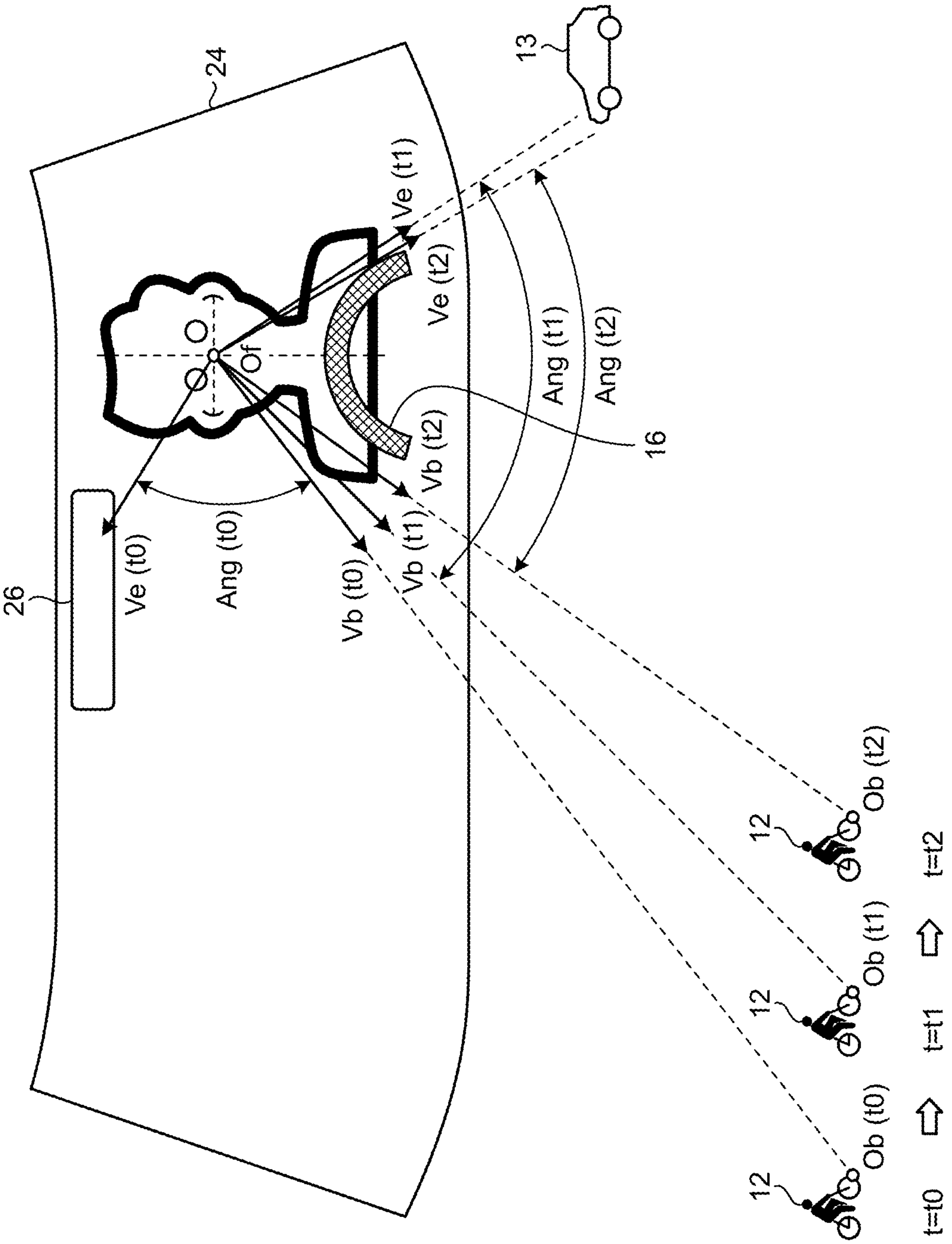
FIG. 23 is a diagram illustrating an example of the safe driving function.

FIG. 23 is a diagram illustrating an example of the safe driving function. This is a diagram complementing FIG. 22. FIG. 23 is a front view of the driver. Determination is made as to whether the driver is aware of the bicycle 12 in elapse of time from time t0 to t1 and t2. That is, the time from t0 to t2 is equivalent to the predetermined time described above. In the following description of this example, it is assumed that the bicycle 12 is traveling to cross in front of the vehicle 1 and the preceding vehicle 13 closer to the vehicle 1 is present.

First, at a time of time t0 (t=t0), Ob at the center in front of the bicycle 12 is present at a position of Ob (t0). For that reason, when the center position of the face of the driver is represented as Of, the driver needs to direct the line of sight 35 to a direction of Of to Ob (t0) in order to check the bicycle 12. A unit vector in this direction is represented as Vb (t0). The Vb (t0) vector can be calculated by acquiring a relative position of the bicycle 12 from the vehicle 1 and the center position of the face of the driver using sensor information of the vehicle 1 at time t0.

The driver is checking the rearview mirror 26 at time t0. The line of sight 35 of the driver at this time is represented by a unit vector as Ve (t0). The Ve (t0) vector can be calculated by acquiring the center position of the face of the driver and the line-of-sight direction information of the driver using the sensor information of the vehicle 1 at time t0.

At time t0, a direction the driver is viewing is the direction of the Ve (t0) vector and a direction the driver should view to check a bicycle is the direction of the Vb (t0) vector. An angle formed by the two vectors is represented as Ang (t0).

Similarly, at the time of time t1 (t=t1) and the time of time t2 (t=t2), the bicycle 12 continues to move forward and moves to the front of the vehicle 1 and the risk increases. Meanwhile, it is seen that the driver is checking preceding vehicle 13. An angle formed by the Vb (t1) vector and the Ve (t1) vector is represented as Ang (t1) and an angle formed by the Vb (t2) vector and the Ve (t2) vector is represented as Ang (t2). These are also calculated like Ang (t0).

When three measurement points are taken between t0 and t2, the angular differences between a direction viewed by the driver and a direction of the bicycle 12 to be viewed are Ang (t0), Ang (t1), and Ang (t2) respectively at times t0, t1, and t2. Therefore, whether the driver has checked the bicycle 12 within the time from t0 to t2 is determined as yes if at least one of Ang (t0), Ang (t1), and Ang (t2) is smaller than a predetermined angle and is determined as no if none of Ang (t0), Ang (t1), and Ang (t2) is smaller than the predetermined angle As described above, the position detection and the line-of-sight detection may be performed for each eye and the determination may be performed by further using the focal length and the like. Moreover, it may be determined whether the visual recognition has been performed taking into account a temporal change in the contrast difference around the vehicle and/or the age of the driver.

Figure 24:
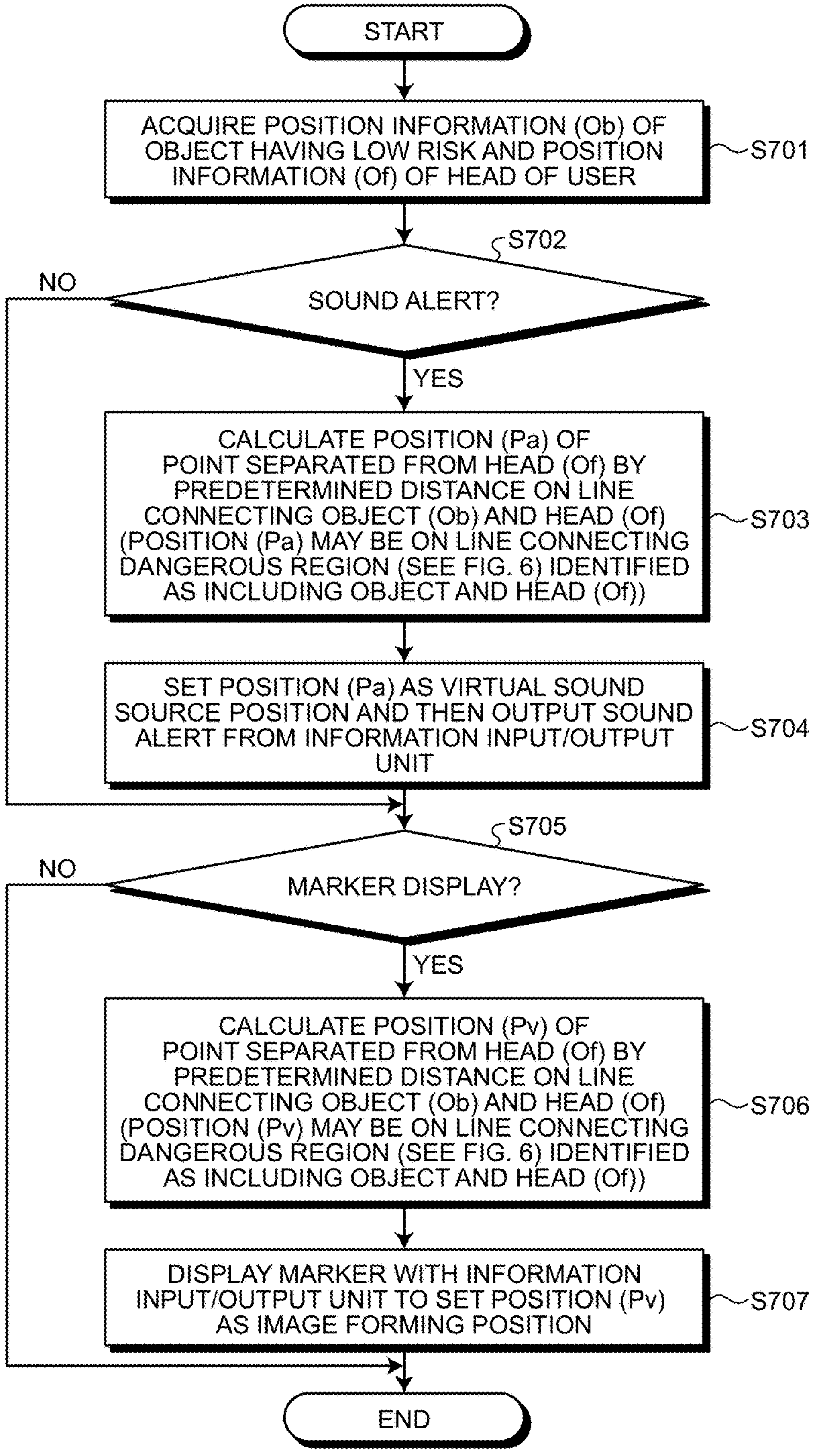
FIG. 24 is a flowchart illustrating an example of the safe driving function.

FIG. 24 is a flowchart illustrating an example of the safe driving function. This is a detail of the processing for performing the "the arithmetic operation unit 106 notifies the user of the object having the low risk using the information input/output unit 104 such that the user notices the object (step S508)" in FIG. 21.

First, the arithmetic operation unit 106 of the vehicle 1 acquires the position information (Ob) of the object having the low risk and the position information (Of) of the head of the user (step S701). The position information acquired in FIG. 22 may be used as it is. Then, the arithmetic operation unit 106 of the vehicle 1 determines whether to perform the sound alert 36 (step S702). This confirms checks whether the sound alert 36 is enabled as the safe driving function of the vehicle 1.

When the sound alert 36 is enabled (step S702: Yes), the arithmetic operation unit 106 of the vehicle 1 calculates position information (Pa) of a point that is located on a line connecting the position information (Ob) of the object and the position information (Of) of the head of the user and is located away from the position information (Of) of the head by a predetermined distance (step S703).

Then, the arithmetic operation unit 106 of the vehicle 1 sets the point as a virtual sound source position such that the user can hear the sound alert 36 from the position information (Pa) and then outputs a sound signal using the information input/output unit 104 (step S704).

Note that the position of the information input/output unit 104 (for example, an acoustic system including a plurality of speakers 28 embedded around the cockpit 17, in a headrest of a seat, or the like) in the vehicle 1 is known in advance, an audio signal produced by determining an audio signal output from the speakers 28 in advance for each position information (Pa) of the virtual sound source as in a channel-based scheme may be used or an object-based scheme may be used in which the position information (Pa) of the virtual sound source is arranged in a three-dimensional space and audio signal processing simulating sound reaching the user's ear is sequentially performed. In the present disclosure, a method for implementing the 3D stereophonic sound is not limited.

Note that the position information (Pa) of the virtual sound source is not limited to the above in the present disclosure and may be on a virtual three-dimensional line connecting any position in the dangerous region (see FIG. 6), which determined by the arithmetic operation unit as including a part or the entire object determined as having the constant risk, and the head (Of). The sound alert is sound emitted from (a speaker of) the information input/output unit in order to intuitively notify the driver of a direction in which a dangerous object is present and a distance thereof without delay. Therefore, the direction and the distance do not have to be shown with extremely high accuracy when viewed from the driver. It is considered that a purpose can be achieved if the driver can notice a rough direction and a rough distance of the dangerous region.

When the sound alert 36 is not enabled (step S702: No) or when the processing of the sound alert 36 ends (step S704), subsequently, the arithmetic operation unit 106 of the vehicle 1 checks whether the marker display 37 is enabled (step S705).

When the marker display 37 is enabled (step S705: Yes), the arithmetic operation unit 106 of the vehicle 1 calculates position information (Pv) of a point that is located on a line connecting the position information (Ob) of the object and the position information (Of) of the head of the user and is located away from the position information (Of) of the head by a predetermined distance (step S706).

Then, the arithmetic operation unit 106 of the vehicle 1 sets the point as a virtual display position (an image forming position of a marker display video) such that the user can visually recognize the marker display 37 with the position information (Pv) and outputs a video signal using the information input/output unit 104 (step S707).

Note that the position information (Pv) of the marker display is not limited to the above in the present disclosure and may be on a virtual three-dimensional line connecting any position in the dangerous region (see FIG. 6), which is determined by the arithmetic operation unit as including a part or the entire object determined as having the constant risk, and the head (Of). The marker display is a video displayed to the driver by (at least one or more of a head-up display, a monitor provided around a cockpit, and a head mounted display worn by the driver of) the information input/output unit in order to intuitively notify the driver of a dangerous object or a dangerous region to be recognized by the driver to be easily understood as visual information. For that reason, the marker display only has to be useful in making it easy to for the driver to recognize the position of the dangerous object or the dangerous region. If the marker display is displayed around the dangerous object or the dangerous region, a purpose can be achieved.

Note that (the space video projection device 27 of) the information input/output unit 104 of the vehicle 1 may be configured from a plurality of video projection devices such that a video can be displayed at a wide angle in a direction in which a window on the front side in a traveling direction in which a safety confirmation range of the user is required is present or the video may be displayed by a single video projection device.

A viewpoint video from the outside of the vehicle 1 (for example, a rear upper part or an upper part) may be generated by the arithmetic operation unit 106 in real time from sensor data and displayed on the information input/output unit 104 present around the driver's seat (for example, a small head-up display provided in front of a driver's seat or a monitor that is a part of a cockpit).

When the marker display 37 is not enabled (step S705: No) or when the processing of the marker display 37 ends (step S707), the arithmetic operation unit 106 ends the processing. Note that, although description is omitted concerning the display processing of the arrow mark 38 here, the processing may be performed the same as the marker display 37 with the exception that a display position is near the current attention region of the user (on an extension line of the Ve vector in FIG. 23).

Note that, here, for convenience of description, the processing is described as the processing of outputting the sound alert 36 and then outputting the marker display 37. However, the present disclosure is not limited to this and these kinds of processing may be performed in parallel or may be sequentially executed in order different from the order described above.

An information presentation method of the present embodiment is an information presentation method for presenting information to a driver of a first vehicle (the vehicle 1), the method including detecting, via at least one first sensor (the sensor unit 103) that senses the outside of the first vehicle, one or more objects located in front of the first vehicle, determining a risk of each of the one or more objects, and outputting an alert sound for alerting the first dangerous object via one or more speakers (the information input/output unit 104) provided in an interior of the first vehicle in response to determining, based on the risk of each of the one or more objects, that a first dangerous object having a first risk exceeding a predetermined level is present among the one or more objects. The alert sound is presented to the driver as a sound image localized at a first sound image position between the driver and the first dangerous object, the risk relates to a future collision risk between each of the one or more objects and the first vehicle, and, when the risk of the first dangerous object rises from the first risk to a second risk, the sound image position of the sound image is changed from the first sound image position to a second sound image position, and the second sound image position is a position between the driver and the first dangerous object and closer to the driver than the first sound image position.

The first sound image position is a position (a virtual sound source position) on an imaginary line extending from the pupil of the driver to the first dangerous object or a position away from the imaginary line by a first distance. The second sound image position is a position on the imaginary line or a position away from the imaginary line by a second distance. Each of the first sound image position and the second sound image position is a position on the imaginary line. The sound image moves on the imaginary line when the sound image position of the sound image is changed. Further, when the first dangerous object is determined to be present, a first marker (marker display) for alerting the first dangerous object to the driver is displayed on a head-up display mounted on the first vehicle, and the first marker is presented to the driver as a virtual image formed between the driver and the first dangerous object.

The first marker is presented to the driver as a virtual image overlapping with the first dangerous object. In addition, the first marker is presented to the driver as a virtual image formed at a position on an imaginary line extending from the pupil of the driver to the first dangerous object or at a position away from the imaginary line by a predetermined distance. Further, an image forming position of the first marker moves along an imaginary line extending from the pupil of the driver to the first dangerous object.

Figure 25:
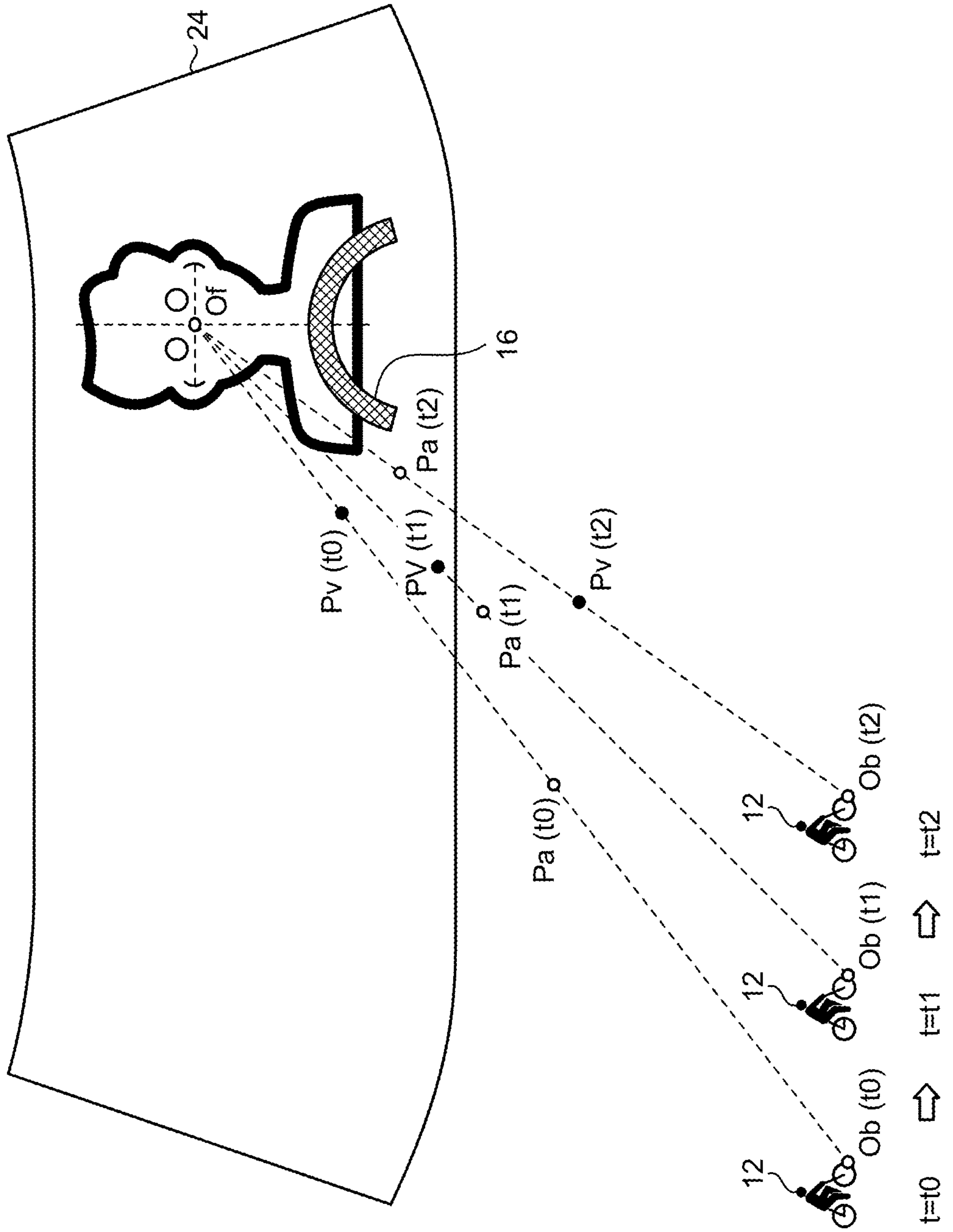
FIG. 25 is a diagram illustrating an example of the safe driving function.

FIG. 25 is a diagram illustrating an example of the safe driving function. This is a diagram complementing FIG. 24. FIG. 25 is a front view of the driver and illustrates an example of a virtual sound source position of the sound alert 36 and a virtual display position of the marker display 37 at the time when the bicycle 12 around the vehicle is notified to the drive as time elapses from time t0 to t1 and t2.

First, the virtual sound source position of the sound alert 36 is arranged to be closer to the user as the risk increases in Pa(t0), Pa(t1), and Pa(t2) as time elapses to times t0, t1, and t2. This is to cause the user to recognize as if the sound alert 36 is gradually sounding in a far place to a near place. Accordingly, it is possible to inform the user that the target object around the vehicle is naturally approaching the vehicle 1 and the risk is increasing.

Note that bringing the virtual sound source position of the sound alert 36 close as the risk increases is an example. The present disclosure is not limited to this. A fixed value may be adopted as the distance between the position information (Pa) of the virtual sound source and the center position information (Of) of the face of the user or the fixed value may be adjusted with preference of the user or may be adjusted by the arithmetic operation unit 106 (or the arithmetic operation unit 903) of the vehicle 1 (or the vehicle management cloud 10) from driving data.

Note that the volume of the sound alert 36 may be increased in accordance with a determination result of the risk. Accordingly, it is conceivable that there is an advantage that the user can easily recognize the risk smoothly by being warned gradually with louder sound.

Note that the sound of the sound alert 36 may be changed in accordance with the determination result of the risk. For example, the sound alert 36 may sound "pi" at time t0 when the risk is low, may sound "pipi" at time t1 when the risk is slightly increased, and may sound "pipipi" at time t2 when the risk is further increased. By changing the sound to be output in this way according to the determination result of the risk, it is possible to more plainly notify the user of the risk.

The virtual display position of the marker display 37 is arranged to be closer to the target object as the risk increases in Pv(t0), Pv(t1), and Pv(t2) as time elapses to times t0, t1, and t2. This is to, by reducing the difference between a focal length at the time when the user views the marker display 37 and a focal length at the time when the user views the target object, reduce an amount of change in the focal length to make it possible to quickly visually recognize the target object. Accordingly, it is possible to, by following the marker display 37 with the eyes, plainly inform the user in which direction the target object around the vehicle is naturally located.

Note that moving the virtual display position of the marker display 37 away from the user toward the target object is an example. The present disclosure is not limited to this. A fixed value may be adopted as the distance between the position information (Pv) of the virtual display and the center position information (Of) of the face of the user. The fixed value may be adjusted by the user in accordance with his/her preference or may be adjusted by the arithmetic operation unit 106 (or the arithmetic operation unit 903) of the vehicle 1 (or the vehicle management cloud 10) from the driving data. Alternatively, the position information (Pv) of the virtual display may be superimposed and displayed on a real image around the position of the target object in a three-dimensional space.

Note that at least one of a pattern, a color, size, and clarity of the marker display 37 may be changed according to a determination result of the risk. Therefore, larger marker display 37 may be performed as the risk increases or the marker display 37 may be performed with a color or clarity (opacity) that can be visually recognized more clearly. Accordingly, it is conceivable that there is an advantage that the user is allowed to easily recognize the risk smoothly.

Figure 26:
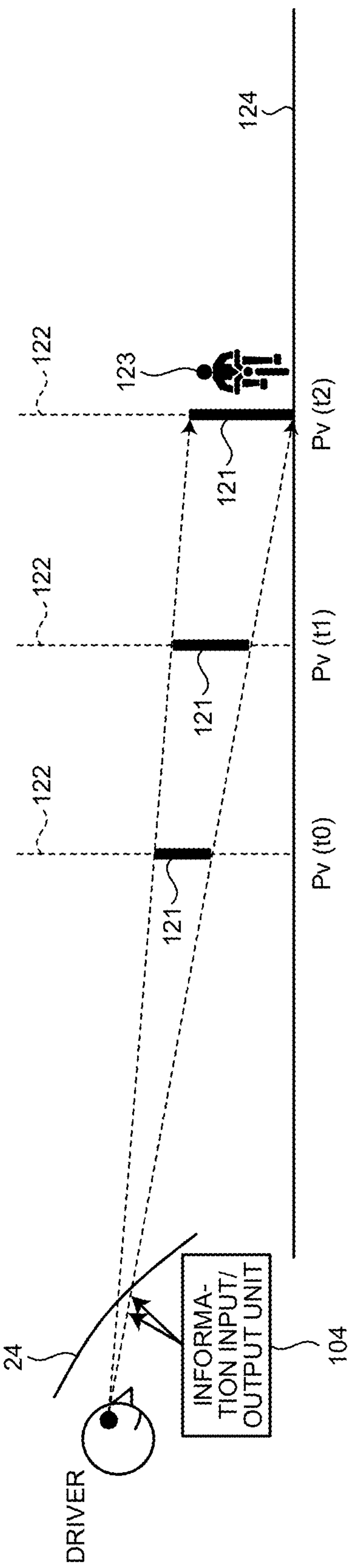
FIG. 26 is a diagram for describing marker display and a method of controlling a virtual image plane thereof.

FIG. 26 is a diagram for describing marker display and a method of controlling a virtual image plane thereof. As illustrated in FIG. 26, a marker 121 is displayed for a target object 123 for which determination is made by the arithmetic operation unit 106 of the vehicle 1 such that marker display is necessary when viewed from the driver. Adjusted light is output from an optical system present in the information input/output unit 104 to the marker 121 and is reflected on the windshield 24 to reach the eyes of the driver, whereby an image is formed and visually recognized. In this example, the information input/output unit 104 performs control such that an image of the marker 121 at each time is formed on a virtual image plane (on the virtual image plane 122) perpendicular to the road (the ground 124) or in the gravity direction.

As described above, the marker 121 has a higher risk as time elapses to times t0, t1, and t2 as described above and moves from the driver side to the target object side on a line connecting the driver and the target object 123 (the dangerous region) and is displayed at positions Pv (t0), Pv (t1), and Pv (t2). The marker 121 may be displayed at a position closer to the target object side from the driver side when the risk increases according to not only the time change but also a determination result of the risk. The driver is considered to have an advantage that the driver has a video experience as if the marker 121 flies toward the target object 123 and the line of sight of the driver is easily guided (attention is easily drawn).

Figure 27:
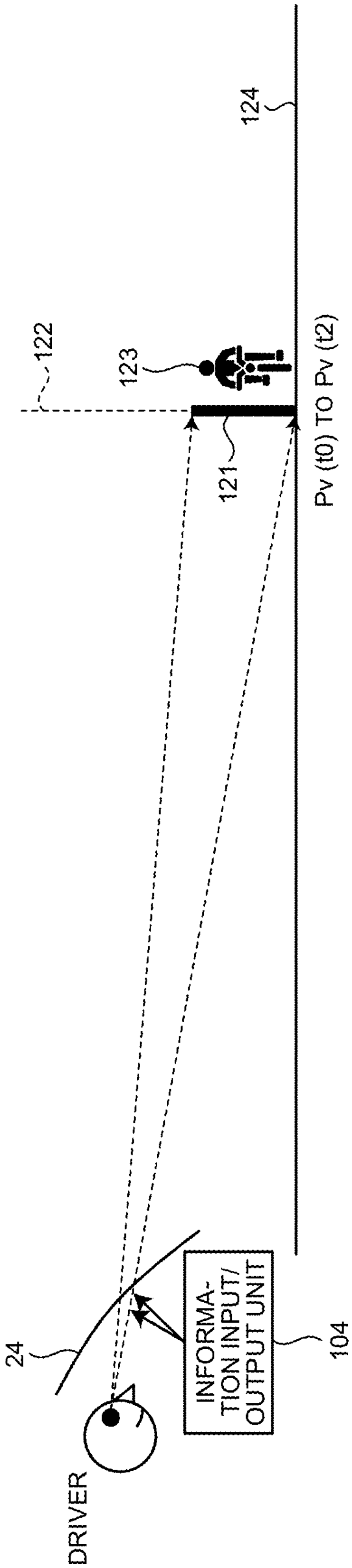
FIG. 27 is a diagram for describing marker display and a method of controlling a virtual image plane thereof.

FIG. 27 is the same as FIG. 26 but is different in that the marker 121/the virtual image plane 122 are continuously arranged immediately before the target object 123 irrespective of a change in time or a risk. In this case, the relative positional relation with the target object 123 (or the dangerous region) is sensed by the sensor unit 103 of the vehicle 1. An image forming position (the virtual image plane 122) is controlled by the information input/output unit 104 to display the marker 121 on the target object side on the line connecting the driver and the target object 123. The driver is considered to have an advantage that the driver has a video experience in which the marker 121 linked with the position of the target object 123 is continuously displayed and can continue to plainly recognize the target object 123.

Figure 28:
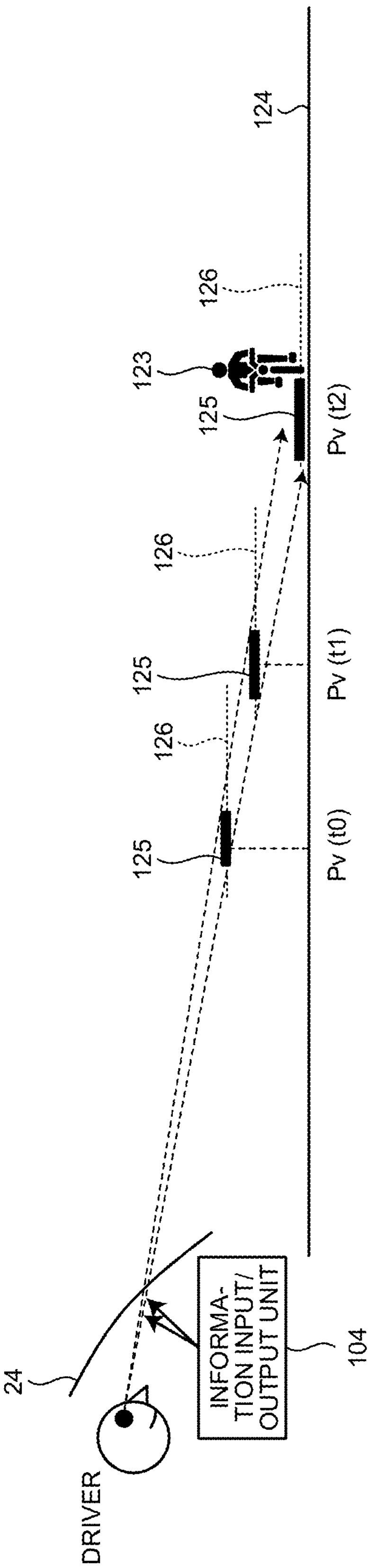
FIG. 28 is a diagram for describing marker display and a method of controlling a virtual image plane thereof.

FIG. 28 is the same as FIG. 26 but is different in that markers 125/a virtual image plane 126 are displayed/arranged in parallel to the ground 124 or in a direction perpendicular to the gravity direction. Although not described herein, this is implemented by adjusting light output from the optical system of the information input/output unit 104. For example, an experiment of making the virtual image plane 126 parallel to the ground 124 is reported in "Ryo NOGUCHI, Shigeki DAIMON, Kenichi KASAZAI, and Toshiya MORI: "Influence of a virtual image position on depth perception in a 3D head-up display", Automotive Technology, Vol. 48, No. 2, pp. 439-444, 2017" in Proceedings of the Society of Automotive Engineers of Japan published in March 2017.

Note that, in this example, the image forming position moves from the driver side to the target object side on the line connecting the driver and the target object 123 (the dangerous region). However, the present disclosure is not limited to this. The optical system of the information input/output unit 104 may be controlled such that the image forming position (the virtual image plane 126) moves on a line on the ground obtained by projecting the line connecting the driver and the target object 123 onto the ground 124 in the perpendicular direction. In this case, the driver has a video experience as if the marker 125 approaches the target object 123 while crawling on the ground 124 from the driver's side. It is considered easy to guide the line of sight.

Figure 29:
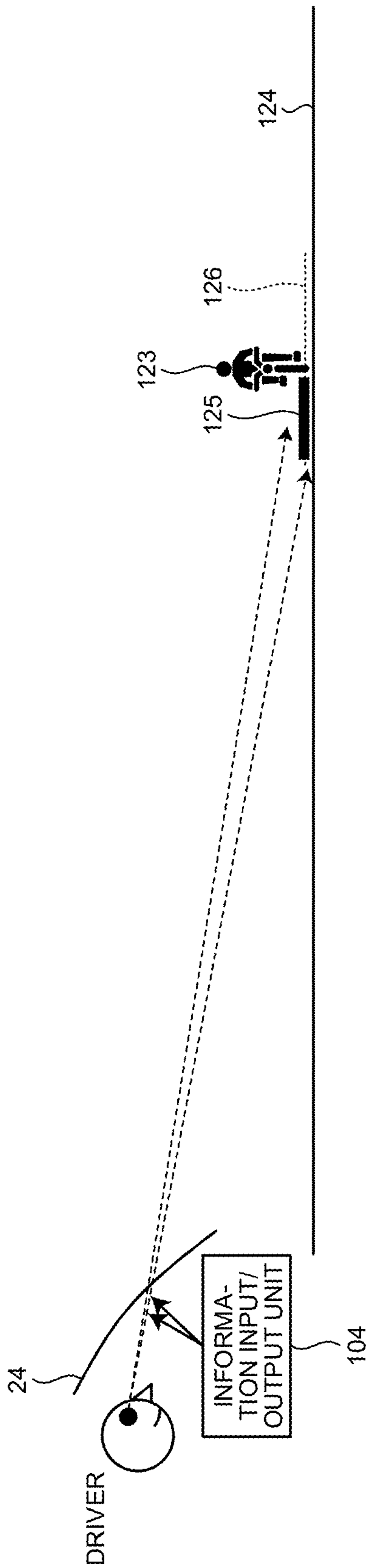
FIG. 29 is a diagram for describing marker display and a method of controlling a virtual image plane thereof.

FIG. 29 is the same as FIG. 27 but is different in that the markers 125/the virtual image plane 126 are displayed/arranged parallel to the ground 124 or in the direction perpendicular to the gravity direction. A first road surface region is a road surface region at a position closer to the driver than a region where the first dangerous object (the target object 123) is grounded on the road surface (the ground 124). The first marker (the marker 125) is presented to the driver as a virtual image (the virtual image plane 126) overlapping with the first road surface region. When performing this display control, the information input/output unit 104 of the vehicle 1 can obtain the same effects as the effects illustrate FIG. 27. The marker 125 can be displayed while suppressing a visual error of a distance as in the paper described above. Therefore, it is considered possible to more plainly recognize the target object 123 (the dangerous region).

Figure 30:
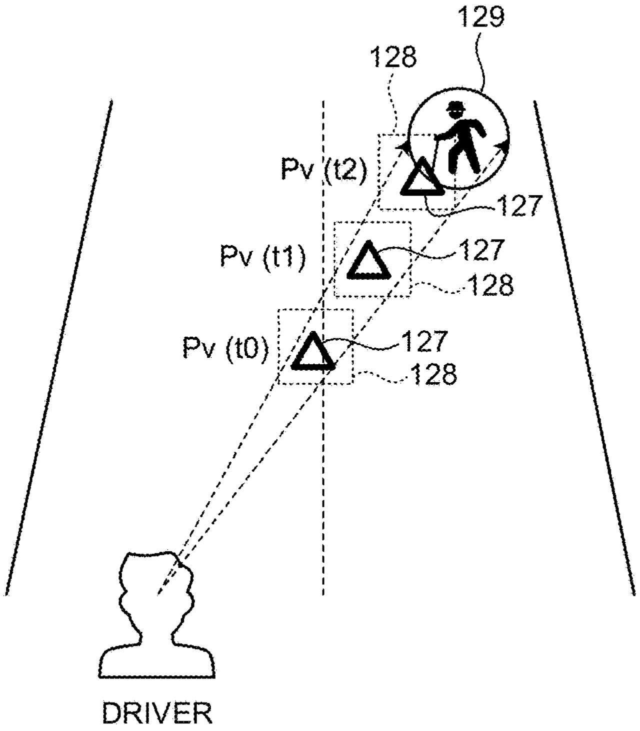
FIG. 30 is a diagram for describing the marker display of FIG. 26 and the position of the virtual image plane thereof.

FIG. 30 is a diagram illustrating the marker display in FIG. 26 and the position of the virtual image plane thereof. In FIG. 30, a vehicle peripheral situation is sensed by the sensor unit 103 of the vehicle 1 and a circular dangerous region 129 is set in a predetermined form including a region that is a detection result of a dangerous object (here, a pedestrian who is about to cross a road) detected by the arithmetic operation unit 106. In this case, a cone having the head (Of) of the driver as a vertex and the circular dangerous region 129 as a base is determined in a three-dimensional space.

Display positions are controlled by the information input/output unit 104 such that all pieces of position information of Pv(t0), Pv(t1), and Pv(t2), which are display position information of a marker 127, are included in the inside of the cone. In FIG. 30, an image of the marker 127 is formed on a virtual image plane (on the virtual image plane 128) perpendicular to the ground. The marker 127 is displayed on the inside of the conical shape at a position closer to the dangerous object as the risk increases.

Naturally, the display position Pv of the marker 127 may be set on an imaginary line connecting the head of the driver and one point in the dangerous object (or the dangerous region 129) in accordance with the risk. Even in the case of a horizontal virtual image plane illustrated in FIG. 31, the same applies irrespective of the tilt of the virtual image plane.

Figure 31:
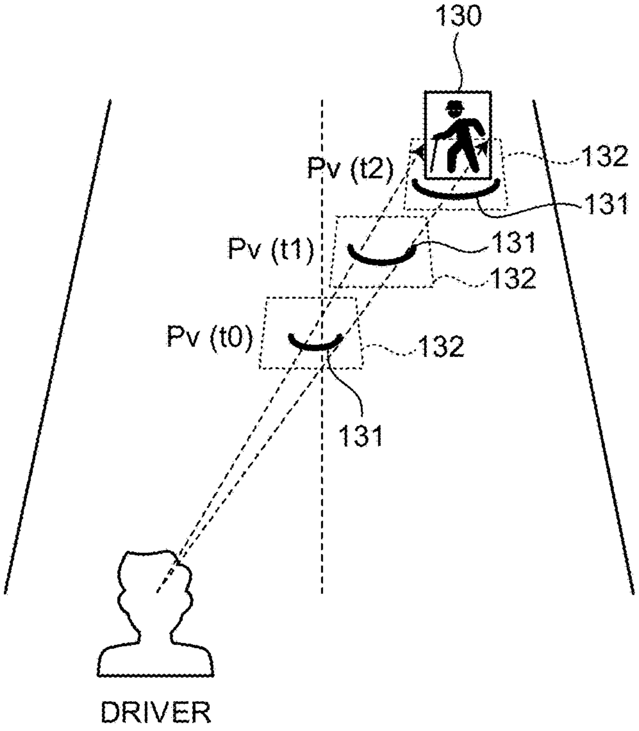
FIG. 31 is a diagram for describing the marker display of FIG. 28 and the position of the virtual image plane thereof.

Similarly, FIG. 31 is a diagram for describing the marker display in FIG. 28 and the position of the virtual image plane thereof. As in FIG. 30, a rectangular dangerous region 130 is set in a predetermined form including a region that is a detection result of a dangerous object detected by the arithmetic operation unit 106 of the vehicle 1. In this case, a square pyramid having the head (Of) of the driver as a vertex and having the dangerous region 130 of the square as a base is determined in a three-dimensional space.

Display positions are controlled by the information input/output unit 104 of the vehicle 1 such that all pieces of position information of Pv(t0), Pv(t1), and Pv(t2), which are the display position information of a marker 131, are included in the inside of the square pyramid. In FIG. 31, an image of the marker 131 is formed on a virtual image plane (on the virtual image plane 132) parallel to the ground. The marker 131 is displayed on the inside of the square pyramid at a position closer to the dangerous object as the risk increases.

Figure 32:
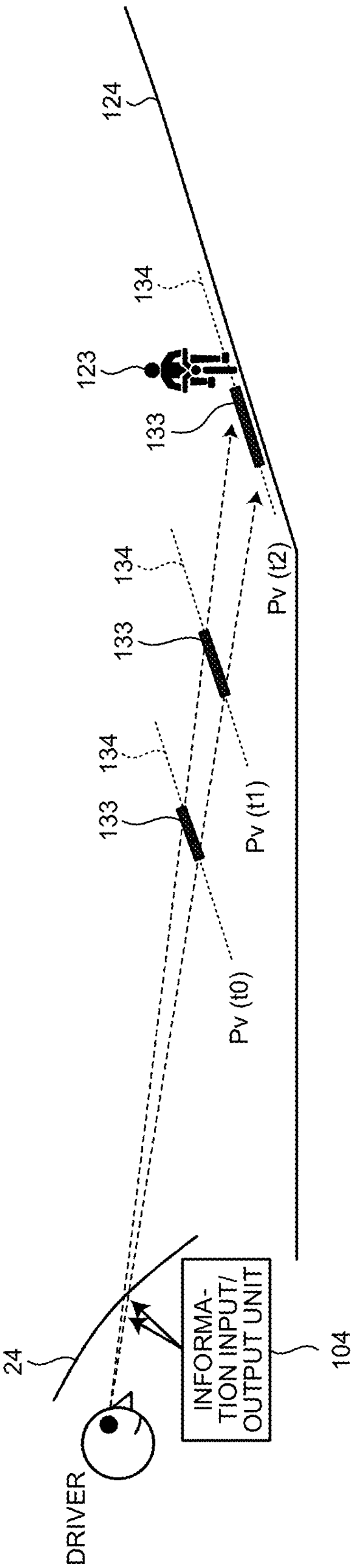
FIG. 32 is a diagram for describing marker display and a method of controlling a virtual image plane thereof.

FIG. 32 is the same as FIG. 28 but is different in that a marker 133/a virtual image plane 134 are displayed/arranged in parallel to the ground 124 in a predetermined area near the target object. An image plane of the first marker (the marker 133) is a surface obtained by detecting a state of a road surface (the ground 124) in the front of the first vehicle (the vehicle 1) via at least one first sensor (the sensor unit 103 of the vehicle 1) and reflects a shape and/or a gradient of the first road surface region of the road surface. As described above, the marker 133 for the target object 123 is displayed in parallel to the ground 124 along the tilt and unevenness of the ground around the target object, whereby it is possible to perform marker display without discomfort of floating in the air.

Figure 33:
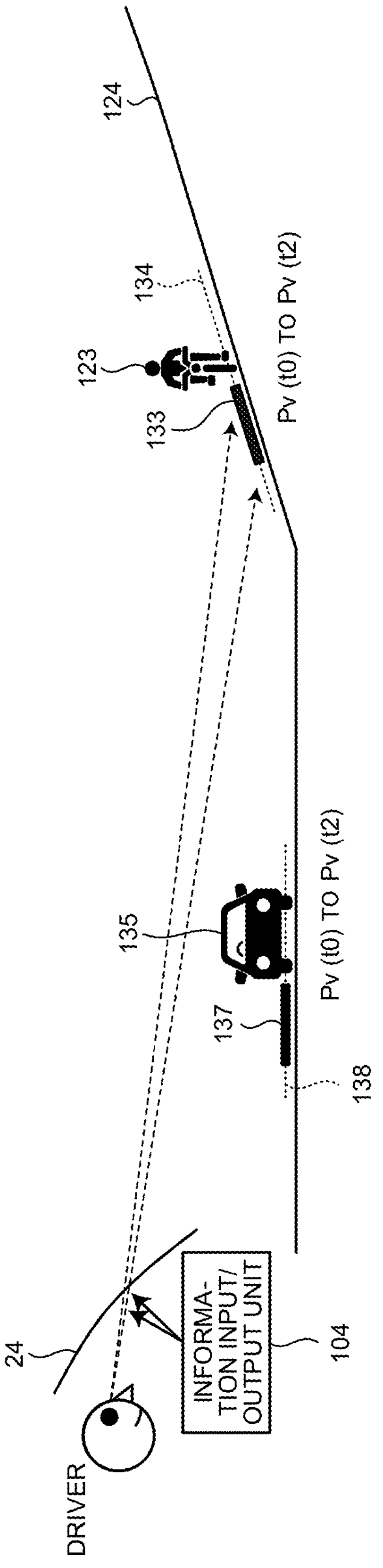
FIG. 33 is a diagram for describing marker display and a method of controlling a virtual image plane thereof.

FIG. 33 is the same as FIG. 32 but is different in that the marker 133, a marker 137, the virtual image plane 134, and a virtual image plane 138 are displayed/arranged in parallel to the ground 124 in a predetermined area near the target object irrespective of a change in time or a risk. In this case, a relative positional relation between the target object 123 and a target object 135 (or the dangerous region) is sensed by the sensor unit 103 of the vehicle 1. The image forming position (the virtual image plane 134) is controlled by the information input/output unit 104 such that the marker 133 is displayed on the line connecting the driver and the target object 123 (dangerous region) and on the ground 124 immediately before the target object in parallel to the ground 124.

In this case, there is the same advantage as the advantage illustrated in FIG. 27. However, as illustrated in the figure, there is a more effect when marker display is simultaneously performed on a plurality of objects (the target object 123 and the target object 135). The vehicle (the target object 135) close to the driver is present on the horizontal ground 124. Therefore, when the marker 137 is displayed on the ground 124 near the vehicle (object 135), the virtual image plane 138 is parallel and arranged horizontally along the tilt and unevenness of the ground 124 near the vehicle.

On the other hand, the bicycle (the target object 123) far from the driver is present on a slope of the ground 124. Therefore, when the marker 133 is displayed on the ground 124 near the bicycle, the virtual image plane 134 is arranged along the slope to be parallel along the tilt and the unevenness of the ground 124 near the bicycle. When the markers are displayed in this way, by arranging the virtual image plane along the tilt or the unevenness of the ground near the target objects of the markers, the respective markers for the respective target objects can be visually recognized from the driver without discomfort.

As described above, when a plurality of markers (the marker 133 and the marker 137) are simultaneously displayed in parallel to the ground 124 or in the direction perpendicular to the gravity direction, the optical system of the information input/output unit 104 is controlled such that, for each of the markers, the tilts of the virtual image planes (the virtual image plane 134 and the virtual image plane 138) are matched with the tilt of the ground on which the markers are displayed. Note that partial tilt and unevenness of the ground 124 may be acquired from high-resolution digital map information or may be measured in real time using a 3D space measurement technology by a sensor (a LiDAR, a camera, or the like).

Further, as described with reference to FIGS. 34 and 35, the information presentation method according to the present embodiment includes acquiring, from a second vehicle or equipment located around the first vehicle, via a communication network, peripheral information about a situation around the first vehicle, and, in response to determining, based on the peripheral information, that a second dangerous object is present in a blind spot of the driver, displaying, on a head-up display, a second marker for alerting the second dangerous object to the driver. The second marker is presented to the driver as a virtual image formed at a position away from the second dangerous object by a predetermined distance, the position being visible from the driver. In the information presentation method, when the second dangerous object is determined to be present in the blind spot of the driver, the second marker is presented to the driver as a virtual image having an image plane that is located closer to the driver than the second dangerous object and is perpendicular to the road surface on which the first vehicle is grounded or an image plane that is parallel to the gravity direction.

Figure 34:
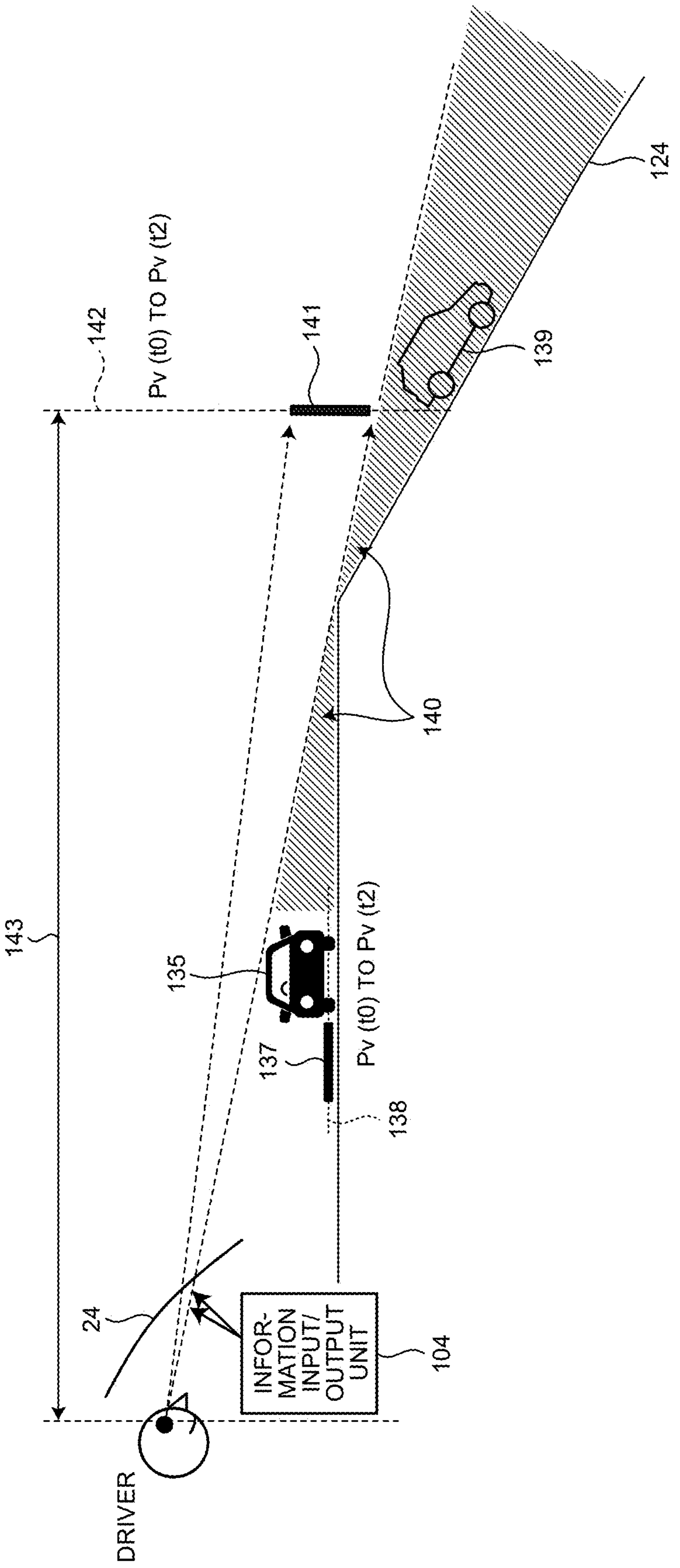
FIG. 34 is a diagram for describing marker display and a method of controlling a virtual image plane thereof.

FIG. 34 is a diagram for describing marker display and a method of controlling a virtual image plane thereof in the case in which a target object 139 (or a dangerous region) is included in a blind spot region 140. The marker display for the vehicle (the target object 135) present at the center illustrated in FIG. 34 is the same as the marker display described with reference to FIG. 33. In FIG. 34, a road ahead of the driver is downhill from a certain place. There is a blind spot region 140 where a dangerous object (the target object 139, a vehicle on downhill on the right side of FIG. 34) cannot be visually recognized from the driver.

In such a case, it is difficult to plainly notify the driver of the dangerous object even if the marker is displayed immediately before the target object as illustrated in FIG. 27 or the marker is displayed on the ground immediately before the target object as illustrated in FIG. 29. In such a case, in FIG. 34, a marker having a greatly different image forming distance for the vehicle on the right side is displayed near of the vehicle (the target object 135) present at the center. Then, the driver cannot recognize a peripheral situation or appropriately recognize a dangerous object.

For that reason, when a part or the entire object 139 (the dangerous object or the dangerous region) of the marker display is included in the blind spot region 140 from the driver, it is conceivable to arrange a perpendicular virtual image plane 142, which is the same as the gravity direction, at a position on the driver side of the target object 139 and display a marker 141 at a position on the virtual image plane easily visually recognized by the driver close to the target object 139.

In some case, it is difficult to detect a dangerous object present in the blind spot region 140 only with the sensor unit 103 mounted on the vehicle 1 such as LiDAR or a camera. For that reason, concerning a situation and a dangerous object around the vehicle that cannot be detected by an in-vehicle sensor, data detected by a sensor mounted on another nearby vehicle (V2V communication or the like), nearby road equipment (V2I communication or the like), an artificial satellite or the like or information about ta situation around the own vehicle constructed in a cyberspace from the data may be transmitted by a specific computer on these kinds of equipment or a network and received by the communication unit 108 of the vehicle 1. The arithmetic operation unit 106 may acquire or determine the position of the dangerous object around the own vehicle. Naturally, information about a type and a moving speed vector of the dangerous object may be received at the same time.

Figure 35:
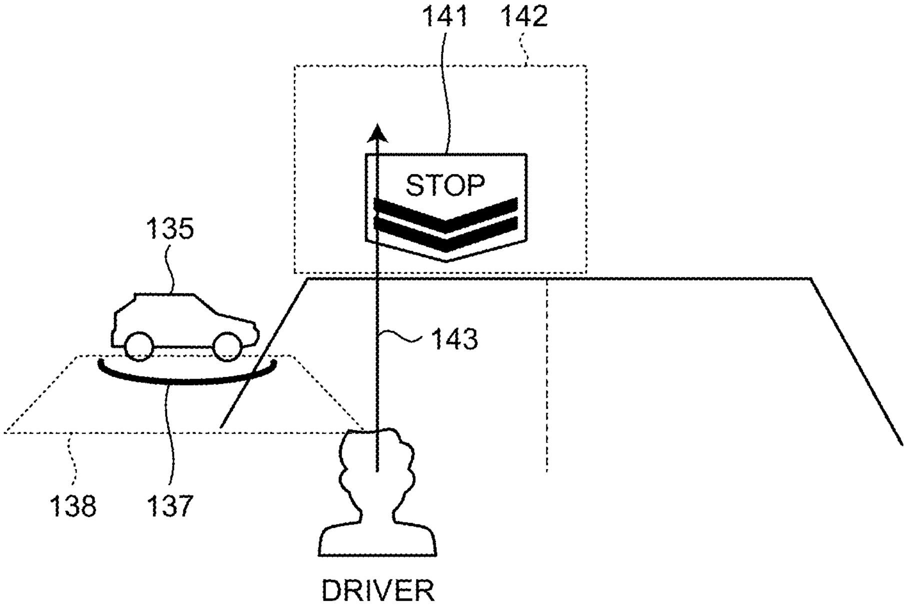
FIG. 35 is a diagram for describing a landscape in a situation of FIG. 34 viewed from a driver side.

FIG. 35 is a diagram for describing a landscape of the situation illustrated in FIG. 34 viewed from the driver side. The road ahead of the driver is downhill halfway and the road ahead of the certain place cannot be visually recognized. The virtual image plane 138 parallel to the ground near the vehicle is formed for the vehicle (the target object 135) present at the center in FIG. 34 and the marker 137 for indicating the vehicle is displayed on the virtual image plane.

On the other hand, for a vehicle in the blind spot region from the driver, the perpendicular virtual image plane 142 present immediately in front of a target object illustrated in FIG. 34 is formed by position information of a dangerous object acquired from a computer outside the vehicle via wireless communication (the communication unit of vehicle 1). The marker 141 is displayed at a position visually recognizable by the driver on the virtual image plane and close to the target object. When viewed from the driver, for example, as illustrated in FIG. 35, the marker 141 is a downward arrow blade and includes information indicating danger such as “STOP” in the downward arrow blade.

The distance 143 to the marker 141 visually recognized by the driver is the same as the distance indicated as the horizontal distance to the virtual image plane 142 in FIG. 34. Accordingly, even in the blind spot region, the driver can sense a dangerous object (or a dangerous region) hidden in the blind spot region with marker display that is easily visually recognized and separated by a distance to the invisible dangerous object. For that reason, it is expected that it is possible to contribute to safe driving.

As described with reference to FIGS. 36 to 40, in the information presentation method according to the present embodiment, when a first dangerous object is present, a first marker for notifying the driver of the first dangerous object is further displayed on the head-up display mounted on the first vehicle, the first marker (an animation marker) is displayed as an animation drawn by enlarging or reducing a radius of a virtual circle centered on a dangerous position overlapping with the first dangerous object, when the radius of the virtual circle is minimum, the entire virtual circle is displayed as a circular object in a display region of the head-up display, and, when the radius of the virtual circle is maximum, a portion of the virtual circle displayable in the display region of the head-up display is displayed as an arc-shaped object. After being displayed as the animation, the first marker changes to a static object displayed at a position overlapping with the first dangerous object or within a predetermined distance from the first dangerous object.

Figure 36:
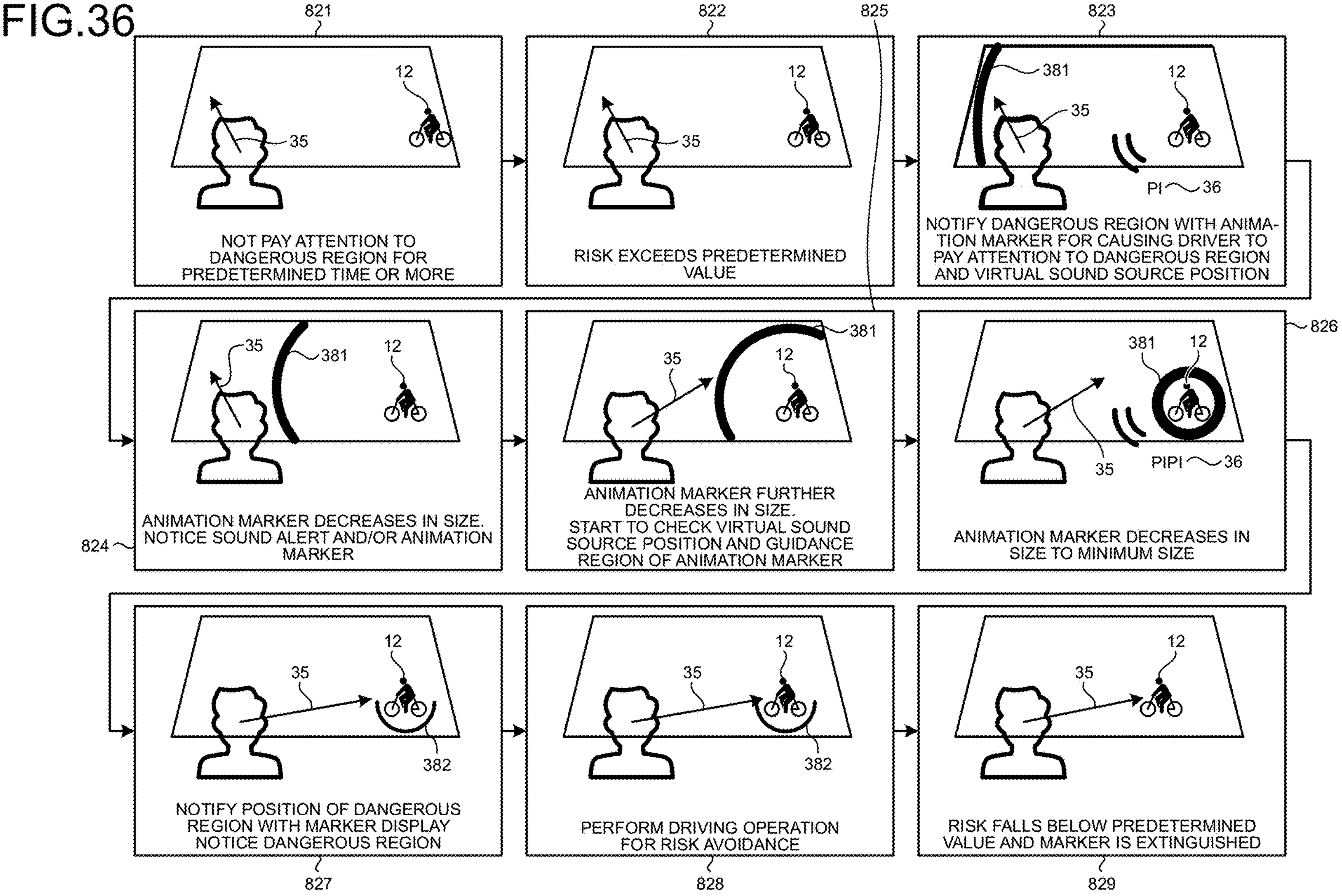
FIG. 36 is a diagram for describing marker display having an animation effect.

FIG. 36 is a diagram for describing marker display having an animation effect. Since a flow is the same as the flow illustrated in FIG. 10, in the following description, the same portions are omitted as appropriate. What is greatly different from the marker display illustrated in FIG. 10 is that, when it is determined by the arithmetic operation unit 106 of the vehicle 1 to perform the marker display on a dangerous region, a marker involving an animation aiming at an effect of attracting the attention of the driver and directing the attention of the driver in the direction of the dangerous region is displayed first, and, after the marker is displayed, marker display following the dangerous region is performed.

In an upper right part 823, display of an animation marker 381 for causing the driver to pay attention to the dangerous region is started and, at the same time, the sound alert 36 is output from the virtual sound source position set in the direction of the dangerous region. The animation marker 381 is an arc-shaped marker centered on the dangerous region (in this example, the bicycle 12) and is displayed as a marker having a large radius that greatly exceeds the dangerous region when appearing.

In a left middle part 824, the radius of the animation marker 381 slightly decreases and a slightly smaller arc-shaped marker is displayed centering on the dangerous region. The driver notices the sound alert 36 and/or this animation marker 381.

In a center middle part 825, the radius of the animation marker 381 further decreases and a smaller arc-shaped marker is displayed centering on the dangerous region. The driver learns that there is the dangerous region in the direction in which the sound alert 36 sounds (the direction of the virtual sound source position) and/or there is the dangerous region in the center direction of the animation marker 381 and starts to check a region (a direction) to which the driver is guided.

In a middle right part 826, the animation marker 381 changes to a final form and is reduced to a minimum size centered on the dangerous region. The required time from the upper left part 821 to the middle right part 826 is an instance (as an example, within 0.5 seconds, within 5 seconds, or the like).

In a lower left part 827, a lower center part 828, and a lower right part 829, marker display indicating the position of the dangerous region is performed. This marker display is a marker 382 that is not displayed as animation in a size deviating from the dangerous region like the animation marker but continues to be displayed while keeping a constant relative position with the dangerous region such that a dangerous object in a target dangerous region is easily visually recognized or is easily continuously visually recognized. Thereafter, the flow is the same as the flow illustrated in FIG. 10.

In FIG. 36, the virtual image plane on which the marker display is performed is described as the direction perpendicular to the road or the gravity direction. Since the marker far larger than the dangerous region is instantaneously displayed as the animation marker 381, regardless of a direction in which the driver is viewing, the driver sees this animation marker 381 and can immediately understand that an object having a constant risk is present around the vehicle. In a vehicle equipped with an advanced driving assist system such as an ADAS, a dangerous object around the vehicle is detected in real time as described above.

Therefore, by performing a notification starting with the animation marker 381 or the sound alert 36 for the detected dangerous object having the constant risk, it is possible to more easily and inexpensively assist safe driving without providing equipment for detecting the line-of-sight direction (the line of sight 35) of the driver and displaying an arrow mark (see FIG. 10) indicating the direction of the dangerous object in the direction.

Note that, in the above description, it is assumed that the radius of the animation marker 381 is reduced with time. However, the present disclosure is not limited to this. The arc-shaped animation marker 381 may not only be reduced in radius with time but may also be changed in as color or a pattern or a sound effect may be simultaneously sounded.

For example, various display forms are conceivable, such as a pattern in which an arc is thinned while a radius is large, reduction speed of the radius is fast, a color is light red, and a tail is drawn long and, as the radius decreases, the arc is thickened, the reduction speed of the radius is slow, the color is dark red, and the tail is drawn short.

Figure 37:
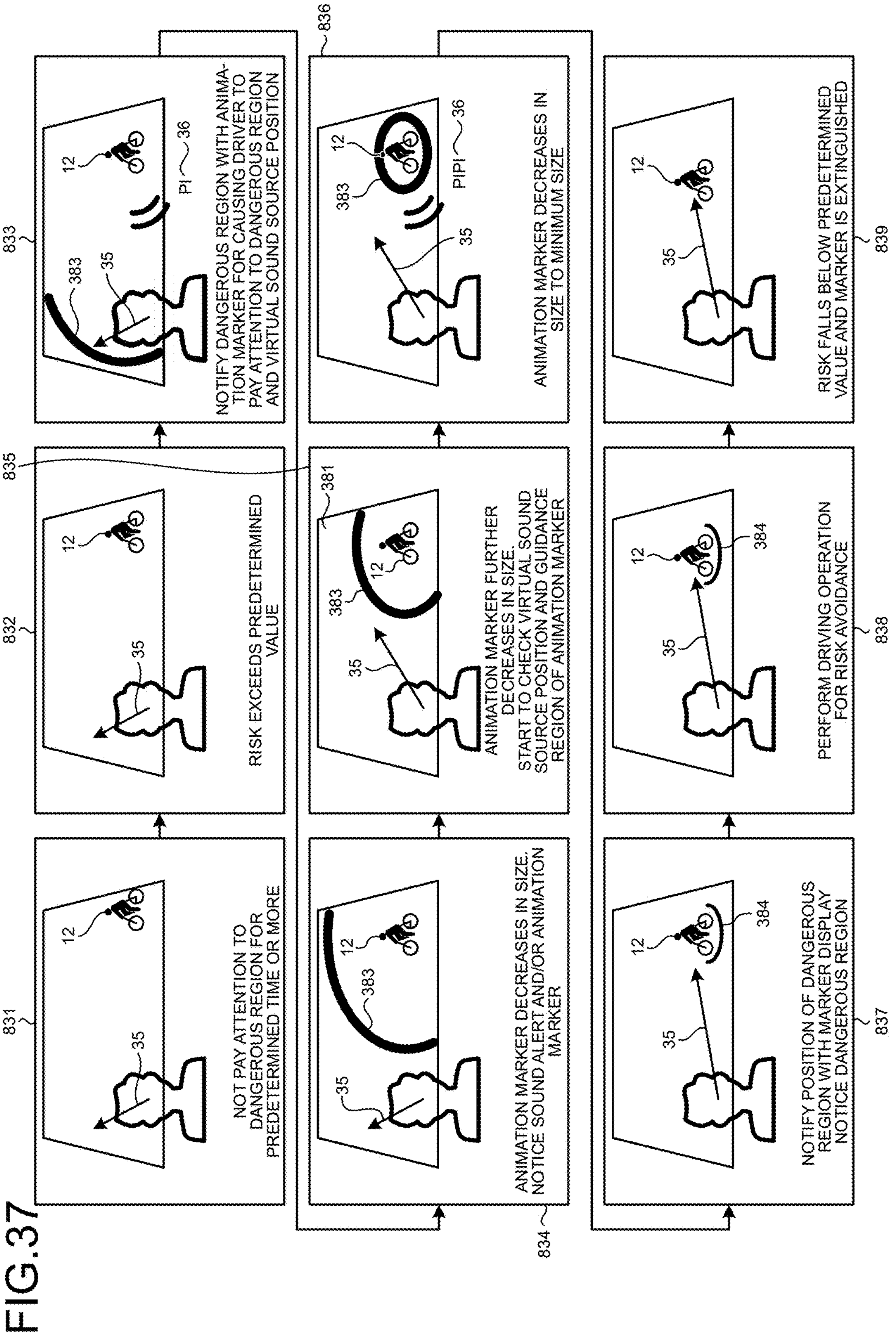
FIG. 37 is a diagram for describing marker display having an animation effect.

FIG. 37 is the same as FIG. 36 with the exception that the virtual image plane on which the marker is displayed is not perpendicular but is a virtual image plane parallel to the ground near respective target objects (dangerous regions). Therefore, as illustrated in FIG. 37, an animation marker 383 is reduced toward the bicycle 12 to crawl on the ground and, thereafter, or simultaneously, a marker 384 that continues to be displayed in parallel to the ground while keeping a constant relative position with the dangerous region is displayed such that a dangerous object in a target dangerous region is easily visually recognized or is easily continuously visually recognized.

Figure 38:
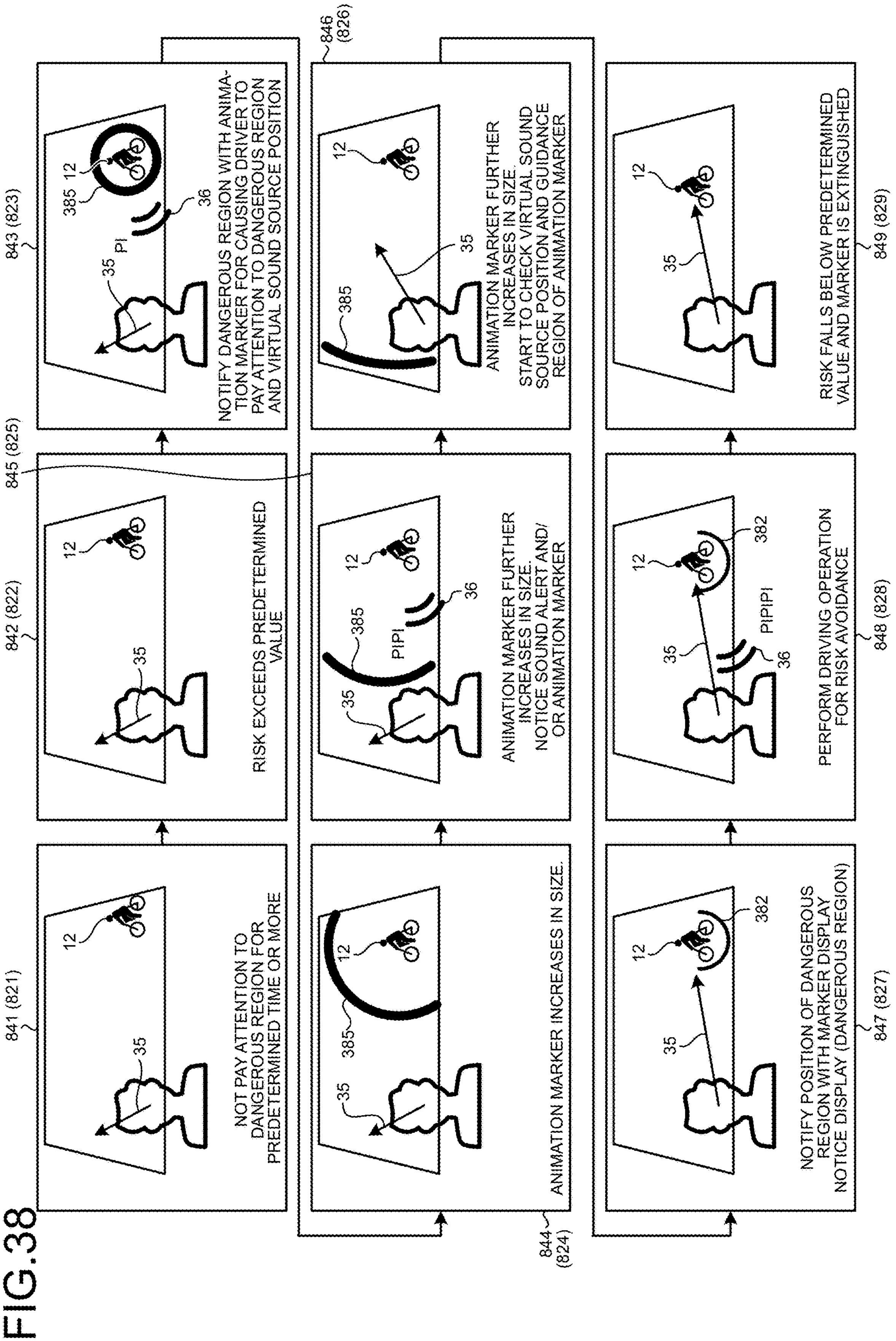
FIG. 38 is a diagram for describing marker display having an animation effect.

FIG. 38 is the same as FIG. 36 but is different in that the radius of an animation marker 385 is small at the initial display and is displayed larger with time. Although the arc-shaped animation marker 385 is an arc centered on the dangerous region (the dangerous object) as described above, not only the radius may be enlarged with time but also a color and a pattern may be changed or a sound effect may be sounded at the same time.

Figure 39:
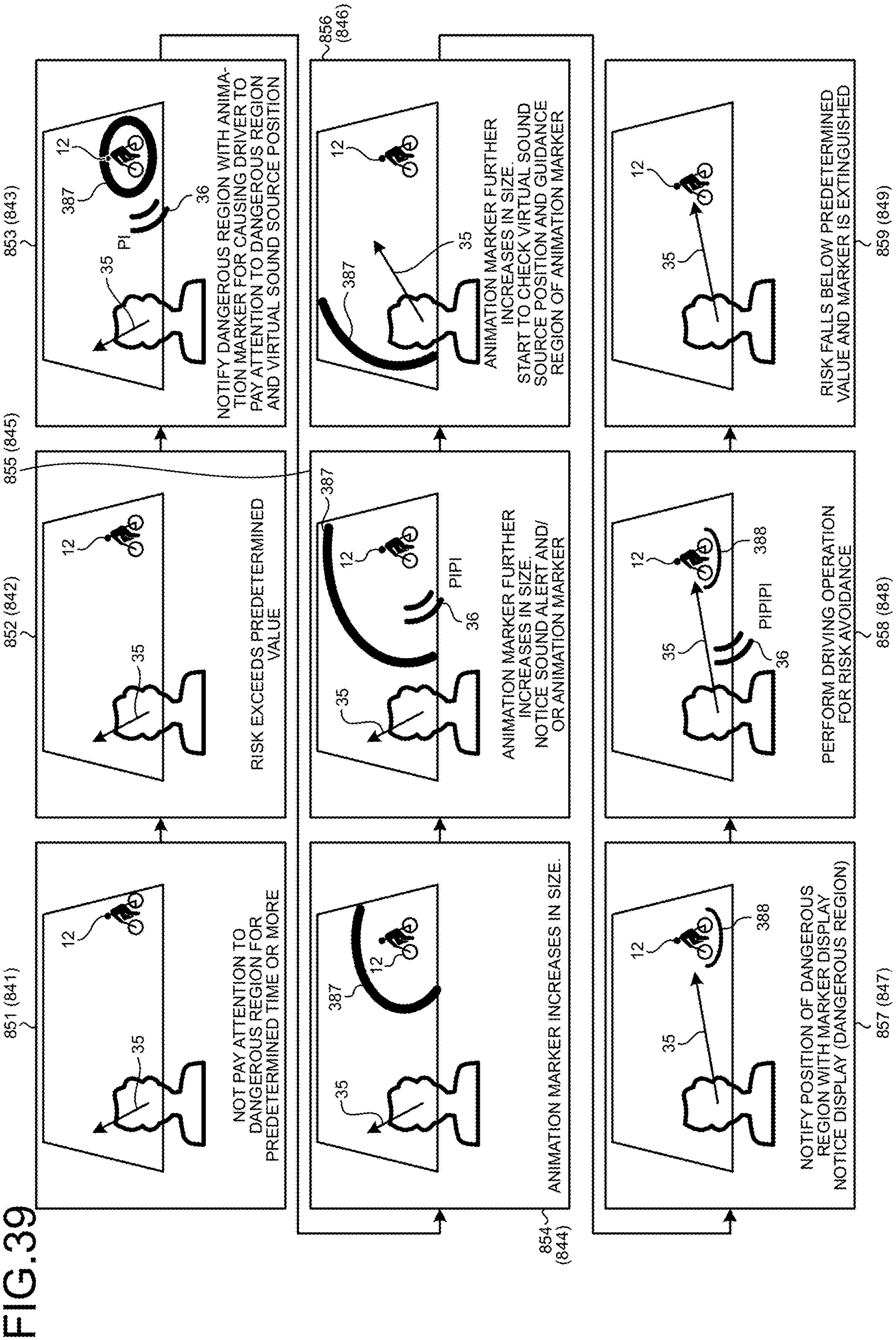
FIG. 39 is a diagram for describing marker display having an animation effect.

FIG. 39 is the same as FIG. 38 but is different in that the virtual image plane on which a marker 388 is displayed is not perpendicular and is a virtual image plane parallel to the ground near respective target objects (dangerous regions).

In FIGS. 36 to 39, a marker having an animation effect is displayed at the start of display of the marker. Since the driver more surely recognizes the animation marker as the animation marker is drawn larger, the animation marker may be displayed larger using a plurality of wide-angle head-up displays, may be displayed on a windshield having a function of a transparent monitor using the entire windshield, or, when a monitor (a head-up display or the like) having the entire width of the windshield is provided at the lower end of the windshield, an object indicating a direction or a distance of a dangerous object (a dangerous region) may be displayed in a display frame of the monitor, or the same wide-angle display may be performed by a monitor or a hologram device provided in the cockpit.

Figure 40:
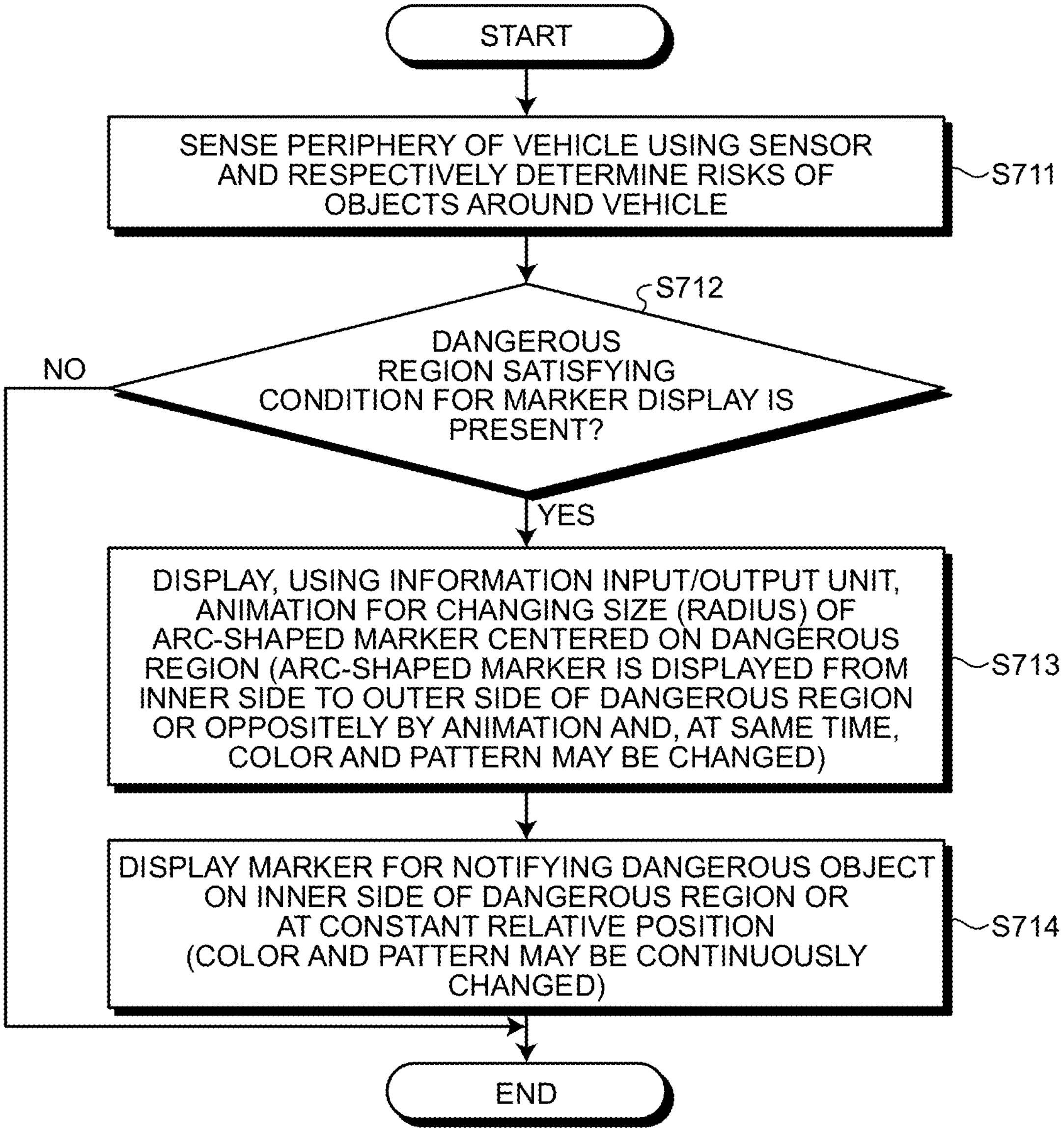
FIG. 40 is a flowchart illustrating an example indicated by a marker display having an animation effect.

FIG. 40 is diagram illustrating, in a flowchart, a processing flow of the information input/output unit 104 of the vehicle 1 described above. When the animation marker is used, it is unnecessary to display an object in accordance with the line of sight of the driver. The sensor unit 103 of the vehicle 1 senses the periphery of the vehicle (step S711). The arithmetic operation unit 106 of the vehicle 1 determines risks of respective objects satisfying a condition of the marker display (step S712).

Subsequently, when the condition for marker display is satisfied (step S712: Yes) (for example, in the case of a low risk or higher in FIG. 21), the information input/output unit 104 of the vehicle 1 displays an arc-shaped animation marker that is changed in the radius on a time axis while centering on the dangerous object (or the dangerous region) described with reference to FIGS. 36 to 39 (step S713). After the display of the animation marker ends (or at the same time partially or entirely with the display of the animation marker on the time axis), the arithmetic operation unit 106 of the vehicle 1 instructs and controls the information input/output unit 104 to display a marker that maintains a constant relative position with the inside of the dangerous region or the dangerous region. The information input/output unit 104 displays the marker (step S714).

Note that the arc-shaped animation marker may be displayed while changing one or more of the thickness, the color, and the pattern of the animation marker at the same time as described above. The marker may also change on the time axis without being displayed in a fixed color, pattern, or form.

Accordingly, the animation marker that is displayed to a range exceeding the dangerous region is instantaneously displayed. Therefore, it is possible to, without the trouble of detecting the line of sight of the driver, notify the driver of the dangerous object in a form of allowing the driver to easily notice the dangerous object.

Figure 41:
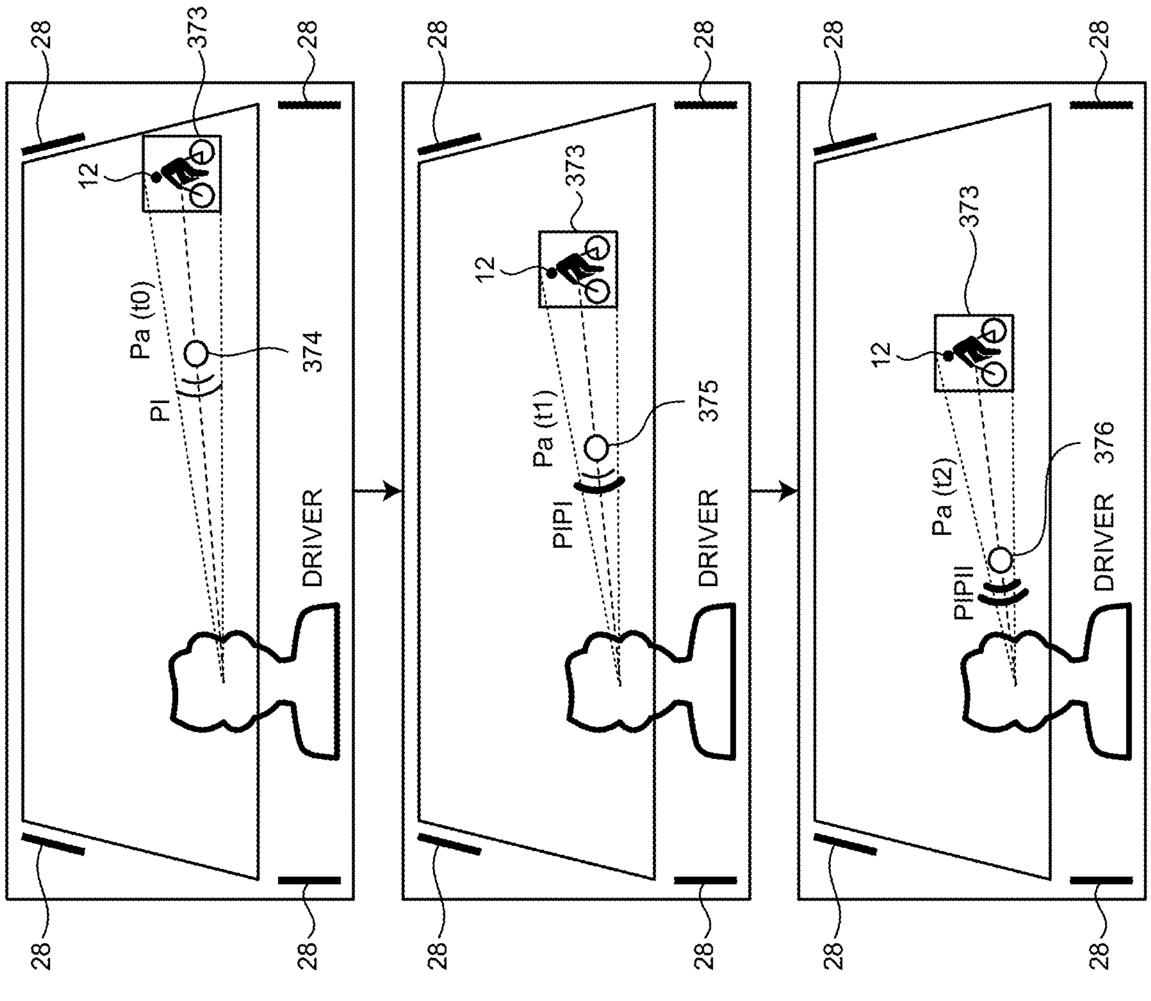
FIG. 41 is a diagram for describing a change of a sound alert and a change of a virtual sound source position corresponding to a risk.

FIG. 41 is a diagram for describing a change of a sound alert and a change of a virtual sound source position according to a risk. The same case as the case illustrated in FIG. 25 is treated. However, output of the sound alert is described in a form viewed from the driver. For that reason, a vehicle situation and reference signs are treated as the same as those illustrated in FIGS. 25 and 13.

At time t0, the bicycle 12 on the front right side is still far from the vehicle 1 and a risk is determined as "low". In order to notify the driver of this, the arithmetic operation unit 106 of the vehicle 1 calculates a quadrangular pyramid that includes, for example, the head of the driver and a dangerous region 373 (quadrangular in FIG. 41) having a predetermined form including a region where the bicycle 12 is detected. A virtual sound source position Pa(t0) is arranged inside the quadrangular pyramid. At this time, since the risk is "low", Pa(t0) present at a position relatively far from the head of the driver compared with the time of a higher risk is arranged. Sound used in a sound alert 374 is also notified with small volume of "pi".

With this sound alert, the driver can intuitively sense, without delay, only with the sense of hearing, that a dangerous object with a "low" risk is present on the front right side of the vehicle. In other words, the direction of the dangerous object and the risk thereof can be communicated to the driver irrespective of the line of sight of the driver.

At t1 when time has elapsed a little from time t0, the bicycle 12 is closer to a traveling route of the own vehicle and the risk is determined as "medium". The arithmetic operation unit 106 of the vehicle 1 acquires the latest head position and the dangerous region 373 and updates the quadrangular pyramid in the three-dimensional space. Then, the arithmetic operation unit 106 arranges the virtual sound source position Pa(t1) inside the quadrangular pyramid. At this time, since the risk is "medium", the arithmetic operation unit 106 arranges Pa(t1) at a distance closer to the driver than Pa(t0) corresponding to the risk "low". A sound alert 375 is "pipi", which is a stronger warning than when the risk is "low", and performs notification with a slightly larger medium-degree volume.

Further, since Pa(t1) is closer to the driver than Pa(t0), the driver can intuitively feel that the dangerous object is approaching the driver. With this sound alert 375 or with a difference from the sound alert 374 at the time when the risk was "low" at time t0, the driver can sense that the dangerous object having the risk of "medium" is present on the front right side of the own vehicle.

Further, at t2 when time has elapsed a little from time t1, the bicycle 12 is closer to the traveling route of the own vehicle and the risk is determined as "high". The arithmetic operation unit 106 of the vehicle 1 acquires the latest head position and the dangerous region 373 and updates the quadrangular pyramid in the three-dimensional space. Then, the arithmetic operation unit 106 arranges the virtual sound source position Pa(t2) inside the quadrangular pyramid. At this time, since the risk is "high", the arithmetic operation unit 106 arranges Pa(t2) at a distance closer to the driver than Pa(t1) corresponding to "medium". A sound alert 376 is "pipii", which is a stronger warning than when the risk is "medium", and performs notification with a slightly larger large-degree volume.

With the sound alert 376 or with a difference from the sound alert 374 and the sound alert 375 at the time when the risk is "low" and "medium" at times to and t1, the driver can sense that the dangerous object having the risk "high" is present on the front right side of the own vehicle. Since Pa(t2) is closer to the driver than Pa(t1) and Pa(t0), the driver can intuitively feel that the dangerous object is approaching the driver with the elapse of time, that is, is dangerous.

As described with reference to FIGS. 42 and 43, when a second vehicle (the other vehicle 13) located in front of the first vehicle (the vehicle 1) is determined to be a first dangerous object, the information presentation method in the present embodiment displays, on a head-up display mounted on a first vehicle, a first marker (a semi-arc marker 377) for alerting the driver of the first dangerous object, acquires, from the second vehicle, via a communication network, traveling information indicating a traveling state of the second vehicle, and changes at least one of a shape, a color, and a pattern of the first marker in accordance with the traveling state of the second vehicle. In addition, in the information presentation method in the present embodiment, when the second vehicle is determined to be stopped, the first marker has a first shape that at least partially overlaps with a first road surface region closer to the driver than a region where the second vehicle is grounded on the road surface present in front of the first vehicle and, in response to determining that the second vehicle is moving forward or about to move forward, the first marker has a second shape that at least partially overlaps with a second road surface region in front of the second vehicle on the road surface.

FIG. 42 is a diagram for describing an example in which a risk of another vehicle is indicated by marker display in real time. Display control for the marker is described on the assumption that the risk increases simultaneously with time elapsing to times t0, t1, and t2.

At time t0, the other vehicle 13 is about to merge from the front left side with the own vehicle traveling straight. At this time, although the own vehicle is traveling straight, the other vehicle 13 is stopped without obstructing a traveling lane and the risk is set to "low". While the risk is "low", for the other vehicle on the front left side, which is the target object, the green semi-arc marker 377 is displayed on the front side surface of the other vehicle in parallel to the ground.

Accordingly, the driver can easily determine that, although the other vehicle is present on the front left side, the risk of the other vehicle is low and can safely drive. The stop of the other vehicle 13 on the front left side may be determined by detecting a temporal change in the position of the other vehicle 13 with the sensor unit 103 (the LiDAR, the camera, or the like) mounted on the own vehicle or a radio signal transmitted from the other vehicle 13 may be acquired by the communication unit 108 of the vehicle 1 and the speed being 0 Km/h may be received as a part of driving control information.

At t1 when time has elapsed a little from time t0, it is detected that the own vehicle continues traveling straight but the other vehicle 13 on the front left side also starts moving forward. In this state, there is a risk of collision and the risk rises to "medium". While the risk is "medium", an orange semi-arc marker 378 is displayed with respect to the other vehicle 13 on the front side surface of the other vehicle 13 from the front direction in parallel to the ground.

In order to indicate that the other vehicle 13 is moving forward, the semi-arc marker 378 is drawn with an arc to cover a traveling direction side (the front side in FIG. 42) of the other vehicle 13 and visually inform the driver that the other vehicle is moving forward. Further, in order to clearly indicate to the driver that the other vehicle 13 is moving forward, the entire arc marker of the other vehicle 13 may be displayed in orange or the arc marker on the front side may be displayed in orange and the arc marker on the side surface side may be displayed in green. The arc marker on the front side is displayed in a more reddish color different from the color of the arc marker on the side surface side in order to visually indicate to the driver that the other vehicle 13 is determined as dangerous because the other vehicle is moving forward.

This is merely an example and any one or more of a shape, a color, a pattern, a size, luminance, and a blinking period of a marker may be changed to distinguish and display a state of a target object of the marker (for example, whether the target object is moving forward, moving backward, stopped, turning right, or the like).

In general, it is difficult to for the driver to discriminate whether the other vehicle 13 is about to enter at a merging point or is waiting for the own vehicle to pass. If a temporal change of the position of the other vehicle 13 can be measured or the driving control information can be acquired from the other vehicle 13 via wireless communication (the communication unit 108 of the vehicle 1), this is easy for the driver to understand and it is possible to notify the driver using video and sound without delay. Therefore, it can be expected it is possible to contribute to safe driving.

At t2 when time has elapsed a little from time t1, it is detected that the own vehicle continues traveling straight but the other vehicle 13 on the front left side is also about to move forward and merge. In this state, the risk of collision is high and the risk rises to "high". While the risk is "high", with respect to the other vehicle, a red semi-arc marker 379 is displayed on the front side surface of the other vehicle 13 in parallel to the ground from the front direction. In order to indicate that the other vehicle 13 is moving forward higher speed, the semi-arc marker 379 is drawn with an arc to have a larger width on the traveling direction side (the front side in this drawing) of the other vehicle 13 and visually informs the driver that the other vehicle 13 is moving forward. Further, a marker such as an arrow 380 indicating an expected traveling route of the other vehicle 13 may be displayed in order to plainly indicate to the driver that the other vehicle 13 is about to merge.

A temporal movement amount of the other vehicle 13 or a steering angle of tires may be detected by the sensor unit 103 of the vehicle 1 and the expected traveling route may be derived by the arithmetic operation unit 106 and displayed by the information input/output unit 104. Alternatively, the expected traveling route may be acquire as driving control information from the other vehicle 13 via wireless communication (the communication unit 108 of the vehicle 1). Since the expected traveling route is displayed to be superimposed on the real world, it is possible to visually understand, for example, whether the other vehicle 13 is stopped, whether the other vehicle is increasing or reducing speed, and in which direction the other vehicle 13 is about to travel. If how the other vehicle 13 moves/does not move is plainly directly superimposed on the driver's vision using the head-up display or the like as described above, it can be expected that it is possible to greatly contribute to safe driving.

Note that it is also conceivable to read the driver's driving intention such as the expected traveling route and whether to merge or continue to stop and wait for passage from an operation situation of one or more of a steering wheel, an accelerator, and a brake to control a video of an outward display panel of the own vehicle or project the video on the ground near the own vehicle. When such outside display of the intention is performed, it is easy for a driver of an oncoming vehicle of the vehicle to implement smooth and safe driving and it can be expected that an accident is reduced.

Note that such an expected traveling route and a current driving intention can be more reliably read in an automatic driving vehicle. When an unmanned automatic driving vehicle travels while being mixed with a manned driving vehicle, if a current driving intention (to, for example, decelerate, accelerate, stop, halt, immediately merge, or merge after other vehicle passage) of the automatic driving vehicle can be presented to a driver by the method described above, it is considered possible to implement, efficiently in a united form, driving intention confirmation between drivers of the automatic driving vehicle and the manned vehicle.

Figure 43:
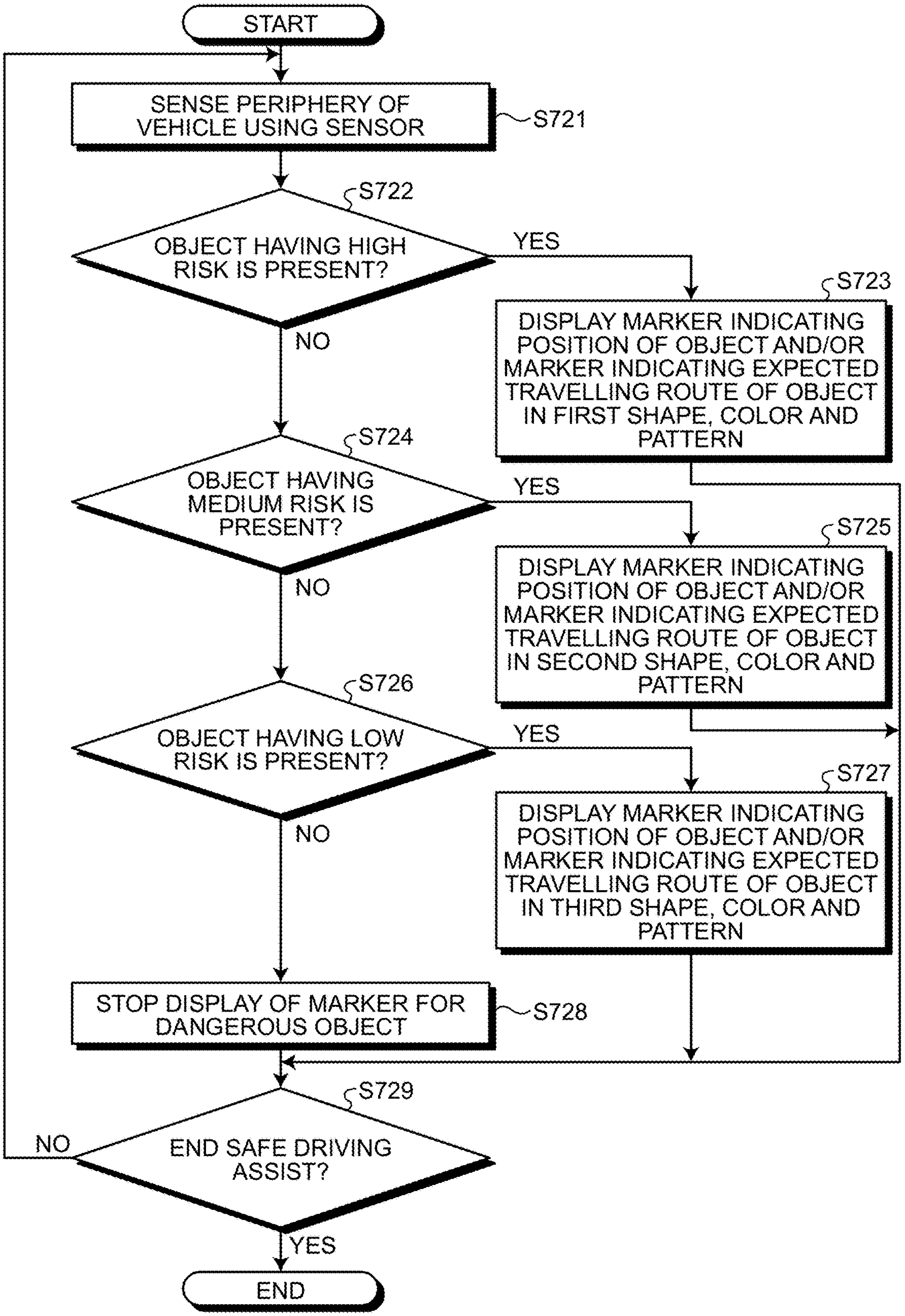
FIG. 43 is a flowchart illustrating an example of indicating a risk of another vehicle with marker display in real time.

FIG. 43 is a flowchart corresponding to FIG. 42. In this flowchart, the arithmetic operation unit 106 of the vehicle 1 senses the periphery of the vehicle using the sensor unit 103 (step S721). Thereafter, the arithmetic operation unit 106 of the vehicle 1 checks whether an object satisfying the condition of the high risk is present around the vehicle (step S722) and, if an object satisfying the condition of the high risk is present around the vehicle, the processing proceeds to Yes (step S722: Yes). Then, the information input/output unit 104 of the vehicle 1 displays a marker indicating the position of the object and/or a marker indicating an expected traveling route (or driving intention) of the object to the driver in first shape, color, and pattern (step S723). The information input/output unit 104 may simultaneously notify the position and the expected traveling route of the object to the driver with first sound signal, volume, and virtual sound source position.

If an object satisfying the condition of the high risk is absent around the vehicle, the processing proceeds to No (step S722: No) and the arithmetic operation unit 106 of the vehicle 1 checks whether an object satisfying the condition of the medium risk is present around the vehicle (step S724). If an object satisfying the condition of the medium risk is present around the vehicle, the processing proceeds to Yes (step S724: Yes) and the information input/output unit 104 of the vehicle 1 displays these markers in second shape, color, and pattern (step S725). The information input/output unit 104 may simultaneously notify the presence of the object to the driver with second sound signal, volume, and virtual sound source position.

If an object satisfying the condition of the medium risk is absent around the vehicle, the processing proceeds to No (step S724: No) and the arithmetic operation unit 106 of the vehicle 1 checks whether an object satisfying the condition of the low risk is present around the vehicle (step S726). If an object satisfying the condition of the low risk is present around the vehicle, the processing proceeds to Yes (step S726: Yes) and the information input/output unit 104 of the vehicle 1 displays these markers in the third shape, color, and pattern (step S727). At the same time, the driver may be notified of the third sound signal, the volume, and the virtual sound source position.

If an object satisfying the condition of the low risk is absent around the vehicle, the processing proceeds to No (step S726: No) and the information input/output unit 104 of the vehicle 1 stops displaying the markers because a dangerous object for which attention should be called with a marker is absent (step S728). The information input/output unit 104 stops the sound alert as well. Upon ending the assist of the safe driving, the arithmetic operation unit 106 of the vehicle 1 ends the processing (step S729: Yes). When not ending the processing (step S729: No), the arithmetic operation unit 106 of the vehicle 1 returns to the beginning (step S721) and returns to the loop of sensing the periphery of the vehicle with the sensor unit 103 again.

Note that, although only the shapes and colors of the markers are described here, when the sound alert is simultaneously used, as described above, audio signals, volumes, and virtual sound source positions of different sound alerts may be used in accordance with the respective risks.

As illustrated in the flowchart of FIG. 43, the marker display corresponding to the risk is performed on the target object in accordance with the situation around the vehicle. Therefore, the driver can visually determine the risk of the target object without delay. It is considered possible to contribute to safe driving.

Figure 44:
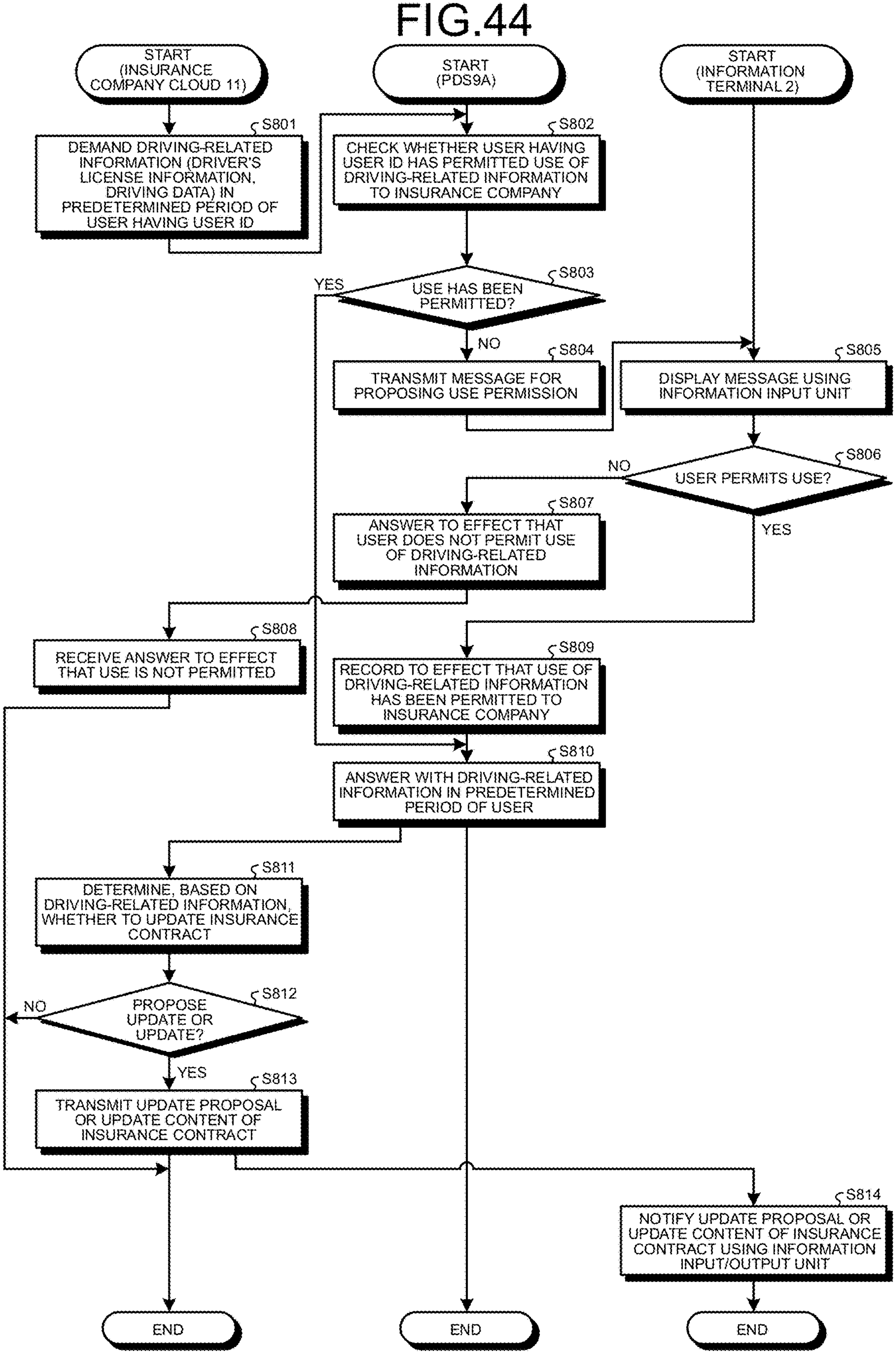
FIG. 44 is a flowchart illustrating an example of updating an insurance contract based on driving data.

FIG. 44 is a flowchart illustrating an example of updating an insurance contract based on driving data. This is also a detailed example concerning "notify incentive (step S119)", which is the processing of the PDS 9A illustrated in FIG. 11. In this example, a mechanism in which an insurance company cloud automatically reconsiders an insurance content using the PDS 9A in which driving-related information is accumulated is described. The insurance company cloud is equivalent to the third party cloud 11 illustrated in FIG. 1 and is a cloud used by an insurance company to provide and update an insurance service.

First, the arithmetic operation unit 903 of the insurance company cloud 11 (or an application operating therein) requests, via the communication unit 901, the PDS 9A used by the user to provide driving-related information over a predetermined period (for example, the past one month or one year) of a user identified by a user ID (step S801). The request includes a user ID, requested data type information (driving data and information about a driver's license (an expiration date, a drivable vehicle type, a driving condition, and the like)), a period of requested data (for example, past one year), and requester identification information (information for identifying the insurance company) for identifying a requesting corporation or organization.

The arithmetic operation unit 903 of the PDS 9A, which has received the request via the communication unit 901, collates the driving-related information with a database recorded in the memory 902 and checks whether the user having the user ID has permitted the use of the driving-related information to the insurance company (step S802). When the user has not permitted the use (step S803: No), the arithmetic operation unit 903 transmits a message proposing to permit the use to the information terminal 2 of the user via the communication unit 901 (step S804).

The arithmetic operation unit 204 of the information terminal 2, which has received the message via the communication unit 206, displays the message to the user using (the display of) the information input/output unit 202 (step S805) and urges the user to permit the insurance company to use of the driving-related information (the driving data and the information about the driver's license) (step S806).

When the user permits the use (step S806: Yes), a response to that effect is returned to the PDS 9A via the communication unit 206 of the information terminal 2. The arithmetic operation unit 903 of the PDS 9A, which has received the response via the communication unit 901, additionally writes, in the database recorded in the memory 902, that the user has permitted the use of the driving-related information to the insurance company (step S809).

On the other hand, when the user does not permit the use (step S806: No), the arithmetic operation unit 204 answer the PDS 9A to that effect. The PDS 9A, which has received the answer, answers the insurance company cloud 11 that the user has not permitted the use of the driving-related information (step S807). The insurance company cloud 11, which has received the answer (step S808), ends this processing because the use permission has not been obtained.

When the user has already permitted the use of the driving-related information to the insurance company (step S803: Yes) or when the user has permitted the user anew (step S806: Yes), the arithmetic operation unit 903 of the PDS 9A answer the insurance company cloud 11 with the driving-related information of the predetermined period of the user (the user ID) via the communication unit 901 (step S810).

The arithmetic operation unit 903 of the insurance company cloud 11, which has received the answer via the communication unit 901, determines, based on the received driving-related information, vehicle information used by the user, and content of the current insurance contract, whether to propose to update or update the insurance contract (step S811).

Then, when the insurance contract is proposed to be updated or is updated (step S812: Yes), the arithmetic operation unit 903 of the insurance company cloud 11 transmits the update proposal or update content of the insurance contract to the information terminal 2 (step S813). The arithmetic operation unit 204 of the information terminal 2, which has received this via the communication unit 206, notifies the user of the update proposal or the update content of the insurance contract using the information input/output unit 202 (step S814). On the other hand, in response to determining that the update proposal or the update of the insurance contract is not performed (step S812: No), the arithmetic operation unit 903 of the insurance company cloud 11 ends this processing.

The insurance company cloud 11, which has acquired the driving-related information of the user from the PDS 9A as described above, can determine, based on the current contract content, the vehicle 1 to be a contract target, whether to propose to update the insurance contract or update the insurance contract, and the driver's license information and the driving data of the user and notify to that effect via the information terminal 2 of the user. By managing, with the PDS 9A, the driving-related information including the driving data collected by the vehicle 1 and allowing the insurance company to use the driving-related information under personal permission, it is possible to update the insurance contract to an appropriate insurance contract according to the recent driving history of the user.

This can also be considered a benefit of the user obtained only by accumulating the driving-related information of the user in the PDS 9A and allowing a third party to use the driving-related information. The driving-related information of the user managed by the PDS 9A is not used only for the safe driving function in the vehicle but is permitted to be used and released also for a service of the third party as described above. Therefore, a new data utilization method can be generated and the user can receive a new benefit. What the present disclosure discloses here is a specific application case of information processing for the third party to utilize such driving-related information.

Note that the third-party use of the driving-related information including the driving data obtained from the vehicle 1 as described above is not limited to the insurance company. For example, if the driving data is released to an administrative unit in charge of the place where an incident/accident report has been made or a road maintenance company, it is possible to grasp where an event having a high risk has occurred. Accordingly, it is considered possible to find and eliminate a reason why an event having a high risk occurs at the place.

For example, by permitting the use of the driving data to an automobile sales company, it is also considered possible to examine what kind of safe driving function is preferable at the time of vehicle purchase while collating the safe driving function with specific driving data. A vehicle selling side can propose a vehicle corresponding to a safe driving skill of the user and the user side can select a vehicle and a safe driving function corresponding to the safe driving skill of the user.

As described above, by permitting the use of the driving data, the driving conditions of the driver's license, and the like to the vehicle 1 driven by the user (or the manufacturer thereof), before the start of driving, the vehicle 1 can check whether the user is permitted to drive the vehicle 1, what is a safe driving function necessary for driving, and the like.

This makes it possible to prevent a user without legal permission from driving the vehicle 1. When the safe driving function required when the user drives is insufficient, it is possible to satisfy movement needs of the user while improving safe driving by limiting speed and a drivable range at the time of driving.

By permitting the use of the driving data, the driving conditions of the driver's license, and the like to the vehicle 1 driven by the user (or the manufacturer thereof), at least one of the sound alert 36, the marker display 37, and the arrow mark 38 may be output not only in response to the determination result of the low risk but also in a safer state for the purpose of assisting check of a dangerous object around the vehicle for a user who is unaccustomed to driving shortly after acquiring a driver's license.

In this case, when the safe driving can be carried out at a predetermined level based on the driving data of the user, the notification of the sound alert 36, the marker display 37, and the arrow mark 38 may be limited to when the low risk is determined as described above.

In the safe driving assist system 100 indicated by the present disclosure, by making the driving-related information (the information of the driver's license, the driving data, and the like) available to a third party as well, it is considered possible to implement a safer and more appropriate movement experience conforming to finer needs not only for the user but for the entire society around the user.

INDUSTRIAL APPLICABILITY

The safe driving assist system 100 of the present disclosure detects a dangerous object around the vehicle and estimates whether the user is aware of the dangerous object. Therefore, in particular, when the user is not aware of the dangerous object, it is possible to plainly notify the dangerous object using a display technology by augmented reality of virtual reality and a 3D stereophonic sound technology. It is possible to generate a new added value service by causing a third party to use, based on personal permission, data concerning driving of the user obtained here. As a future image of mobility in the Society 5.0 society, industrial applicability is considered to be extremely high.

A program executed by the safe driving assist system 100 in the present embodiment is provided by being incorporated in advance in a ROM or the like.

The program to be executed by the safe driving assist system 100 in the present embodiment may be provided by being recorded in a computer-readable recording medium such as a CD-ROM, a flexible disk (FD), a CD-R, or a DVD (Digital Versatile Disk) as a file in an installable format or an executable format.

Further, the program to be executed by the safe driving assist system 100 in the present embodiment may be configured to be stored on a computer connected to a network such as the Internet and to be provided by being downloaded via the network. The program to be executed by the safe driving assist system 100 in the present embodiment may be provided or distributed through a network such as the Internet.

Although the several embodiments of the present invention are described above, these embodiments are presented as examples and are not intended to limit the scope of the invention. These embodiments can be implemented in other various forms, and various omissions, substitutions, and changes can be made without departing from the gist of the invention. These embodiments and the modifications thereof are included in the scope and the gist of the invention and are included in the inventions described in the claims and the scope of equivalents of the inventions.

Supplementary Notes

Examples of other various embodiments disclosed by the description of the embodiments described above include the following techniques.

(Technique 1)

An information presentation method for presenting information to a driver of a vehicle via a head-up display mounted on the vehicle, the information presentation method including:

detecting, via at least one first sensor that senses the outside of the vehicle, one or more objects located in front of the vehicle;

determining a risk of each of the one or more objects;

determining a line of sight of the driver via at least one second sensor that senses an inside of the vehicle; and displaying an alert object for alerting a dangerous object via the head-up display in response to determining, based on the risk of each of the one or more objects and information about the line of sight of the driver, that the one or more objects include a dangerous object whose risk is a first risk exceeding a predetermined level and not recognized by the driver, wherein the alert object is presented to the driver as a virtual image formed at a first image forming position between the driver and the dangerous object, and the risk relates to a future collision risk between each of the one or more objects and the vehicle, and when the risk of the dangerous object rises from the first risk to a second risk, an image forming position of the virtual image is changed from the first imaging position to a second imaging position, and the second imaging position is a position between the driver and the dangerous object and closer to the dangerous object than the first imaging position.

(Technique 2)

A control method for controlling a first computer that retains driving characteristic data of a plurality of users, the control method including:

accumulating a plurality of user IDs for identifying a plurality of users having driver's licenses and the driving characteristic data indicating driving characteristics of the users in correlation with each other in a driving characteristic database managed by the first computer, the driving characteristic data being acquired via a plurality of vehicles driven by the users in past;

storing the user IDs, a plurality of company IDs for identifying a plurality of companies, and permission information indicating to which company among the companies each of the users has permitted access to the driving characteristic data of the user in a memory in the first computer in correlation with one another;

receiving, via a network, a first company ID of an insurance company, a first user ID of a first user with whom the insurance company has a contract for an insurance product, and an access request to first driving characteristic data of the first user from a second computer of the insurance company;

determining, based on the first company ID, the first user ID, and the permission information, whether the first user has permitted access to the first driving characteristic data of the first user by the insurance company; and, in response to determining that the access to the first driving characteristic data by the insurance company has been permitted, causing the second computer to acquire the first driving characteristic data and update, based on the first driving characteristic data, the insurance product contracted with the first user.

(Technique 3)

The control method according to the technique 2, wherein the first computer is one of computers capable of communicating with one another via a network, and each of the computers manages at least one of the driving characteristic database and the permission information on a distributed ledger.

(Technique 4)

A vehicle control method for controlling a vehicle mounted with a communication circuit connectable to a network, the vehicle control method including:

acquiring, via the communication circuit, driving characteristic information indicating a driving characteristic of the driver from a first computer that manages a driving characteristic database in which driving characteristic data of a plurality of users acquired from a plurality of vehicles is accumulated;

acquiring, from the storage device of the vehicle, a function list indicating a plurality of driving assist functions mounted on the vehicle; and, in response to determining, based on the driving characteristic information and the function list, that a level of a driving skill of the driver is less than a reference value and that a necessary assist function for compensating for insufficiency of the driving skill is absent among the driving assist functions, transmitting, via the communication circuit, necessary function information indicating the necessary assist function to a second computer that manages distribution of a plurality of driving assist applications;

when the second computer determines, based on the necessary function information, that a first application corresponding to the necessary assist function is retained among the driving assist applications, acquiring, from the server, recommendation information for recommending introduction of the first application into the vehicle;

presenting, based on the recommendation information, a message for recommending the introduction of the first application into the vehicle to the driver via a display or a speaker provided in the vehicle; and installing the first application in the vehicle when the driver agrees with the message.

(Technique 5)

The vehicle control method according to the technique 4, wherein the driving characteristic data is data indicating a driving characteristic based on past driving operation in past of drivers, data concerning a condition of driver's licenses of drivers, attribute data for specifying ages of the drivers, cognitive ability data indicating cognitive abilities of the drivers, or personality data indicating personalities of the drivers.

(Technique 6)

A vehicle control method for controlling a vehicle mounted with a communication circuit connectable to a network, the vehicle control method including:

acquiring, via the communication circuit, driving characteristic information indicating a driving characteristic of the driver from a first computer that manages a driving characteristic database in which driving characteristic data of a plurality of users acquired from a plurality of vehicles is accumulated;

acquiring, from the storage device of the vehicle, a function list indicating a plurality of driving assist functions mounted on the vehicle; and limiting a navigation function of a car navigation system mounted on the vehicle in response to determining, based on the driving characteristic information and the function list, that a level of a driving skill of the driver is less than a reference value and that a necessary assist function for compensating for insufficiency of the driving skill is absent among the driving assist functions.

(Technique 7)

The vehicle control method according to the technique 6, wherein the limitation of the navigation function includes limiting a destination that can be set by the driver, limiting a route that can be set by the driver, or alerting the driver to limit maximum speed of the vehicle to a predetermined value or less.

(Technology 8)

The vehicle control method according to the technique 6, wherein, when the necessary assist function is absent, instead of or in addition to the limitation of the navigation function, report information indicating that the driver drives the vehicle that does not have the necessary assist function is transmitted to, via the second circuit, a computer of an insurance company, with which the driver has a contract of an insurance product, to cause the insurance company to update the insurance product.

What is claimed is:

1. A vehicle control method of controlling a vehicle, the vehicle being capable of communicating with one or more other vehicles located in a periphery, the vehicle control method comprising:

acquiring driving characteristic information indicating a driving characteristic of a driver via a first communication circuit provided in the vehicle;

determining, based on the driving characteristic information, whether there is an alert matter to be alerted to the one or more other vehicles with respect to the driving characteristic of the driver; and transmitting, via a second communication circuit mounted on the vehicle, vehicle information for identifying the vehicle and the alert matter to the one or more other vehicles located around the vehicle in response to determining that there is the alert matter, wherein the driving characteristic information is information indicating a driving skill of the driver or information about a driver's license of the driver, the alert matter is information indicating that a level of the driving skill is less than a reference value or information indicating that there is a constraint condition for the driver's license, the driving characteristic information is the information about the driver's license of the driver and is acquired via an IC card or a terminal owned by the driver, and the alert matter is determined to be present when an assist car limitation condition is given to the information about the driver's license.

2. A vehicle control method of controlling a vehicle, the vehicle being capable of communicating with one or more other vehicles located in a periphery, the vehicle control method comprising:

acquiring driving characteristic information indicating a driving characteristic of a driver via a first communication circuit provided in the vehicle;

determining, based on the driving characteristic information, whether there is an alert matter to be alerted to the one or more other vehicles with respect to the driving characteristic of the driver; and transmitting, via a second communication circuit mounted on the vehicle, vehicle information for identifying the vehicle and the alert matter to the one or more other vehicles located around the vehicle in response to determining that there is the alert matter, wherein the driving characteristic information is information indicating a driving skill of the driver or information about a driver's license of the driver, the alert matter is information indicating that a level of the driving skill is less than a reference value or information indicating that there is a constraint condition for the driver's license, the driving characteristic information is the information indicating the driving skill of the driver and is acquired via a terminal of the driver or from a storage device mounted on the vehicle, and the vehicle control method further comprises:

acquiring, from the storage device of the vehicle, a function list indicating two or more driving assist functions mounted on the vehicle; and transmitting the vehicle information and the alert matter to the one or more other vehicles in response to determining, based on the driving characteristic information and the function list, that the level of the driving skill of the driver is less than the reference value and a necessary assist function for compensating for an insufficiency of the driving skill is absent among the two or more driving assist functions.

3. The vehicle control method according to claim 2, wherein the vehicle information includes at least one selected from a model, a number, a color, or a current position of the vehicle.

4. The vehicle control method according to claim 2, wherein the driving characteristic information is acquired from a driving characteristic database managed in a computer with which the first communication circuit communicates, and driving characteristic data of multiple users acquired from multiple vehicles is accumulated in the driving characteristic database.

5. The vehicle control method according to claim 4, wherein in the driving characteristic database, user IDs for identifying the multiple users and the driving characteristic data of the multiple users are accumulated in correlation with each other, the computer further stores the user IDs, vehicle IDs for identifying the multiple vehicles, and permission information in correlation with one another in a memory, the permission information indicating which vehicle among the multiple vehicles each of the multiple users permits to access the driving characteristic data of the user, and the vehicle acquires the driving characteristic data of the driver when the computer determines, based on a user ID of the driver, a vehicle ID of the vehicle, and the permission information, that the driver has permitted the vehicle to access the driving characteristic data of the driver.

6. The vehicle control method according to claim 5, wherein the computer is one of multiple computers capable of communicating with one another via a network, and each of the multiple computers manages at least one of the driving characteristic database or the permission information on a distributed ledger.

7. The vehicle control method according to claim 2, further comprising:

transmitting, via the first communication circuit, necessary function information indicating the necessary assist function to a second computer serving to manage distribution of driving assist applications in response to determining that the necessary assist function is absent among the two or more driving assist functions;

when the second computer determines, based on the necessary function information, that a first application corresponding to the necessary assist function is retained in the driving assist applications, acquiring, from the second computer, recommendation information for recommending introduction of the first application into the vehicle;

presenting, based on the recommendation information, a message for recommending introduction of the first application into the vehicle to the driver via a display or a speaker provided in the vehicle; and installing the first application in the vehicle when the driver agrees to the message.

8. The vehicle control method according to claim 2, further comprising:

limiting a navigation function of a car navigation system mounted on the vehicle in response to determining that the necessary assist function is absent among the two or more driving assist functions, wherein the limiting of the navigation function includes limiting a destination to be set by the driver, limiting a route to be set by the driver, or alerting the driver to limit a maximum speed of the vehicle to a predetermined value or less.

* * * * *